United States Patent
Takenaka et al.

(10) Patent No.: US 8,532,898 B2
(45) Date of Patent: Sep. 10, 2013

(54) CONTROL DEVICE OF OMNIDIRECTIONAL VEHICLE

(75) Inventors: Toru Takenaka, Saitama (JP); Kazushi Akimoto, Saitama (JP); Shinichiro Kobashi, Saitama (JP); Hideo Murakami, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 78 days.

(21) Appl. No.: 13/391,494

(22) PCT Filed: Sep. 18, 2009

(86) PCT No.: PCT/JP2009/004726
§ 371 (c)(1),
(2), (4) Date: Feb. 21, 2012

(87) PCT Pub. No.: WO2011/033576
PCT Pub. Date: Mar. 24, 2011

(65) Prior Publication Data
US 2012/0150408 A1 Jun. 14, 2012

(51) Int. Cl.
*G06F 7/70* (2006.01)
*G06F 19/00* (2011.01)
*G06G 7/00* (2006.01)
*G06G 7/76* (2006.01)

(52) U.S. Cl.
USPC ....... 701/70; 701/1; 701/36; 701/93; 180/170

(58) Field of Classification Search
USPC ................ 701/1, 23, 24, 27, 36, 41, 70, 93; 180/170, 172
See application file for complete search history.

(56) References Cited

U.S. PATENT DOCUMENTS

| | | | | |
|---|---|---|---|---|
| 4,223,753 A | * | 9/1980 | Bradbury | 180/6.2 |
| 7,293,790 B2 | * | 11/2007 | Byun et al. | 280/262 |
| 7,878,284 B1 | * | 2/2011 | Shultz | 180/199 |

FOREIGN PATENT DOCUMENTS

| | | |
|---|---|---|
| JP | 4-201793 A | 7/1992 |
| JP | 2004-129435 A | 4/2004 |
| JP | 2006-282160 A | 10/2006 |
| WO | 2008/132778 A1 | 11/2008 |
| WO | 2008/132779 A1 | 11/2008 |
| WO | 2008/139740 A1 | 11/2008 |

* cited by examiner

*Primary Examiner* — Rami Khatib
(74) *Attorney, Agent, or Firm* — Carrier Blackman & Associates, P.C.; Joseph P. Carrier; William D. Blackman

(57) ABSTRACT

An omnidirectional vehicle capable of enhancing straight-line stability is provided.

Within a period from the instant the execution of velocity component attenuation processing for reducing continuously or stepwise the magnitude of a desired velocity vector ↑Vb_aim of a predetermined representative point of a vehicle 1 having a traveling motion unit 5 capable of moving in all directions, including a first direction and a second direction, on a floor surface is started to the instant the magnitude of ↑Vb_aim attenuates to zero, the orientation of ↑Vb_aim is brought closer to the first direction. The first direction is defined as the fore-and-aft direction of an occupant aboard the vehicle 1, while the second direction is defined as the lateral direction of the occupant.

7 Claims, 20 Drawing Sheets

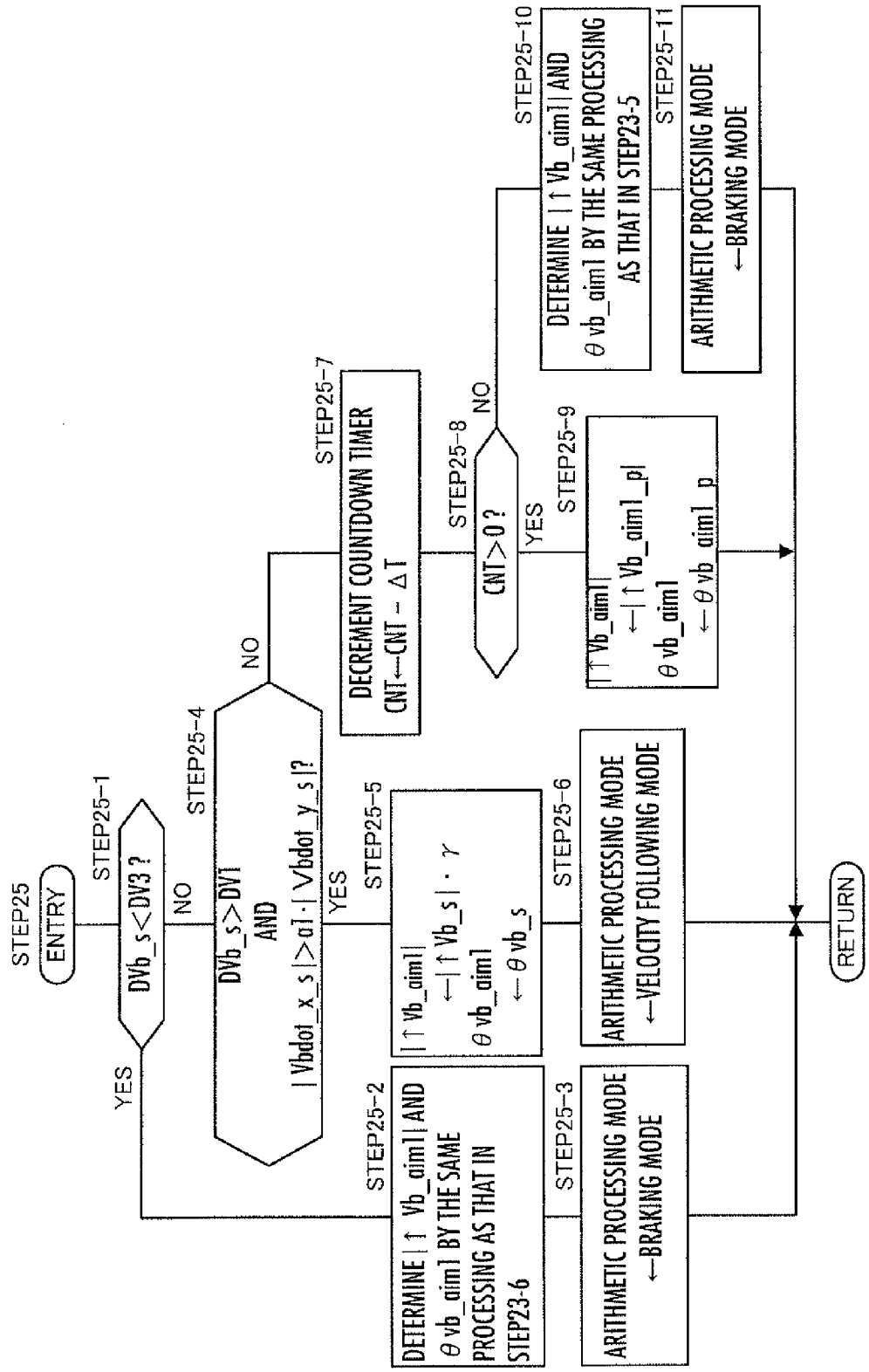

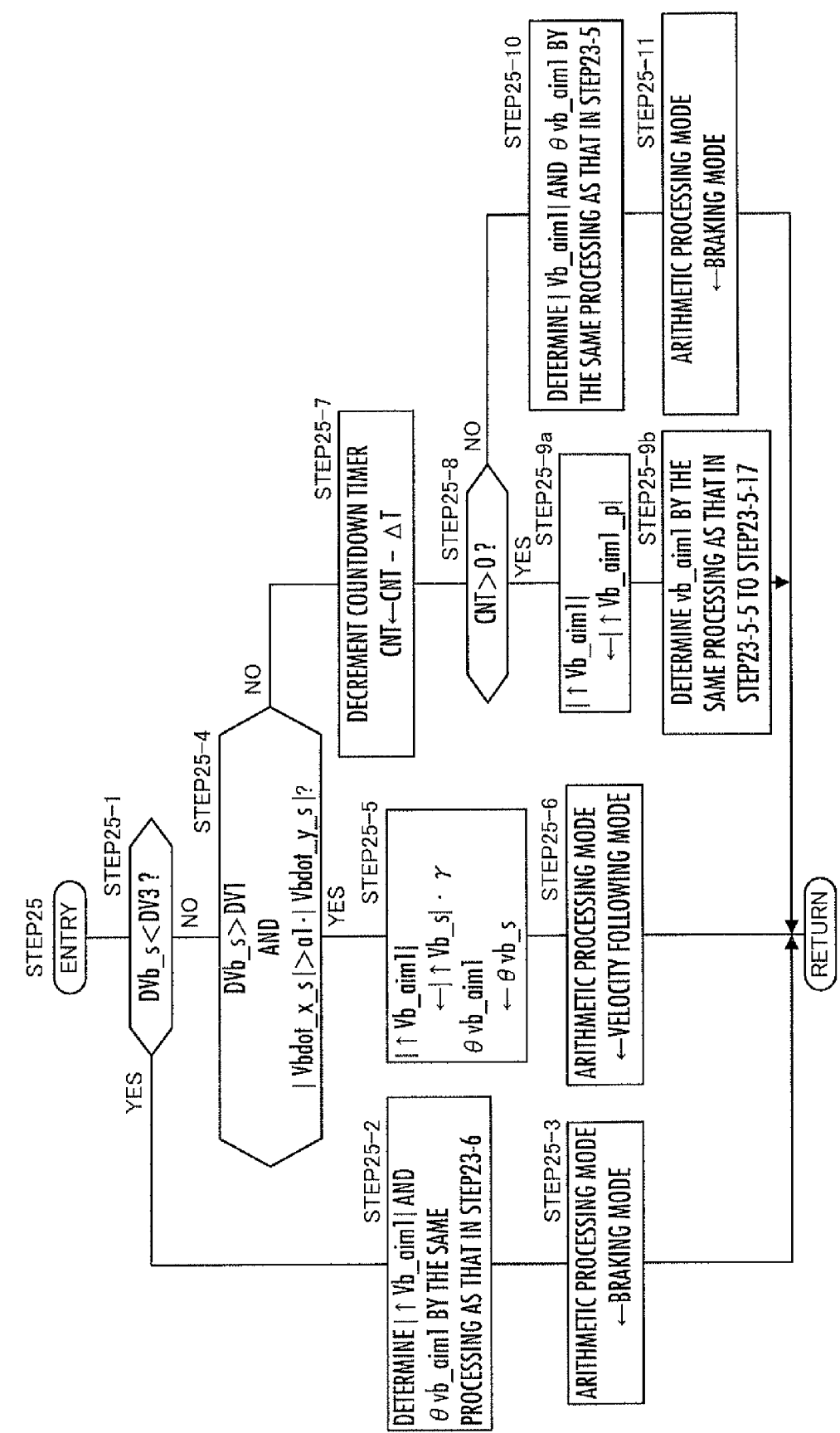

CONTROL DEVICE OF OMNIDIRECTIONAL VEHICLE

TECHNICAL FIELD

The present invention relates to a control device of an omnidirectional vehicle capable of moving in all directions on a floor surface.

BACKGROUND ART

As an omnidirectional vehicle capable of moving in all directions (all two-dimensional directions) on a floor surface, the ones disclosed in, for example, patent documents 1 and 2 have been proposed by the applicant of the present application. In the omnidirectional vehicle disclosed in these patent documents 1 and 2, a ball-shaped or wheel-shaped or crawler-shaped traveling motion unit capable of traveling in all directions on a floor surface while being in contact with the floor surface, and an actuator having an electric motor or the like that drives the traveling motion unit are mounted on a base body of the vehicle. The vehicle travels on the floor surface by driving the traveling motion unit by the actuator.

Further, as a technique for controlling the traveling motions of this type of omnidirectional vehicle, the technique disclosed in, for example, patent document 3 has been proposed by the applicant of the present application. According to the technique, the base body of the vehicle is provided such that a base body freely tilts longitudinally and laterally relative to a ball-shaped traveling motion unit. The vehicle is moved according to a tilting motion of the base body by measuring the tilt angle of the base body and by controlling the torque of an electric motor, which drives the traveling motion unit, so as to maintain the tilt angle at a predetermined angle.

PRIOR ART REFERENCES

Patent Documents

Patent document 1: Published PCT International Applications WO/2008/132778
Patent document 2: Published PCT International Applications WO/2008/132779
Patent document 3: U.S. Pat. No. 3,070,015

SUMMARY OF THE INVENTION

Problems to be Solved by the Invention

When controlling the travel of the omnidirectional vehicle disclosed in patent documents 1 and 2 or patent document 3, there are many situations wherein it is desired to gradually attenuate the traveling speed of the vehicle. For example, while the vehicle with an occupant aboard thereon is traveling, it is desirable to gradually attenuate the traveling speed of the vehicle when a request for accelerating the vehicle (a request for increasing the traveling speed of the vehicle) has been cleared.

In such a case, since the omnidirectional vehicle disclosed in patent documents 1 and 2 or patent document 3 is capable of traveling in all directions, the advancing direction thereof tends to vary due to the influences of disturbances attributable to the unevenness of a floor or the like. For this reason, there has been a demand for a technique that enhances the straight-line stability of the omnidirectional vehicle.

The present invention has been made with a view of the background described above, and it is an object of the invention to provide an omnidirectional vehicle capable of enhancing the straight-line stability.

Means for Solving the Problems

To fulfill the object, the control device of an omnidirectional vehicle in accordance with the present invention is a control device of an omnidirectional vehicle having a traveling motion unit capable of moving on a floor surface in all directions including a first direction and a second direction which are orthogonal to each other, an actuator which drives the traveling motion unit, and a base body on which the traveling motion unit and the actuator are mounted, comprising:

a desired velocity determining element which is a element that sequentially determines a desired velocity vector, which is a desired value of a velocity vector of a predetermined representative point of the vehicle and which carries out velocity attenuation processing, which is a processing for attenuating a magnitude of the desired velocity vector continuously or stepwise in a case where a predetermined condition holds; and a traveling motion unit control element which controls the motion of the traveling motion unit through the actuator on the basis of at least a desired velocity vector determined by the desired velocity determining element, wherein the desired velocity determining element includes a velocity direction adjusting element which determines a desired velocity vector such that the orientation of the desired velocity vector is brought closer to the first direction than to the orientation of an attenuation initial desired velocity vector, which is a desired velocity vector determined immediately before the execution of the velocity attenuation processing is started in a velocity attenuation period from the instant the execution of the velocity attenuation processing is begun to the instant the magnitude of the desired velocity vector is attenuated to zero in a case where the execution of the velocity attenuation processing is begun immediately after a desired velocity vector in an orientation that is different from the first direction is determined (a first aspect of the invention).

In the present invention, the traveling motion unit "being capable of moving in all directions, including the first direction and the second direction" means that the orientation of the velocity vector of the traveling motion unit at each instant observed in an axial direction orthogonal to the first direction and the second direction could take an orientation of an arbitrary angular orientation about the aforesaid axial direction when the traveling motion unit is driven by the actuator. In this case, the aforesaid axial direction is approximately a vertical direction or a direction perpendicular to a floor surface. Further, the term "orthogonal" in the present invention does not have to be orthogonal in a strict sense, and may slightly deviate from being orthogonal in the strict sense as long as it does not deviate from the nature of the present invention.

Further, in the present invention, the term "floor" will be used to include an outdoor ground surface or a road surface rather than meaning only a floor in an ordinary sense (e.g., an indoor floor).

According to the first aspect of the invention described above, the motion of the traveling motion unit is controlled by the traveling motion unit control element through the actuator on the basis of a desired velocity vector sequentially determined by the desired velocity determining element. In other words, the motion of the traveling motion unit is controlled such that the desired velocity vector of a representative point of the vehicle is achieved (such that the actual velocity vector of a representative point of the vehicle follows or approaches a desired velocity vector).

In this case, if the aforesaid predetermined condition holds, then the desired velocity determining element carries out the velocity attenuation processing. Further, if the execution of the velocity attenuation processing is begun immediately after a desired velocity vector in an orientation different from the first direction is determined, then the velocity direction adjusting element included in the desired velocity determining element determines the desired velocity vector such that the orientation of the desired velocity vector is brought closer to the first direction than to the orientation of an attenuation initial desired velocity vector, which is a desired velocity vector determined immediately before the velocity attenuation processing is started in a velocity attenuation period from the moment the velocity attenuation processing is begun to the moment the magnitude of the desired velocity vector is attenuated to zero.

Thus, according to the first aspect of the invention, the orientation of the desired velocity vector is brought closer to the first direction in the process of attenuating the magnitude of the desired velocity vector continuously or stepwise in a case where the predetermined condition holds immediately after the desired velocity vector in an orientation different from the first direction is determined and therefore the execution of the velocity attenuation processing is begun.

As a result, according to the first aspect of the invention, the orientation of the representative velocity vector will be automatically brought closer to the first direction in the process of attenuating the desired velocity vector of a representative point of the vehicle stepwise or continuously, i.e., attenuating the magnitude of the actual velocity vector of the representative point stepwise or continuously. This makes it possible to restrain the orientation of the velocity vector of a representative point of the vehicle from moving apart from the first direction, thus enhancing the straight-line stability of the vehicle to travel in the first direction.

Supplementally, in the first aspect of the invention, the term "attenuate stepwise" related to the magnitude of the desired velocity vector means the attenuation that includes an intermediate period for maintaining the magnitude of the desired velocity vector at a constant level. The period may be an initial period immediately following the start of the execution of the velocity attenuation processing.

Further, in the first aspect of the invention, as the predetermined condition, a condition related to, for example, the operational condition of the vehicle, the steering condition, or an environmental condition, may be adopted.

Further, in the first aspect of the invention, bringing the orientation of the desired velocity vector closer to the first direction in the velocity attenuation period may be carried out throughout the velocity attenuation period or during a partial period of the velocity attenuation period.

In a case where a payload supporting part for an occupant is mounted on the base body of the vehicle in the first aspect of the invention, preferably, the fore-and-aft direction of the occupant aboard the payload supporting part is set as the first direction, while the lateral direction of the occupant is set as the second direction (a second aspect of the invention).

According to the second aspect of the invention, in the process of attenuating the magnitude of the actual velocity vector of a representative point of the vehicle stepwise or continuously, the straight-line stability of the vehicle to travel in the fore-and-aft direction of the occupant on the payload supporting part will be enhanced. This makes it easy for the occupant to steer the vehicle.

In the first aspect or the second aspect of the invention described above, if the execution of the velocity attenuation processing is begun immediately after a desired velocity vector in an orientation different from the first direction is determined, then the velocity direction adjusting element may determine the desired velocity vector such that the orientation of the desired velocity vector is brought closer to the first direction than to the orientation of the attenuation initial desired velocity vector in the velocity attenuation period independently of the orientation of the attenuation initial desired velocity vector.

However, if the deviation of the orientation of the attenuation initial desired velocity vector from the first direction is relatively large, then bringing the desired velocity vector closer to the first direction in the velocity attenuation period may not be necessarily appropriate in some cases.

Therefore, in the first and the second aspects of the invention, preferably, the velocity direction adjusting element determines the desired velocity vector such that the orientation of the desired velocity vector is brought closer to the first direction than to the orientation of the attenuation initial desired velocity vector in the velocity attenuation period, provided that the angle on the acute angle side between the orientation of the attenuation initial desired velocity vector and the first direction is smaller than a predetermined angle value (a third aspect of the invention).

According to a third aspect of the invention, only if the angle on the acute angle side related to the orientation of the attenuation initial desired velocity vector is smaller than the predetermined angle value, that is, only if the orientation of the attenuation initial desired velocity vector is relatively close to the first direction, then the orientation of the desired velocity vector can be brought closer to the first direction in the velocity attenuation period.

Incidentally, the angle on the acute angle side related to the orientation of the attenuation initial desired velocity vector being smaller than the predetermined angle value means that, in other words, the ratio of the absolute value of a component of the second direction to the absolute value of a component of the first direction of the attenuation initial desired velocity vector is smaller than a predetermined ratio.

In the third aspect of the invention, in a case where the angle on the acute angle side between the orientation of the desired velocity vector determined immediately before the start of the execution of the velocity attenuation processing and the first direction is larger than the predetermined angle value, the desired velocity determining element preferably determines the desired velocity vector such that the orientation of the desired velocity vector is maintained at a constant state or brought closer to the second direction in the velocity attenuation period (a fourth aspect of the invention).

According to the fourth aspect of the invention, in a case where the angle on the acute angle side related to the orientation of the attenuation initial desired velocity vector is larger than the predetermined angle value, that is, in a case where there is a relatively large deviation of the orientation of the attenuation initial desired velocity vector from the first direction, the desired velocity vector is determined such that the orientation of the desired velocity vector is maintained at a constant level or brought closer to the second direction in the velocity attenuation period. This makes it possible to determine a desired velocity vector in an orientation suited to the orientation of the attenuation initial desired velocity vector in the velocity attenuation period.

In the first to the fourth aspects of the invention, the velocity attenuation processing is preferably, for example, processing that maintains the magnitude of the desired velocity vector at a constant level for a period of predetermined time from a start of the execution of the processing, and then continuously attenuates the magnitude of the desired velocity vector. In this case, the velocity direction adjusting element preferably determines the desired velocity vector such that the orientation of the desired velocity vector is continuously brought closer to the first direction at least during the period in which the magnitude of the desired velocity vector is continuously attenuated in the velocity attenuation period (a fifth aspect of the invention).

According to the fifth aspect of the invention, in the velocity attenuation period, the orientation of the desired velocity vector is continuously brought closer to the first direction while at the same time the magnitude of the desired velocity vector continuously attenuates, thus allowing the moving trajectory of the representative point of the vehicle to be a smooth trajectory in the velocity attenuation period.

In the fifth aspect, continuously bringing the orientation of the desired velocity vector close to the first direction may be carried out throughout the velocity attenuation period, including the period during which the magnitude of the desired velocity vector is maintained at a constant level.

In the first to the fifth aspects of the invention, preferably, an acceleration request determining element which determines whether an acceleration request, which is a request for increasing the magnitude of the velocity vector of the representative point is generated, is provided, and the desired velocity determining element carries out velocity increasing processing which determines the desired velocity vector such that the magnitude of the desired velocity vector is increased in the case where a determination result of the acceleration request determining element is affirmative, and determines the desired velocity vector by the velocity direction adjusting element in the case where the predetermined condition holds while the velocity increasing processing is being carried out (a sixth aspect of the invention).

According to the sixth aspect of the invention, if the determination result of the acceleration request determining element is affirmative, that is, if the acceleration request is generated, then the desired velocity vector is determined such that the magnitude of the desired velocity vector is increased by the velocity increasing processing. Thus, the magnitude of the velocity vector of a representative point of the vehicle can be increased as the acceleration request is generated. If the aforesaid predetermined condition holds while the velocity increasing processing is being executed (if the predetermined condition, including, for example, a condition that the determination result of the acceleration request determining element is negative, holds), then the execution of the velocity attenuation processing is started. This makes it possible to automatically attenuate the magnitude of the velocity vector of the representative point of the vehicle continuously or stepwise after accelerating the vehicle. Then, bringing the orientation of the desired velocity vector close to the first direction by the velocity direction adjusting element in the velocity attenuation period makes it possible to bring the moving direction of the representative point of the vehicle close to the first direction without the need for any special steering operation of the vehicle during automatic travel after accelerating the vehicle.

In the sixth aspect of the invention, if the vehicle is capable of increasing the magnitude of the velocity vector of the representative point according to an applied external force other than the propulsive force of the vehicle generated by driving the traveling motion unit by the actuator, then, for example, the following illustrative embodiment is preferable. The control device has a velocity change rate measuring element which generates an output based on a velocity change rate, which is the temporal change rate of the magnitude of an actual velocity vector of the representative point or a temporal change rate of the magnitude of a velocity component of the first direction of the velocity vector, wherein the acceleration request determining element determines whether the acceleration request has been generated on the basis of at least a measured value of the velocity change rate indicated by an output of the velocity change rate measuring element, and the desired velocity determining element starts the execution of the velocity attenuation processing, assuming that the predetermined condition holds in the case where the measured value of the velocity change rate becomes smaller than a predetermined threshold value while the velocity increasing processing is being carried out (a seventh aspect of the invention).

According to the seventh aspect of the invention, the acceleration request determining element determines whether the acceleration request has been generated on the basis of at least the measured value of the velocity change rate, thus making it possible to accomplish the determination on the basis of an actual operational state of the vehicle. This in turn makes it possible to carry out the velocity increasing processing on the basis of the actual operational state of the vehicle. Especially if the measured velocity change rate is the temporal change of the magnitude of a component of the first direction in an actual velocity vector of the representative point, then the velocity increasing processing can be started according to an actual motional state of the vehicle related to the first direction in the actual operational state of the vehicle.

Thus, by additionally applying the aforesaid external force to the vehicle, the magnitude of the velocity vector of the representative point of the vehicle can be smoothly increased according to the actual operational state of the vehicle.

Further, in the seventh aspect of the invention, if the measured value of the velocity change rate becomes smaller than a predetermined threshold value, then it is assumed that the predetermined condition holds and the velocity attenuation processing is carried out, so that the velocity attenuation processing can be started in a state wherein the need for increasing the magnitude of the velocity vector of the representative point of the vehicle has been cleared. This arrangement makes it possible to automatically attenuate the magnitude of the velocity vector of the representative point of the vehicle continuously or stepwise at an appropriate timing after the vehicle is accelerated. Further, in the velocity attenuation period during which the velocity attenuation processing is carried out, the processing carried out by the velocity direction adjusting element allows the moving direction of the representative point of the vehicle to approach the first direction.

Incidentally, in the seventh aspect of the invention, in the case where it is determined whether the acceleration request has been generated on the basis of at least the measured value of the velocity change rate, determining whether the acceleration request has been generated by determining, for example, whether the measured value of the velocity change rate has become larger than a predetermined threshold value is conceivable as a required condition (or adequately necessary condition) for determining that the acceleration request has been generated.

Further, in the seventh aspect of the invention, if the base body of the vehicle is provided with, for example, an occupant payload supporting part and if the payload supporting part is constructed to enable an occupant on the payload supporting part to place his/her foot on a floor as needed, then the occupant will be able to apply the aforesaid external force to the vehicle by kicking the floor with his/her foot. Alternatively, for example, an external force may be applied to the vehicle as appropriate by a worker or an assistant or an appropriate device outside the vehicle.

Supplementally, applying the present invention described above to, for example, an omnidirectional vehicle in which the occupant payload supporting part is installed to the base body such that the payload supporting part may be moved at angles with respect to the vertical direction about two axes, namely, about the axis in the first direction and about the axis in the second direction is considered as a preferred embodiment. In this case, for example, the overall center-of-gravity point combining the vehicle and the occupant aboard thereon may be used as the representative point of the vehicle. Preferably, for example, the manipulated variable component for converging the actual tilt angle of the payload supporting part to a predetermined desired angle and the manipulated variable component for converging the actual velocity vector of the aforesaid representative point (the center-of-gravity point) to the aforesaid desired velocity vector are added up to determine the manipulated variable for controlling the operation of the traveling motion unit (e.g., the desired acceleration of the traveling motion unit or the desired value of a force to be applied to the traveling motion unit), and the operation of the traveling motion unit is controlled through the aforesaid actuator on the basis of the determined manipulated variable.

BRIEF DESCRIPTION OF THE DRAWINGS

FIG. 20 is a flowchart illustrating the subroutine processing in STEP25 of FIG. 14; and FIG. 21 is a flowchart illustrating the subroutine processing in STEP25 of FIG. 14 in a second embodiment.

MODE FOR CARRYING OUT THE INVENTION

First Embodiment

The following will describe a first embodiment of the present invention. First, referring to FIG. 1 to FIG. 6, the structure of an omnidirectional vehicle in the present embodiment will be described.

Figure 1:
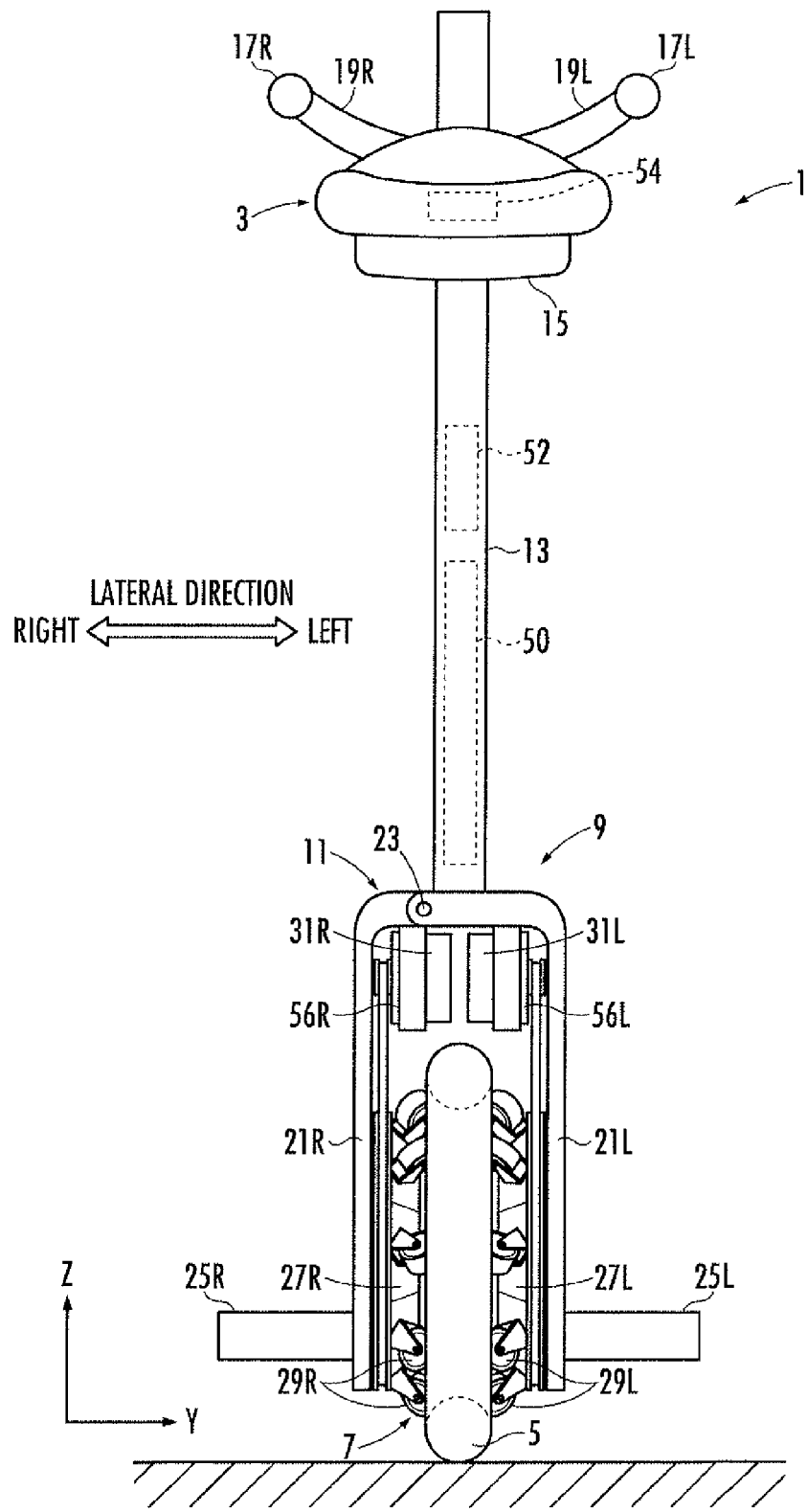
FIG. 1 is a front diagram of an omnidirectional vehicle according to an embodiment.
Figure 2:
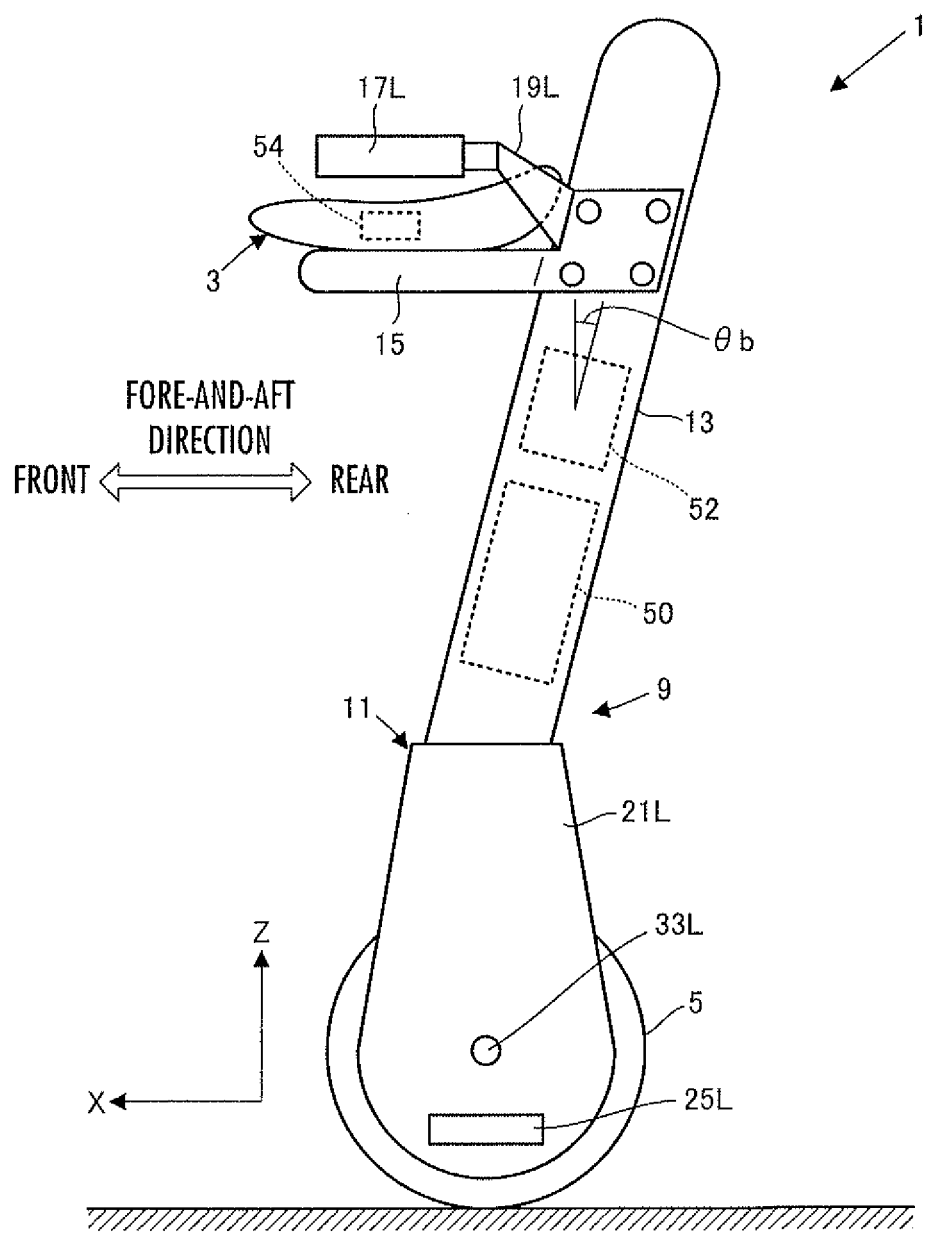
FIG. 2 is a side view of the omnidirectional vehicle according to the embodiment.

As illustrated in FIG. 1 and FIG. 2, an omnidirectional vehicle 1 in the present embodiment includes a payload support part 3 for an occupant (driver), a traveling motion unit 5 capable of traveling in all directions (two-dimensional all directions, including a fore-and-aft direction and a lateral direction) on a floor surface while being in contact with a floor surface, an actuator 7 which imparts, to the traveling motion unit 5, a motive power for driving the traveling motion unit 5, and a base body 9 on which the payload supporting part 3, the traveling motion unit 5, and the actuator 7 are mounted.

Here, in the description of the present embodiment, "the fore-and-aft direction" and "the lateral direction" mean the directions that coincide or substantially coincide with the fore-and-aft direction and the lateral direction, respectively, of the upper body of an occupant aboard the payload supporting part 3 in a normal posture. Incidentally, "the normal posture" is a posture envisaged in the design related to the payload supporting part 3, and it is a posture in which the trunk axis of the upper body of the occupant is oriented approximately in the vertical direction and the upper body is not twisted.

In this case, in FIG. 1, "the fore-and-aft direction" and "the lateral direction" are the direction perpendicular to the paper surface and the lateral direction of the paper surface, respectively. In FIG. 2, "the fore-and-aft direction" and "the lateral direction" are the lateral direction of the paper surface and the direction perpendicular to the paper surface, respectively. Further, in the description of the present embodiment, the suffixes "R" and "L" attached to reference numerals will be used to mean the correspondence to the right side and left side, respectively, of the vehicle 1.

The base body 9 is provided with a lower frame 11, to which the traveling motion unit 5 and the actuator 7 are installed, and a support frame 13 extendedly provided upward from the upper end of the lower frame 11.

A seat frame 15 extending toward the front from the support frame 13 is fixed to the top of the support frame 13. Further, the seat 3 on which an occupant sits is installed on the seat frame 15. In the present embodiment, the seat 3 serves as the payload supporting part for an occupant. Hence, the omnidirectional vehicle 1 in the present embodiment (hereinafter referred to simply as the vehicle 1) travels on a floor surface with an occupant seated on the seat 3.

Further, grips 17R and 17L to be grasped as necessary by the occupant seated on the seat 3 are disposed on the right and left of the seat 3. These grips 17R and 17L are secured to the distal portions of brackets 19R and 19L, respectively, which are provided extendedly from the support frame 13 (or the seat frame 15).

The lower frame 11 is provided with a pair of cover members 21R and 21L disposed to face each other in a forked shape with a gap therebetween in the lateral direction. The upper end portions (the forked portions) of these cover members 21R and 21L are connected through a hinge shaft 23 having a longitudinal axial center, so that one of the cover members 21R and 21L is relatively swingable about the hinge shaft 23 with respect to the other. In this case, the cover members 21R and 21L are biased by springs, which are not shown, in the direction in which the bottom end portions (the distal ends of the forked portions) of the cover members 21R and 21L narrow.

Further, a step 25R on which the occupant seated on the seat 3 rests his/her right foot and a step 25L on which the occupant rests his/her left foot are provided on the outer surfaces of the cover members 21R and 21L such that the steps extend out rightward and leftward, respectively.

The traveling motion unit 5 and the actuator 7 are disposed between the cover members 21R and 21L of the lower frame 11. The structures of the traveling motion unit 5 and the actuator 7 will be described with reference to FIG. 3 to FIG. 6.

The traveling motion unit 5 and the actuator 7 illustrated in the present embodiment have the same structures as those disclosed in, for example, FIG. 1 of patent document 2 mentioned above. Hence, in the description of the present embodiment, the aspects of the structures of the traveling motion unit 5 and the actuator 7 which are described in the aforesaid patent document 2 will be only briefly described.

In the present embodiment, the traveling motion unit 5 is a wheel assembly made of a rubber elastic material formed into an annular shape and has a substantially circular cross-sectional shape. This traveling motion unit 5 (hereinafter referred to as the wheel assembly 5) elastically deforms to be capable of rotating about a center C1 of the circular cross-section (more specifically, the circumferential line which passes the center C1 of the circular cross-section and which is concentric with the axial center of the wheel assembly 5), as indicated by an arrow Y1 in FIG. 5 and FIG. 6.

The wheel assembly 5 is disposed between the cover members 21R and 21L with an axial center C2 thereof (an axial center C2 orthogonal to the diametrical direction of the whole wheel assembly 5) oriented in the lateral direction, and comes in contact with a floor surface at the bottom end portion of the outer circumferential surface of the wheel assembly 5.

The wheel assembly 5 is capable of performing a motion of rotating about the axial center C2 of the wheel assembly as indicated by an arrow Y2 in FIG. 5 (a motion of circumrotating on a floor surface) and a motion of rotating about the center C1 of the cross-section of the wheel assembly 5 by being driven by the actuator 7 (to be discussed in detail later). As a result, the wheel assembly 5 is capable of traveling in all directions on a floor surface by the motions combining the aforesaid rotating motions.

The actuator 7 is provided with a rotating member 27R and free rollers 29R interposed between the wheel assembly 5 and the right cover member 21R, a rotating member 27L and free rollers 29L interposed between the wheel assembly 5 and the left cover member 21L, an electric motor 31R serving as an actuator disposed above the rotating member 27R and the free rollers 29R, and an electric motor 31L serving as an actuator disposed above the rotating member 27L and the free rollers 29L.

The housings of the electric motors 31R and 31L are installed to the cover members 21R and 21L, respectively. Although not shown, the electric sources (batteries or capacitors) of the electric motors 31R and 31L are mounted on an appropriate place of the base body 9, such as the support frame 13 or the like.

The rotating member 27R is rotatively supported by the cover member 21R through the intermediary of a support axis 33R having a lateral axial center. Similarly, the rotating member 27L is rotatively supported by the cover member 21L through the intermediary of a support axis 33L having a lateral axial center. In this case, the rotational axial center of the rotating member 27R (the axial center of the support axis 33R) and the rotational axial center of the rotating member 27L (the axial center of the support axis 33L) are concentric with each other.

Figure 3:
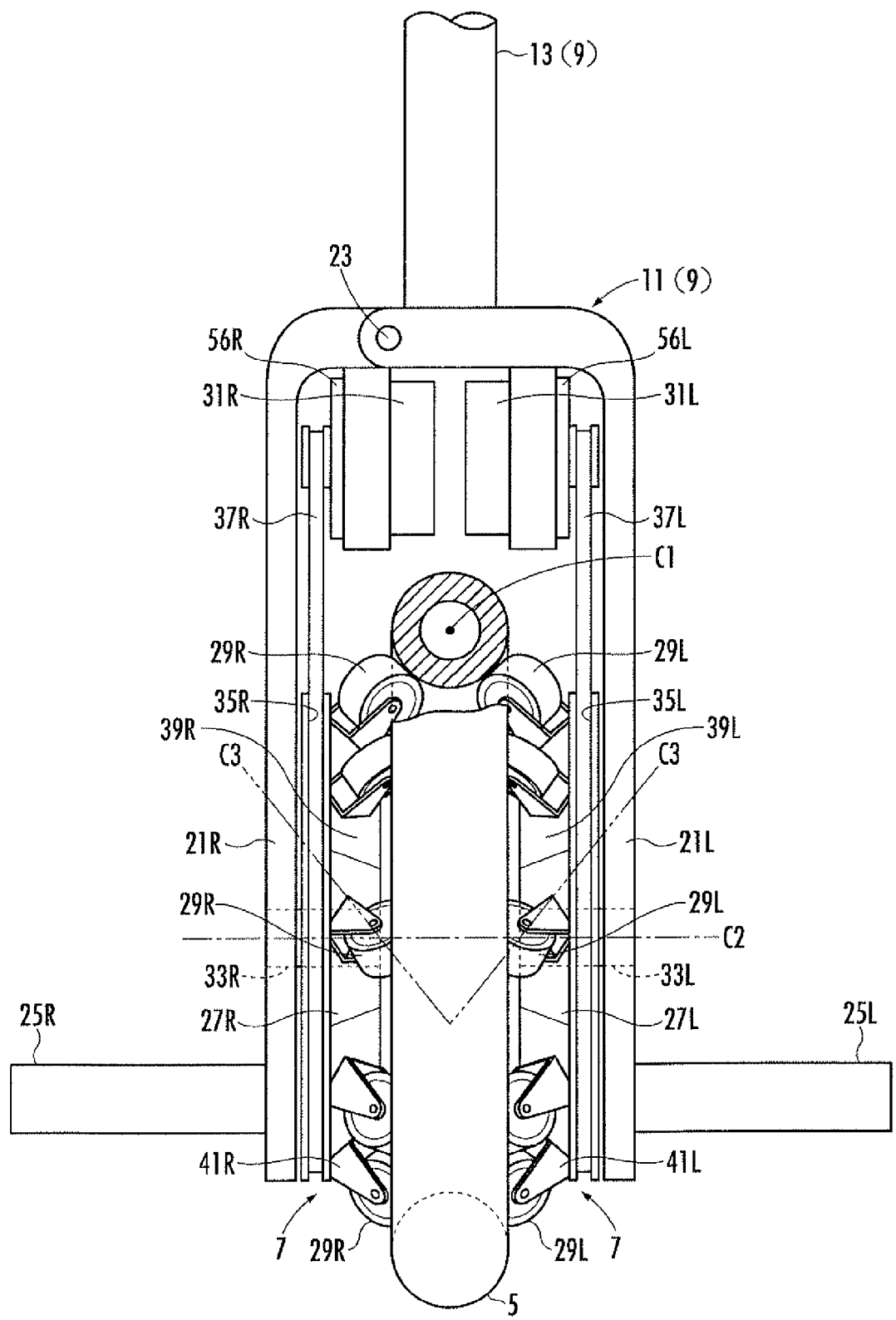
FIG. 3 is an enlarged view of a lower portion of the omnidirectional vehicle according to the embodiment.
Figure 4:
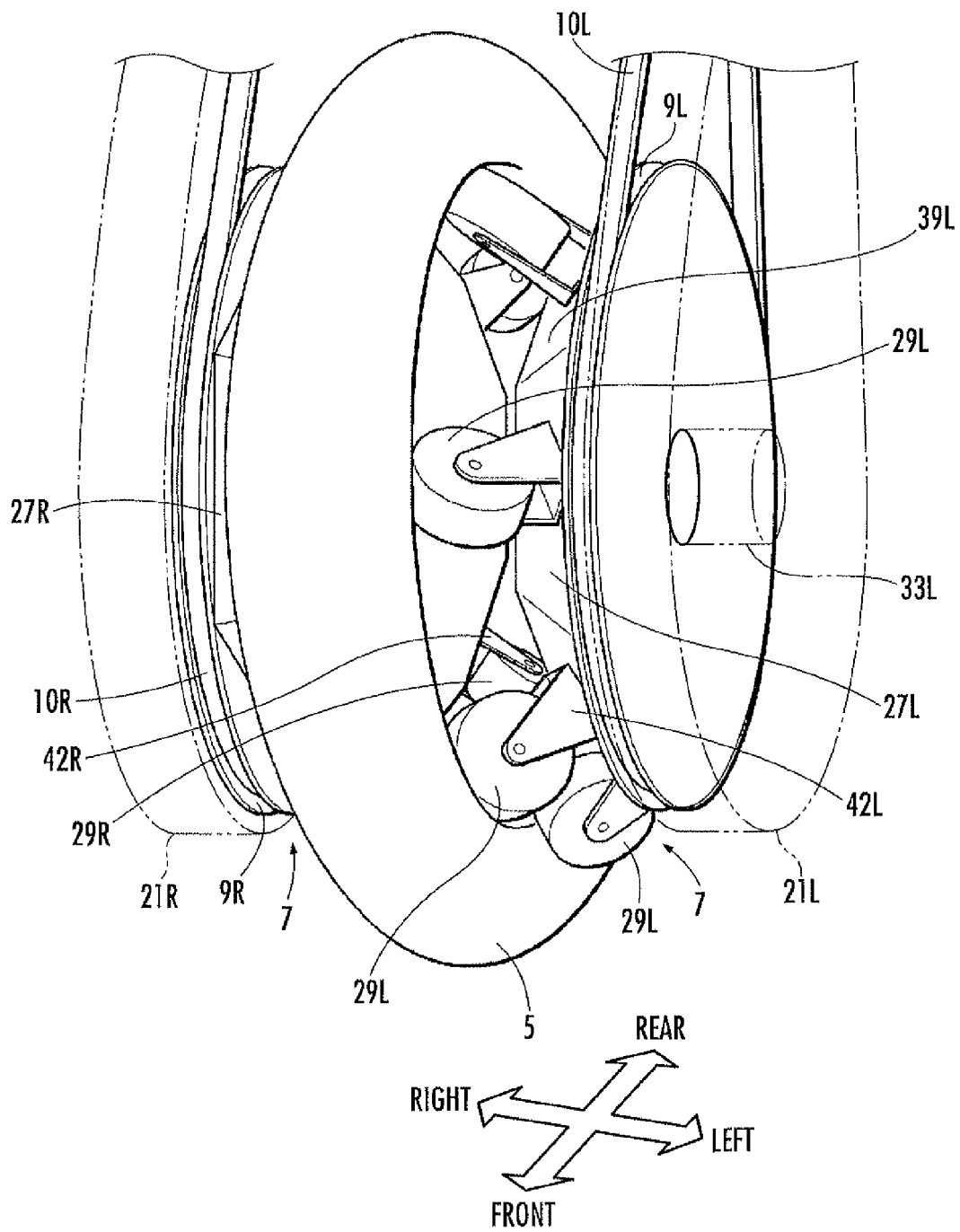
FIG. 4 is a perspective view of the lower portion of the omnidirectional vehicle according to the embodiment.

The rotating members 27R and 27L are connected to the output shafts of the electric motors 31R and 31L, respectively, through the intermediary of power transmission mechanisms, including functions as reducers, and rotatively driven by the motive power (torque) transmitted from the electric motors 31R and 31L, respectively. The power transmission mechanisms are, for example, pulley and belt system. More specifically, as illustrated in FIG. 3, the rotating member 27R is connected to the output shaft of the electric motor 31R through the intermediary of a pulley 35R and a belt 37R. Similarly, the rotating member 27L is connected to the output shaft of the electric motor 31L through the intermediary of a pulley 35L and a belt 37L.

Incidentally, the aforesaid power transmission mechanism may be constructed of, for example, a sprocket and a link chain, or may be constructed of a plurality of gears. As another alternative, for example, the electric motors 31R and 31L may be constructed such that the output shafts thereof are arranged to oppose the rotating members 27R and 27L so as to arrange the output shafts to be concentric with the rotating members 27R and 27L, and the output shafts of the electric motors 31R and 31L may be connected to the rotating members 27R and 27L, respectively, through the intermediary of reducers (e.g., planetary gear devices).

The rotating members 27R and 27L are formed in the same shapes as circular truncated cones, the diameters of which reduce toward the wheel assembly 5, and the outer peripheral surfaces thereof form tapered outer peripheral surfaces 39R and 39L.

A plurality of the free rollers 29R are arrayed about the tapered outer peripheral surface 39R of the rotating member 27R such that the free rollers 29R are arranged at regular intervals on the circumference concentric with the rotating member 27R. Further, these free rollers 29R are installed to the tapered outer peripheral surface 39R through the intermediary of the brackets 41R and rotatively supported by the brackets 41R.

Similarly, a plurality of free rollers 29L (of the same quantity as that of the free rollers 29R) are arrayed about the tapered outer peripheral surface 39L of the rotary member 27L such that the free rollers 29L are arrayed at regular intervals on the circumference concentric with the rotating member 27L. Further, these free rollers 29L are installed to the tapered outer peripheral surface 39L through the intermediary of the brackets 41L and rotatively supported by the brackets 41L.

The wheel assembly 5 is disposed concentrically with the rotating members 27R and 27L, and held between the free rollers 29R adjacent to the rotating member 27R and the free rollers 29L adjacent to the rotating member 27L.

Figure 6:
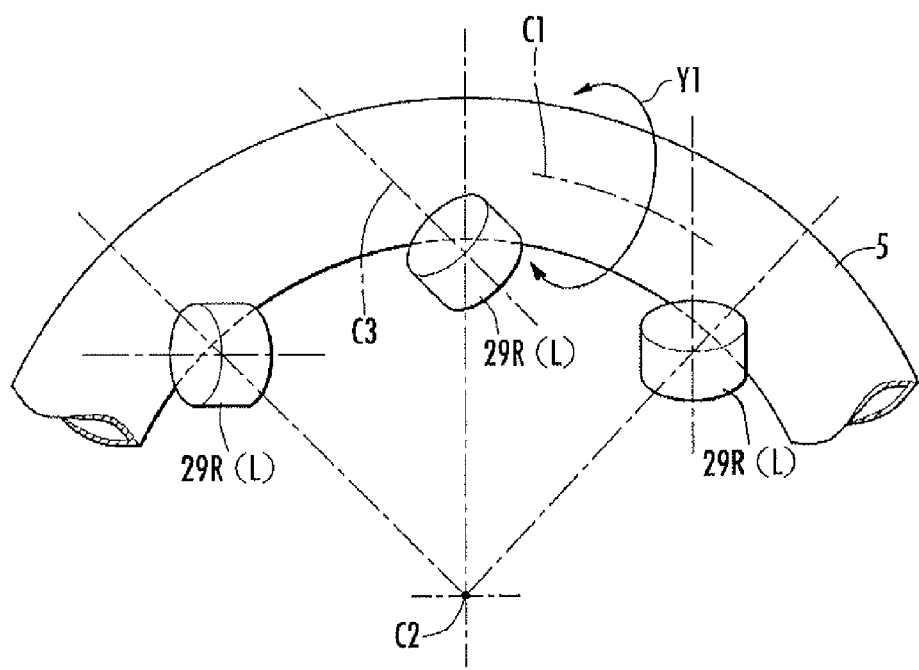
FIG. 6 is a diagram illustrating the placement relationship between the traveling motion unit (wheel unit) and free rollers of the omnidirectional vehicle according to the embodiment.

In this case, as illustrated in FIG. 1 and FIG. 6, the free rollers 29R and 29L are disposed in postures in which the axial centers C3 thereof are inclined against the axial center C2 of the wheel assembly 5 and also inclined against the diametrical direction of the wheel assembly 5 (the radial direction connecting the axial center C2 and the free rollers 29R and 29L when the wheel assembly 5 is observed in the direction of the axial center C2 thereof). Further, in the aforesaid postures, the outer peripheral surfaces of the free rollers 29R and 29L, respectively, are pressed into contact aslant with the inner peripheral surface of the wheel assembly 5.

More generally speaking, the right free rollers 29R are pressed into contact with the inner peripheral surface of the wheel assembly 5 in postures in which a frictional force component in the direction about the axial center C2 (a frictional force component in the tangential direction of the inner periphery of the wheel assembly 5) and a frictional force component in the direction about the center C1 of the cross-section of the wheel assembly 5 (a frictional force component in the tangential direction of the circular cross section) can be applied to the wheel assembly 5 at a surface in contact with the wheel assembly 5 when the rotating member 27R is rotatively driven about the axial center C2. The same applies to the left free rollers 29L.

In this case, as described above, the cover members 21R and 21L are biased by the springs, which are not shown, in the direction for narrowing the bottom end portions (the distal ends of the forked portions) of the cover members 21R and 21L. Thus, the urging force holds the wheel assembly 5 between the right free rollers 29R and the left free rollers 29L, and the free rollers 29R and 29L are maintained in the press contact with the wheel assembly 5 (more specifically, the press contact state that enables a frictional force to act between the free rollers 29R and 29L and the wheel assembly 5).

In the vehicle 1 having the structure described above, when the rotating members 27R and 27L are rotatively driven at the same velocity in the same direction by the electric motors 31R and 31L, respectively, the wheel assembly 5 will rotate about the axial center C2 in the same direction as those of the rotating members 27R and 27L. This causes the wheel assembly 5 to circumrotate on a floor surface in the fore-and-aft direction and the whole vehicle 1 will travel in the fore-and-aft direction. In this case, the wheel assembly 5 does not rotate about the center C1 of the cross-section thereof.

Further, if, for example, the rotating members 27R and 27L are rotatively driven in opposite directions from each other at velocities of the same magnitude, then the wheel assembly 5 will rotate about the center C1 of the cross section thereof. This causes the wheel assembly 5 to travel in the direction of the axial center C2 thereof (i.e., in the lateral direction), thus causing the whole vehicle 1 to travel in the lateral direction. In this case, the wheel assembly 5 does not rotate about the axial center C2 thereof.

Further, if the rotating members 27R and 27L are rotatively driven in the same direction or opposite directions at velocities that are different from each other (velocities including directions), then the wheel assembly 5 will rotate about the axial center C2 and also rotate about the center C1 of the cross-section thereof.

At this time, motions combining the aforesaid rotational motions (combined motions) cause the wheel assembly 5 to travel in directions inclined relative to the fore-and-aft direction and the lateral direction, thus causing the whole vehicle 1 to travel in the same direction as that of the wheel assembly 5. The traveling direction of the wheel assembly 5 in this case will change, depending upon the difference between the rotational velocities, including the rotational directions, of the rotating members 27R and 27L (the rotational velocity vectors, the polarities of which are defined according to rotational directions).

The traveling motions of the wheel assembly 5 effected as described above. Therefore, by controlling the rotational velocities (including the rotational directions) of the electric motors 31R and 31L, and consequently by controlling the rotational velocities of the rotating members 27R and 27L, it becomes possible to control the traveling velocity and the traveling direction of the vehicle 1.

Incidentally, the seat (the boarding portion) 3 and the base body 9 are tiltable about the lateral axial center C2, the axial center C2 of the wheel assembly 5 being the supporting point, and also tiltable together with the wheel assembly 5 about the longitudinal axis, the ground contact surface (the lower end surface) of the wheel assembly 5 being the supporting point.

The construction for controlling the operation of the vehicle 1 according to the present embodiment will now be described. In the following description, assuming an XYZ coordinate system, in which the longitudinal horizontal axis is indicated by an X-axis, the lateral horizontal axis is indicated by a Y-axis, and the vertical direction is indicated by a Z-axis, as illustrated in FIG. 1 and FIG. 2, the fore-and-aft direction and the lateral direction may be referred to as the X-axis direction and the Y-axis direction, respectively.

First, the control of the operation of the vehicle 1 will be outlined. According to the present embodiment, basically, if the occupant seated on the seat 3 tilts his/her upper body (more specifically, if the upper body is tilted such that the position of the overall center-of-gravity point combining the occupant and the vehicle 1 (the position projected onto a horizontal plane) is moved), then the base body 9 is tilted together with the seat 3 toward the side to which the upper body has been tilted. At this time, the traveling motion of the wheel assembly 5 is controlled such that the vehicle 1 travels toward the side to which the base body 9 has tilted. For example, if the occupant tilts his/her upper body forward, causing the base body 9 to tilt forward together with the seat 3, then the traveling motion of the wheel assembly 5 is controlled to cause the vehicle 1 to travel forward.

In other words, according to the present embodiment, the operation in which the occupant moves his/her upper body, causing the seat 3 and the base body 9 to tilt provides one basic steering operation for the vehicle 1 (a motion request of the vehicle 1), and the traveling motion of the wheel assembly 5 is controlled through the actuator 7 according to the steering operation.

Here, in the vehicle 1 according to the present embodiment, the ground contact surface of the wheel assembly 5 as the ground contact surface of the whole vehicle 1 will be a single local region which is smaller than a region resulting from projecting all the vehicle 1 and the occupant thereon onto a floor surface, and a floor reaction force will act only on the single local region. For this reason, in order to prevent the base body 9 from falling due to tilting, the wheel assembly 5 must be moved such that the overall center-of-gravity point of the occupant and the vehicle 1 is positioned substantially right above the ground contact surface of the wheel assembly 5.

Therefore, according to the present embodiment, the posture of the base body 9 in a state wherein the overall center-of-gravity point of the occupant and the vehicle 1 is positioned substantially right above the central point of the wheel assembly 5 (the central point on the axial center C2) (more precisely, in a state wherein the center-of-gravity point is positioned substantially right above the ground contact surface of the wheel assembly 5) is defined as a desired posture, and basically, the traveling motion of the wheel assembly 5 is controlled such that the actual posture of the base body 9 is converged to the desired posture.

Further, when starting the vehicle 1 and the like, if, for example, an occupant kicks a floor with his/her foot as necessary thereby to apply a propulsive force (a propulsive force produced by the force of friction between the foot of the occupant and the floor) for increasing the traveling velocity of the vehicle 1 as an additional external force in addition to the propulsive force supplied by the actuator 7 to the vehicle 1, then the traveling motion of the wheel assembly 5 is controlled such that the traveling velocity of the vehicle 1 (more precisely, the moving velocity of the overall center-of-gravity point of the occupant and the vehicle) increases accordingly. In a state wherein the addition of the aforesaid propulsive force is stopped, the traveling motion of the wheel assembly 5 is controlled (the control for braking the wheel assembly 5 is carried out) such that the traveling velocity of the vehicle 1 will be temporarily maintained at a constant velocity and then attenuate until the vehicle 1 comes to a halt.

Further, in a state wherein no occupant is aboard the vehicle 1, the posture of the base body 9 in a state which the center-of-gravity point of the vehicle 1 alone is positioned substantially right above the central point of the wheel assembly 5 (the central point on the axial center C2) (more precisely, a state wherein the center-of-gravity point is positioned substantially right above the ground contact surface of the wheel assembly 5) is defined as a desired posture, and the actual posture of the base body 9 is converged to the desired posture. Thus, the traveling motion of the wheel assembly 5 is controlled such that the vehicle 1 supports itself without causing the base body 9 to fall from tilting.

Supplementally, "the posture" means a spatial orientation. In the present embodiment, when the base body 9 tilts together with the seat 3, the postures of the base body 9 and the seat 3 change. Further, in the present embodiment, the base body 9 and the seat 3 integrally tilt, so that converging the posture of the base body 9 to the desired posture is equivalent to converging the posture of the seat 3 to a desired posture associated with the seat 3 (the posture of the seat 3 in a state wherein the posture of the base body 9 coincides with a desired posture of the base body 9).

According to the present embodiment, in order to control the operation of the vehicle 1 as described above, a control unit 50 constituted of an electronic circuit unit which mainly includes a microcomputer and a drive circuit unit for the electric motors 31R and 31L, a tilt sensor 52 for measuring a tilt angle θb relative to the vertical direction (the gravitational direction) of a predetermined portion of the base body 9 and a changing velocity thereof (=dθb/dt), a load sensor 54 for detecting whether or not an occupant is aboard the vehicle 1, and rotary encoders 56R and 56L serving as angle sensors for detecting the rotational angles and the rotational angular velocities of the output shafts of the electric motors 31R and 31L, respectively, are mounted at appropriate places of the vehicle 1, as illustrated in FIG. 1 and FIG. 2.

In this case, the control unit 50 and the tilt sensor 52 are installed to the support frame 13 by, for example, being accommodated in the support frame 13 of the base body 9. Further, the load sensor 54 is incorporated in the seat 3. Further, the rotary encoders 56R and 56L are provided integrally with the electric motors 31R and 31L. The rotary encoders 56R and 56L may alternatively be attached to the rotating members 27R and 27L, respectively.

More specifically, the aforesaid tilt sensor 52 is constructed of an acceleration sensor and a rate sensor (angular velocity sensor), such as a gyro sensor, and outputs detection signals of these sensors to the control unit 50. Then, the control unit 50 carries out predetermined measurement arithmetic processing (this may be publicly known arithmetic processing) on the basis of the outputs of the acceleration sensor and the rate sensor of the tilt sensor 52 thereby to calculate the measured value of the tilt angle θb of the portion, to which the tilt sensor 52 is installed (the support frame 13 in the present embodiment), relative to the vertical direction and the measured value of the tilt angular velocity θbdot, which is a change rate (differential value) thereof.

In this case, to be more specific, the tilt angle θb to be measured (hereinafter referred to a base body tilt angle θb in some cases) is constituted of a component in the direction about the Y-axis (a pitch direction) θb_x and a component in the direction about the X-axis (a roll direction) θb_y. Similarly, the tilt angular velocity θbdot to be measured (hereinafter referred to a base body tilt angular velocity θbdot in some cases) is constituted of a component in the direction about the Y-axis (the pitch direction) θbdot_x (=dθb_x/dt) and a component in the direction about the X-axis (the roll direction) θbdot_y (=dθb_y/dt).

Supplementally, according to the present embodiment, the seat 3 tilts integrally with the support frame 13 of the base body 9, so that the base body tilt angle θb also has a meaning as the tilt angle of the payload supporting part 3.

In the description of the present embodiment, regarding variables, such as a motional state amount having components in directions of the X-axis and the Y-axis, such as the aforesaid base body tilt angle θb (or directions about axes), or variables, such as coefficients related to the motional state amount, the reference characters of the variables will be accompanied by a suffix "_x" or "_y" to distinguishably denote the components.

In this case, for the variables related to translational motions, such as a translational velocity, a component in the X-axis direction thereof will be accompanied by the suffix "_x" and a component in the Y-axis direction thereof will be accompanied by the suffix "_y."

Meanwhile, regarding the variables related to rotational motions, such as angles, rotational velocities (angular velocities), and angular acceleration, for the purpose of convenience, a component in the direction about the Y-axis will be accompanied by the suffix "_x" and a component in the direction about the X-axis will be accompanied by the suffix "_y" in order to match the variables related to translational motions with suffixes.

Further, to denote a variable in the form of a pair of a component in the X-axis direction (or a component in the direction about the Y-axis) and a component in the Y-axis direction (or a component in the direction about the X-axis), the suffix "_xy" is added to the reference character of the variable. For example, to express the aforesaid base body tilt angle θb in the form of the pair of a component in the direction about the Y-axis θb_x and a component in the direction about the X-axis θb_y, the pair will be denoted by "the base body tilt angle θb_xy."

The load sensor 54 is incorporated in the seat 3 so as to be subjected to a load from the weight of an occupant when the occupant sits on the seat 3, and outputs a detection signal based on the load to the control unit 50. Then, the control unit 50 determines whether or not the occupant is aboard the vehicle 1 on the basis of the measured value of the load indicated by the output of the load sensor 54.

In place of the load sensor 54, a switch type sensor which, for example, turns on when an occupant sits on the seat 3 may be used.

The rotary encoder 56R generates a pulse signal each time the output shaft of the electric motor 31R rotates for a predetermined angle, and outputs the pulse signal to the control unit 50. Then, based on the pulse signal, the control unit 50 measures the rotational angle of the output shaft of the electric motor 53R and further measures the temporal change rate (differential value) of the measured value of the rotational angle as the rotational angular velocity of the electric motor 53R. The same applies to the rotary encoder 56L for the electric motor 31L.

The control unit 50 carries out predetermined arithmetic processing by using the aforesaid measured values thereby to determine velocity commands, which are the desired values of the rotational angular velocities of the electric motors 31R and 31L, respectively, and carries out feedback control on the rotational angular velocity of each of the electric motors 31R and 31L according to the determined velocity commands.

Incidentally, the relationship between the rotational angular velocity of the output shaft of the electric motor 31R and the rotational angular velocity of the rotating member 27R will be a proportional relationship based on the speed reduction ratio of a fixed value between the output shaft and the rotating member 27R. Hence, for the sake of convenience, in the description of the present embodiment, the rotational angular velocity of the electric motor 31R will mean the rotational angular velocity of the rotating member 27R. Similarly, the rotational angular velocity of the electric motor 31L will mean the rotational angular velocity of the rotating member 27L.

The following will describe in more detail the control processing carried out by the control unit 50.

Figure 7:
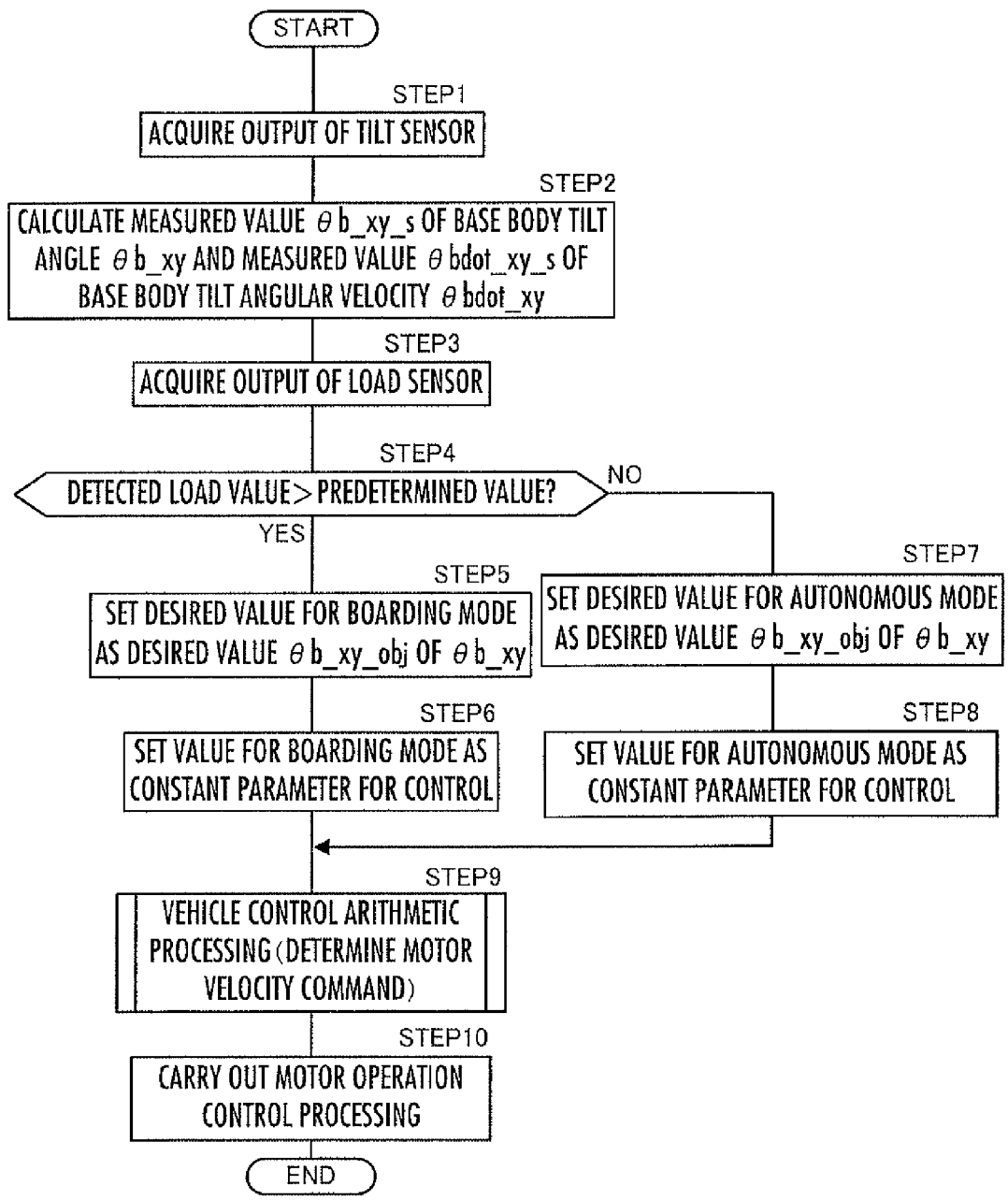
FIG. 7 is a flowchart illustrating the processing by a control unit of the omnidirectional vehicle according to the embodiment.

The control unit 50 executes the processing (main routine processing) illustrated by the flowchart of FIG. 7 at a predetermined control processing cycle.

First, in STEP1, the control unit 50 acquires an output of a tilt sensor 52.

Subsequently, the control unit 50 proceeds to STEP2 to calculate a measured value $\theta b\_xy\_s$ of a base body tilt angle $\theta b$ and a measured value $\theta bdot\_xy\_s$ of a base body tilt angular velocity $\theta bdot$ on the basis of the acquired output of the tilt sensor 52.

In the following description, to denote the observed value (the measured value or an estimated value) of an actual value of a variable (a state amount), such as the aforesaid measured value $\theta b\_xy\_s$ of the base body tilt angle $\theta b$, by a reference character, the reference character of the variable will have a suffix "_s".

Next, after acquiring an output of a load sensor 54 in STEP3, the control unit 50 carries out the determination processing in STEP4. In the determination processing, the control unit 50 determines whether or not the vehicle 1 has an occupant aboard (whether or not an occupant is sitting on the seat 3) by determining whether or not the load measured value indicated by the acquired output of the load sensor 54 is larger than a predetermined value which has been set beforehand.

Then, if the determination result in STEP4 is affirmative, then the control unit 50 carries out the processing for setting a desired value $\theta b\_xy\_obj$ of the base body tilt angle $\theta b$ and the processing for setting the values of constant parameters (e.g., the basic values of various gains) for controlling the operation of the vehicle 1 in STEP5 and STEP6, respectively.

In STEP5, the control unit 50 sets a predetermined desired value for a boarding mode as the desired value $\theta b\_xy\_obj$ of the base body tilt angle $\theta b$.

Here, the term "boarding mode" means the operation mode of the vehicle 1 in the case where the occupant is aboard the vehicle 1. The desired value $\theta b\_xy\_obj$ for the boarding mode is preset such that desired value $\theta b\_xy\_obj$ coincides or substantially coincides with the measured value $\theta b\_xy\_s$ of the base body tilt angle $\theta b$ measured on the basis of an output of the tilt sensor 52 in a posture of the base body 9 in which the overall center-of-gravity point of the vehicle 1 and the occupant seated on the seat 3 (hereinafter referred to as the vehicle-occupant overall center-of-gravity point) is positioned substantially right above a ground contact surface of the wheel assembly 5.

Further, in STEP6, the control unit 50 sets predetermined values for the boarding mode as the values of constant parameters for controlling the operation of the vehicle 1. The constant parameters include, for example, hx, hy, Ki_a_x, Ki_b_x, Ki_a_y, and Ki_b_y (i=1, 2, 3), which will be discussed later.

Meanwhile, if the determination result in STEP4 is negative, then the control unit 50 carries out the processing for setting a desired value $\theta b\_xy\_obj$ of a base body tilt angle $\theta b\_xy$ and the processing for setting the values of constant parameters for controlling the operation of the vehicle 1 in STEP7 and STEP8, respectively.

In STEP7, the control unit 50 sets a predetermined desired value for an autonomous mode as the desired value $\theta b\_xy\_obj$ of the base body tilt angle $\theta b$.

Here, the term "autonomous mode" means an operation mode of the vehicle 1 in the case where the occupant is not aboard the vehicle 1. The desired value $\theta b\_xy\_obj$ for the autonomous mode is preset such that desired value $\theta b\_xy\_obj$ coincides or substantially coincides with the measured value $\theta b\_xy\_s$ of the base body tilt angle $\theta b$ measured on the basis of an output of the tilt sensor 52 in a posture of the base body 9 in which the center-of-gravity point of the vehicle 1 alone (hereinafter referred to as the vehicle-alone center-of-gravity point) is positioned substantially right above the ground contact surface of the wheel assembly 5. The desired value $\theta b\_xy\_obj$ for the autonomous mode is generally different from the desired value $\theta b\_xy\_obj$ for the boarding mode.

Further, in STEP8, the control unit 50 sets predetermined values for the autonomous mode as the values of constant parameters for controlling the operation of the vehicle 1. The values of the constant parameters for the autonomous mode are different from the values of the constant parameters for the boarding mode.

The aforesaid values of the constant parameters are set to be different between the boarding mode and the autonomous mode, because the response characteristics of the operations of the vehicle 1 relative to control inputs are different from each other due to the differences in the height of the aforesaid center-of-gravity point, the overall mass, and the like between the respective modes.

By the processing in STEP4 to STEP8 described above, the desired value $\theta b\_xy\_obj$ of the base body tilt angle $\theta b\_xy$ and the values of the constant parameters are set for each of the operational modes, namely, the boarding mode and the autonomous mode.

Incidentally, the processing in STEP5 and STEP6 or the processing in STEP7 and STEP8 is not essential to carry out for each control processing cycle. Alternatively, the processing may be carried out only when the determination result in STEP4 changes.

Supplementally, in both the boarding mode and the autonomous mode, the desired value of a component $\theta bdot\_x$ in the direction about a Y-axis of the base body tilt angular velocity θbdot and the desired value of a component θbdot_y in the direction about an X-axis thereof are both zero. For this reason, it is unnecessary to carry out the processing for setting a desired value of the base body tilt angular velocity θbdot_xy.

After carrying out the processing in STEP5 and STEP6 or the processing in STEP7 and STEP8 as described above, the control unit 50 carries out vehicle control arithmetic processing in STEP9 thereby to determine the speed commands for electric motors 31R and 31L, respectively. The vehicle control arithmetic processing will be discussed later in detail.

Subsequently, the control unit 50 proceeds to STEP10 to carry out the processing for controlling the operations of the electric motors 31R and 31L according to the speed commands determined in STEP9. In this operation control processing, based on the difference between the speed command for the electric motor 31R determined in STEP9 and the measured value of the rotational speed of the electric motor 31R measured on the basis of an output of a rotary encoder 56R, the control unit 50 determines a desired value (desired torque) of an output torque of the electric motor 31R such that the difference is converged to zero. Then, the control unit 50 controls the current supplied to the electric motor 31R such that the electric motor 31R outputs an output torque of the desired torque. The same applies to the operation control of the left electric motor 31L.

The above has described the general control processing carried out by the control unit 50.

The vehicle control arithmetic processing in STEP9 mentioned above will now be described in detail.

In the following description, the vehicle-occupant overall center-of-gravity point in the boarding mode and the vehicle-alone center-of-gravity point in the autonomous mode will be generically referred to as the vehicle system center-of-gravity point. The vehicle system center-of-gravity point will mean the vehicle-occupant overall center-of-gravity point when the operational mode of the vehicle 1 is the boarding mode and will mean the vehicle-alone center-of-gravity point when the operational mode of the vehicle 1 is the autonomous mode.

Further, in the following description, regarding the values (updated values) determined at each control processing cycle by the control unit 50, a value determined at a current (latest) control processing cycle may be referred to as a current value, and a value determined at an immediately preceding control processing cycle may be referred to as a previous value. Further, a value will mean a current value unless otherwise specified as a current value or a previous value.

Further, regarding the velocity and acceleration in the X-axis direction, a forward-facing direction will be defined as a positive direction, and regarding the velocity and acceleration in the Y-axis direction, a left-facing direction will be defined as the positive direction.

Figure 8:
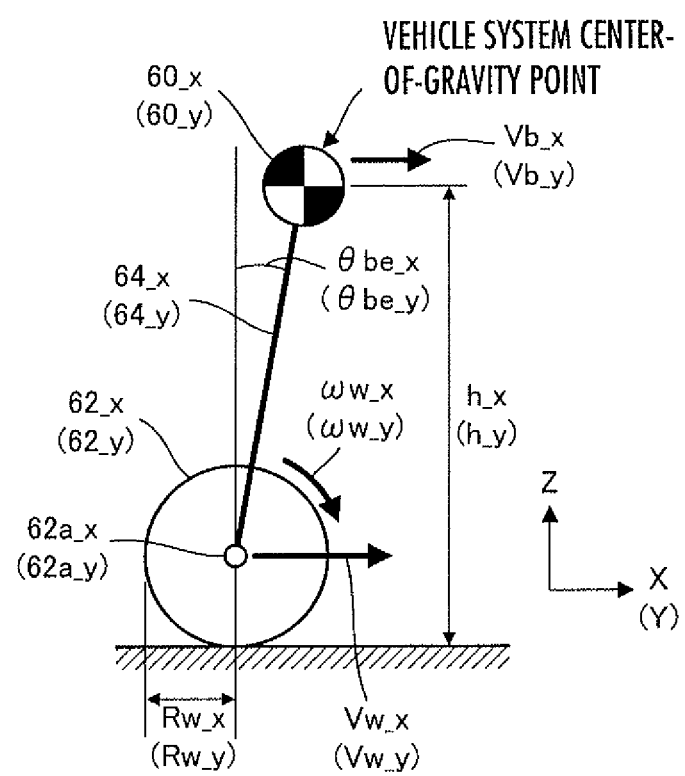
FIG. 8 is a diagram illustrating an inverted pendulum model expressing the dynamic behaviors of the omnidirectional vehicle according to the embodiment.

In the present embodiment, the vehicle control arithmetic processing in STEP9 is carried out, assuming that the dynamic behaviors of the vehicle system center-of-gravity point (more specifically, the behaviors observed by projecting the behaviors from the Y-axis direction onto a plane (XZ plane) which is orthogonal thereto, and the behaviors observed by projecting the behaviors from the X-axis direction onto a plane (YZ plane) which is orthogonal thereto) are approximately expressed by the behaviors of an inverted pendulum model (dynamic behaviors of the inverted pendulum), as shown in FIG. 8.

In FIG. 8, unparenthesized reference numerals denote the reference numerals associated with the inverted pendulum model observed from the Y-axis direction, while the parenthesized reference numerals denote the reference numerals associated with the inverted pendulum model observed from the X-axis direction.

In this case, the inverted pendulum model expressing a behavior observed from the Y-axis direction is provided with a mass point 60_x positioned at the vehicle system center-of-gravity point and a imaginary wheel 62_x, which has a rotational axis 62a_x parallel to the Y-axis direction and which freely circumrotate on a floor surface (hereinafter referred to as the imaginary wheel 62_x). Further, the mass point 60_x is supported by a rotational shaft 62a_x of the imaginary wheel 62_x through the intermediary of a linear rod 64_x such that the mass point 60_x is swingable about the rotational shaft 62a_x, using the rotational shaft 62a_x as the supporting point.

In this inverted pendulum model, a motion of the mass point 60_x corresponds to a motion of the vehicle system center-of-gravity point observed from the Y-axis direction. Further, it is assumed that the tilt angle θbe_x of the rod 64_x relative to a vertical direction coincides with a difference θbe_x_s between a base body tilt angle measured value θb_x_s in the direction about the Y-axis and a base body tilt angle desired value θb_x_obj (=θb_x_s−θb_x_obj). It is also assumed that a changing velocity of the tilt angle θbe_x of the rod 64_x (=dθbe_x/dt) coincides with a base body tilt angular velocity measured value θbdot_x_s in the direction about the Y-axis. Further, it is assumed that a moving velocity Vw_x of the imaginary wheel 62_x (the translational moving velocity in the X-axis direction) coincides with the moving velocity of the wheel assembly 5 of the vehicle 1 in the X-axis direction.

Similarly, the inverted pendulum model expressing a behavior observed from the X-axis direction (refer to the parenthesized reference numerals in FIG. 8) is provided with a mass point 60_y positioned at the vehicle system center-of-gravity point and a imaginary wheel 62_y, which has a rotational axis 62a_y parallel to the X-axis direction and which freely circumrotate on a floor surface (hereinafter referred to as the imaginary wheel 62_y). Further, the mass point 60_y is supported by a rotational shaft 62a_y of the imaginary wheel 62_y through the intermediary of a linear rod 64_y such that the mass point 60_y is swingable about the rotational shaft 62a_y, using the rotational shaft 62a_y as the supporting point.

In this inverted pendulum model, a motion of the mass point 60_y corresponds to a motion of the vehicle system center-of-gravity point observed from the X-axis direction. Further, it is assumed that the tilt angle θbe_y of the rod 64_y relative to the vertical direction coincides with a difference θbe_y_s between a base body tilt angle measured value θb_y_s in the direction about the X-axis and a base body tilt angle desired value θb_y_obj (=θb_y_s−θb_y_obj). It is also assumed that a changing velocity of the tilt angle θbe_y of the rod 64_y (=θbe_y/dt) coincides with a base body tilt angular velocity measured value θbdot_y_s in the direction about the X-axis. Further, it is assumed that a moving velocity Vw_y of the imaginary wheel 62_y (the translational moving velocity in the Y-axis direction) coincides with the moving velocity of the wheel assembly 5 of the vehicle 1 in the Y-axis direction.

It is assumed that the imaginary wheels 62_x and 62_y have radii Rw_x and Rw_y of predetermined values, respectively.

It is assumed that relationships represented by expressions 01a and 01b given below hold between rotational angular velocities ωw_x and ωw_y of the imaginary wheels 62_x and 62_y, respectively, and rotational angular velocities ω_R and ω_L of the electric motors 31R and 31L, respectively (more accurately, the rotational angular velocities ω_R and ω_L of rotational members 27R and 27L, respectively).

$$\omega w\_x = (\omega\_R + \omega\_L)/2 \quad \text{Expression 01a}$$

$$\omega w\_y = C \cdot (\omega\_R - \omega\_L)/2 \quad \text{Expression 01b}$$

where "C" in expression 01b denotes a coefficient of a predetermined value that depends on a mechanical relationship or slippage between free rollers 29R and 29L and the wheel assembly 5. The positive directions of ωw_x, ω_R and ω_L are the directions in which the imaginary wheel 62_x rotates in the case where the imaginary wheel 62_x circumrotates forward. The positive direction of ωw_y is the direction in which the imaginary wheel 62_y rotates in the case where the imaginary wheel 62_y circumrotates leftwards.

Here, the dynamics of the inverted pendulum model shown in FIG. 8 is represented by expressions 03x and 03y given below. Expression 03x is an expression that represents the dynamics of the inverted pendulum model observed from the Y-axis direction, while expression 03y is an expression that represents the dynamics of the inverted pendulum model observed from the X-axis direction.

$$d^2\theta be\_x/dt^2 = \alpha\_x \cdot \theta be\_x + \beta\_x \cdot \omega wdot\_x \quad \text{Expression 03x}$$

$$d^2\theta be\_y/dt^2 = \alpha\_y \cdot \theta be\_y + \beta\_y \cdot \omega wdot\_y \quad \text{Expression 03y}$$

where ωwdot_x in expression 03x denotes the rotational angular acceleration (first-order differential value of the rotational angular velocity ωw_x) of the imaginary wheel 62_x, α_x denotes a coefficient which depends on a mass or a height h_x of the mass point 60_x, and β_x denotes a coefficient which depends on an inertia (inertial moment) or the radius Rw_x of the imaginary wheel 62_x. The same applies to ωwdot_y, α_y, and β_y in expression 03y.

As may be understood from these expressions 03x and 03y, the motions of the mass points 60_x and 60_y of the inverted pendulum model (i.e., the motions of the vehicle system center-of-gravity point) are specified, depending on the rotational angular acceleration ωwdot_x of the imaginary wheel 62_x and the rotational angular acceleration ωwdot_y of the imaginary wheel 62_y, respectively.

In the present embodiment, therefore, the rotational angular acceleration ωwdot_x of the imaginary wheel 62_x is used as the manipulated variable (control input) for controlling the motion of the vehicle system center-of-gravity point observed from the Y-axis direction, while the rotational angular acceleration ωwdot_y of the imaginary wheel 62_y is used as the manipulated variable (control input) for controlling the motion of the vehicle system center-of-gravity point observed from the X-axis direction.

To briefly describe the vehicle control arithmetic processing in STEP9, the control unit 50 determines imaginary wheel rotational angular acceleration commands ωwdot_x_cmd and ωwdot_y_cmd, which are the command values (desired values) of the rotational angular accelerations ωwdot_x and ωwdot_y as the manipulated variables such that the motion of the mass point 60_x observed in the X-axis direction and the motion of the mass point 60_≤y observed in the Y-axis direction become the motions corresponding to desired motions of the vehicle system center-of-gravity point. Further, the control unit 50 determines the values obtained by integrating the imaginary wheel rotational angular acceleration commands ωwdot_x_cmd and ωwdot_y_cmd, respectively, as the imaginary wheel rotational angular velocity commands ωw_x_cmd and ωw_y_cmd, which are the command values (desired values) of the rotational angular velocities ωw_x and ωw_y of the imaginary wheels 62_x and 62_y, respectively.

Further, the control unit 50 defines the moving velocity of the imaginary wheel 62_x corresponding to the imaginary wheel rotational angular velocity command ωw_x_cmd (=Rw_x·ωw_x_cmd) and the moving velocity of the imaginary wheel 62_y corresponding to the imaginary wheel rotational angular velocity command ωw_y_cmd (=Rw_y·ωw_y_cmd) as the desired moving velocity of the wheel assembly 5 of the vehicle 1 in the X-axis direction and the desired moving velocity thereof in the Y-axis direction, respectively, and the control unit 50 determines velocity commands ω_R_cmd and ω_L_cmd of the electric motors 31R and 31L, respectively, so as to achieve the desired moving velocities.

In the present embodiment, the imaginary wheel rotational angular acceleration commands ωwdot_x_cmd and ωwdot_y_cmd as the manipulated variables (control inputs) are determined by adding up three manipulated variable components, as indicated by expressions 07x and 07y, which will be discussed later.

Figure 9:
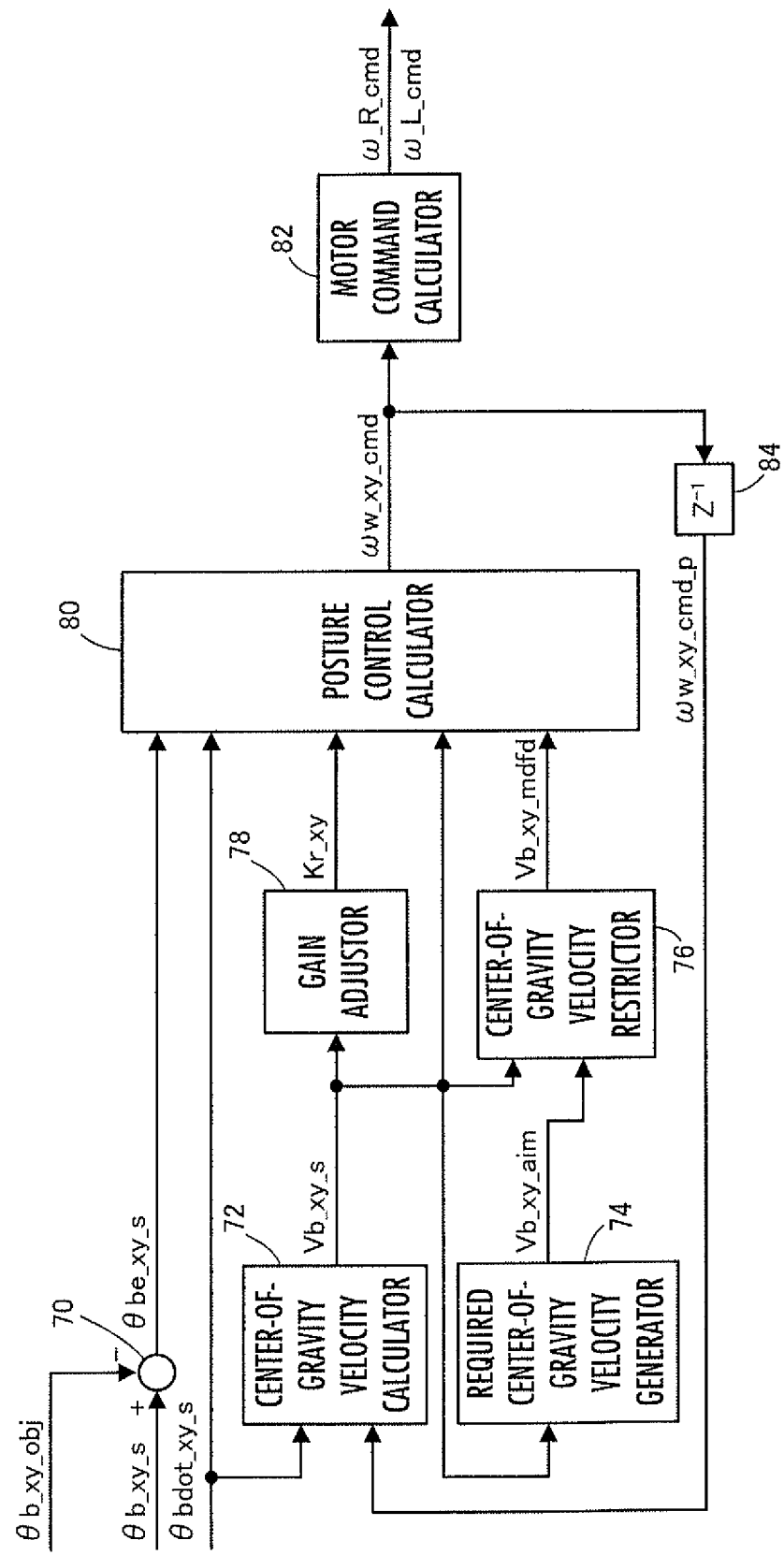
FIG. 9 is a block diagram illustrating a processing function related to the processing in STEP9 of FIG. 7.

The control unit 50 is provided with the functions illustrated in the block diagram of FIG. 9 as the functions for carrying out the vehicle control arithmetic processing in STEP9 as described above.

More specifically, the control unit 50 is provided with an error calculator 70 which calculates the base body tilt angle error measured value θbe_xy_s, which is the difference between the base body tilt angle measured value θb_xy_s and the base body tilt angle desired value θb_xy_obj, a center-of-gravity velocity calculator 72 which calculates an estimated center-of-gravity velocity value Vb_xy_s as an observed value of a center-of-gravity velocity Vb_xy, which is the moving velocity of the vehicle system center-of-gravity point, a required center-of-gravity velocity generator 74 which generates a required center-of-gravity velocity V_xy_aim as the required value of the center-of-gravity velocity Vb_xy presumably required by a steering operation of the vehicle 1 (an operation for adding a propulsion force to the vehicle 1) by an occupant or the like, a center-of-gravity velocity restrictor 76 which determines a desired center-of-gravity velocity for control Vb_xy_mdfd as the desired value of the center-of-gravity velocity Vb_xy by taking into account a restriction based on a permissible range of the rotational angular velocities of the electric motors 31R and 31L from the aforesaid estimated center-of-gravity velocity value Vb_xy_s and the required center-of-gravity velocity V_xy_aim, and a gain adjustor 78 which determines a gain adjustment parameter Kr_xy for adjusting the values of the gain coefficients of expressions 07x and 07y, which will be discussed later.

The control unit 50 is further provided with a posture control calculator 80 which calculates the imaginary wheel rotational angular velocity command ωw_xy_cmd, and a motor command calculator 82 which converts the imaginary wheel rotational angular velocity command ωw_xy_cmd into a pair of a velocity command ω_R_cmd (a command value of a rotational angular velocity) for the right electric motor 31R and a velocity command ω_L_cmd (a command value of a rotational angular velocity) for the left electric motor 31L.

Reference numeral 84 in FIG. 9 denotes a delay element which receives the imaginary wheel rotational angular velocity command ωw_xy_cmd calculated at each control processing cycle by the posture control calculator 80. The delay element 84 outputs a previous value ωw_xy_cmd_p of the imaginary wheel rotational angular velocity command ωw_xy_cmd at each control processing cycle.

In the vehicle control arithmetic processing in STEP9 described above, the processing by the aforesaid processing sections is carried out as described below.

The control unit 50 first carries out the processing by the error calculator 70 and the processing by the center-of-gravity velocity calculator 72.

The error calculator 70 receives the base body tilt angle measured values θb_xy_s (θb_x_s and θb_y_s) calculated in the aforesaid STEP2 and the desired values θb_xy_obj (θb_x_ obj and θb_y_obj) set in the aforesaid STEP5 or STEP7. Then, the error calculator 70 subtracts θb_x_obj from θb_x_s to calculate the base body tilt angle error measured value θbe_x_s (=θb_x_s−θb_x_obj) in the direction about the Y-axis, and also subtracts θb_y_obj from θb_y_s to calculate the base body tilt angle error measured value θbe_y_s (=θb_y_s−θb_y_obj) in the direction about the X-axis.

The processing by the error calculator 70 may be carried out before the vehicle control arithmetic processing in STEP9. For example, the processing by the error calculator 70 may be carried out during the processing in the aforesaid STEP5 or STEP7.

The center-of-gravity velocity calculator 72 receives the current value of the base body tilt angular velocity measured values θbdot_xy_s (θbdot_x_s and θbdot_y_s) calculated in the aforesaid STEP2 and also receives the previous value ωw_xy_cmd_p of the imaginary wheel velocity command ωw_xy_cmd (ωw_x_cmd_p and ωw_y_cmd_p) from the delay element 84. Then, the center-of-gravity velocity calculator 72 calculates an estimated center-of-gravity velocity value Vb_xy_s (Vb_x_s and Vb_y_s) from the above input values according to a predetermined arithmetic expression based on the aforesaid inverted pendulum model.

More specifically, the center-of-gravity velocity calculator 72 calculates Vb_x_s and Vb_y_s according to the following expression 05x and expression 05y, respectively.

$$Vb\_x\_s = Rw\_x \cdot \omega w\_x\_cmd\_p + h\_x \cdot \theta bdot\_x\_s \quad 05x$$

$$Vb\_y\_s = Rw\_y \cdot \omega w\_y\_cmd\_p + h\_y \cdot \theta bdot\_y\_s \quad 05y$$

In these expressions 05x and 05y, Rw_x and Rw_y denote the radii of the imaginary wheels 62_x and 62_y, respectively, as described above, and the values thereof are predetermined values set beforehand. Further, reference characters h_x and h_y denote the heights of the mass points 60_x and 60_y, respectively, of the inverted pendulum model. In this case, according to the present embodiment, the height of the vehicle system center-of-gravity point is maintained to be substantially constant. Thus, predetermined values set beforehand are used as the values of h_x and h_y, respectively. Supplementally, the heights h_x and h_y are included in the constant parameters for setting the values in the aforesaid STEP6 or STEP8.

The first term of the right side of expression 05x given above denotes the moving velocity of the imaginary wheel 62_x in the X-axis direction, which corresponds to the previous value ωw_x_cmd_p of the velocity command of the imaginary wheel 62_x. This moving velocity corresponds to the current value of an actual moving velocity of the wheel assembly 5 in the X-axis direction. Further, the second term of the right side of expression 05x corresponds to the current value of the moving velocity of the vehicle system center-of-gravity point in the X-axis direction attributable to the base body 9 tilting at a tilt angular velocity of θbdot_x_s in the direction about the Y-axis (relative moving velocity in relation to the wheel assembly 5). The same applies to expression 05y.

Alternatively, the pair of the measured values (the current values) of the rotational angular velocities of the electric motors 31R and 31L, respectively, which are measured on the basis of the outputs of the rotary encoders 56R and 56L, may be converted into the pair of the rotational angular velocities of the imaginary wheels 62_x and 62_y, respectively, then the rotational angular velocities may be used in place of ωw_x_cmd_p and ωw_y_cmd_p of expressions 05x and 05y. However, in order to eliminate the influences of noises contained in the measured values of the rotational angular velocities, it is advantageous to use ωw_x_cmd_p and ωw_y_cmd_p, which are desired values.

Subsequently, the control unit 50 carries out the processing by the required center-of-gravity velocity generator 74 and the processing by the gain adjustor 78. In this case, the required center-of-gravity velocity generator 74 and the gain adjustor 78 respectively receive the estimated center-of-gravity velocity values Vb_xy_s (Vb_x_s and Vb_y_s) calculated by the center-of-gravity velocity calculator 72 as described above.

Then, the required center-of-gravity velocity generator 74 determines the required center-of-gravity velocities V_xy_aim (V_x_aim, V_y_aim) on the basis of the input estimated center-of-gravity velocity values Vb_xy_s (Vb_x_s and Vb_y_s) when the operation mode of the vehicle 1 is the boarding mode. This will be discussed in detail later. In the present embodiment, if the operation mode of the vehicle 1 is the autonomous mode, then the required center-of-gravity velocity generator 74 sets both required center-of-gravity velocities V_x_aim and V_y_aim to zero.

Further, the gain adjustor 78 determines the gain adjustment parameters Kr_xy (Kr_x and Kr_y) on the basis of the input estimated center-of-gravity velocity values Vb_xy_s (Vb_x_s and Vb_y_s).

The processing by the gain adjustor 78 will be described below with reference to FIG. 10 and FIG. 11.

Figure 10:
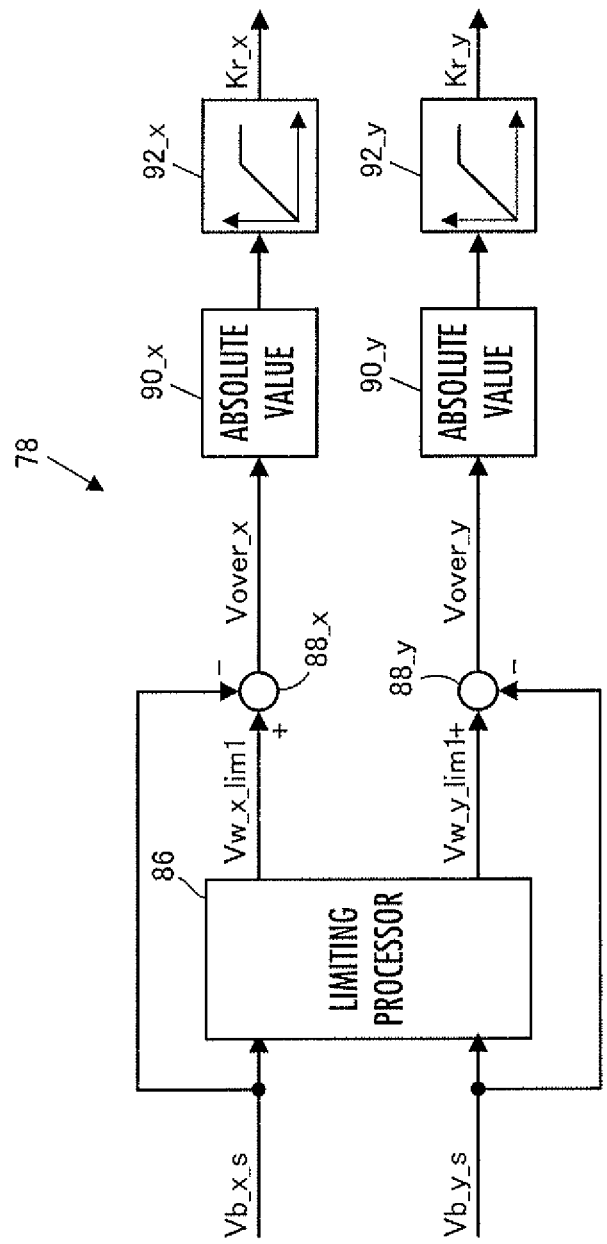
FIG. 10 is a block diagram illustrating a processing function of a gain adjusting element shown in FIG. 9.
Figure 11:
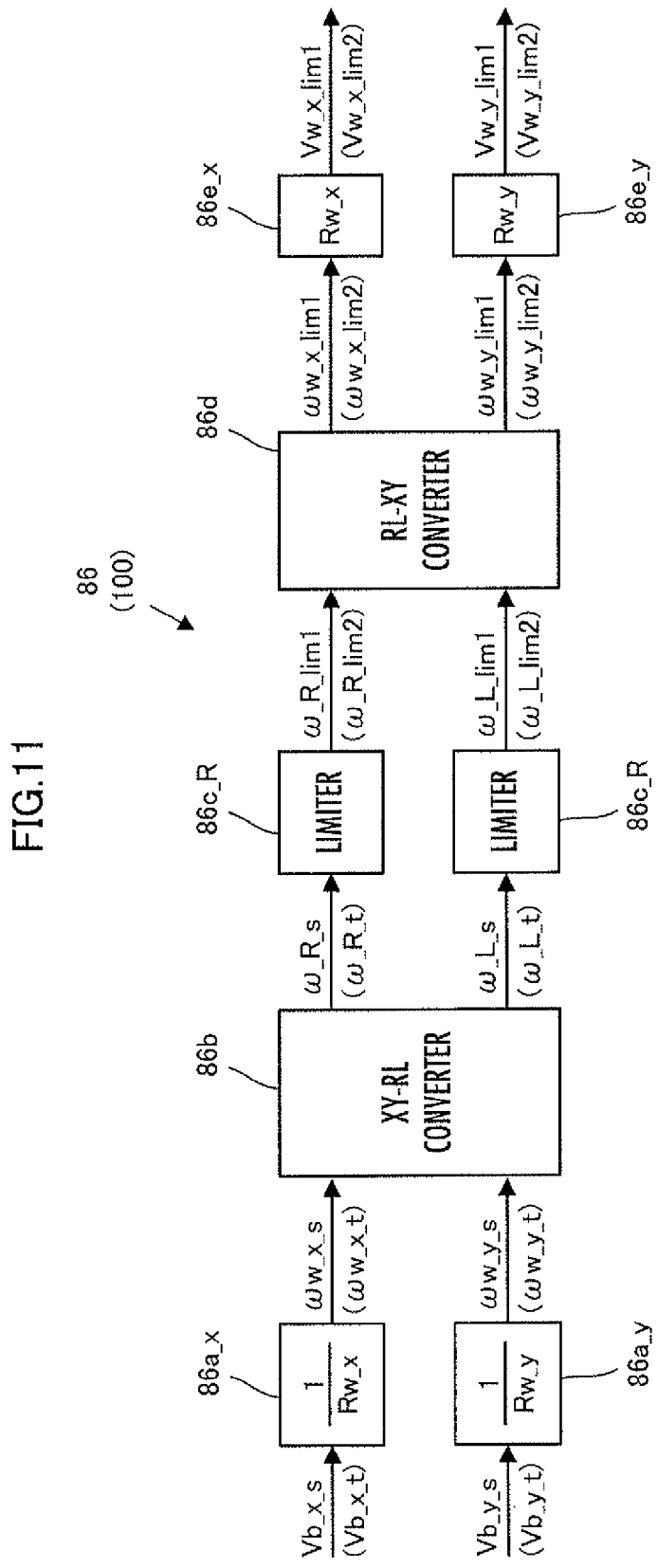
FIG. 11 is a block diagram illustrating a processing function of a limiting processor shown in FIG. 10 (or a limiting processor shown in FIG. 12)

As illustrated in FIG. 10, the gain adjustor 78 supplies the input estimated center-of-gravity velocity values Vb_x_s and Vb_y_s to a limiting processor 86. The limiting processor 86 adds, as appropriate, restrictions based on the permissible ranges of the rotational angular velocities of the electric motors 31R and 31L to the estimated center-of-gravity velocity values Vb_x_s and Vb_y_s, thereby generating output values Vw_x_lim1 and Vw_y_lim1. The output value Vw_x_lim1 means a value obtained after limiting the moving velocity Vw_x of the imaginary wheel 62_x in the X-axis direction and the output value Vw_y_lim1 means a value obtained after limiting the moving velocity Vw_y of the imaginary wheel 62_y in the Y-axis direction.

The processing by the limiting processor 86 will be described in further detail with reference to FIG. 11. The parenthesized reference characters in FIG. 11 denote the processing by a limiting processor 104 of the center-of-gravity velocity restrictor 76, which will be discussed later, and may be ignored in the description related to the processing by the limiting processor 86.

The limiting processor 86 first supplies the estimated center-of-gravity velocity values Vb_x_s and Vb_y_s to processors 86a_x and 86a_y, respectively. The processor 86a_x divides Vb_x_s by the radius Rw_x of the imaginary wheel 62_x to calculate the rotational angular velocity ωw_x_s of the imaginary wheel 62_x in the case where it is assumed that the moving velocity of the imaginary wheel 62_x in the X-axis direction coincides with Vb_x_s. Similarly, the processor 86a_y calculates the rotational angular velocity ωw_y_s of the imaginary wheel 62_y (=Vb_y_s/Rw_y) in the case where it is assumed that the moving velocity of the imaginary wheel 62_$y$ in the Y-axis direction coincides with Vb_y_s.

Subsequently, the limiting processor 86 converts the pair of ωw_x_s and ωw_y_s into a pair of the rotational angular velocity ω_R_s of the electric motor 31R and the rotational angular velocity ω_L_s of the electric motor 31L by an XY-RL converter 86b.

According to the present embodiment, the conversion is implemented by solving a simultaneous equation obtained by replacing ωw_x, ωw_y, ω_R and ω_L of the aforesaid expressions 01a and 01b by ωw_x_s, ωw_y_s, ω®R_s and ω_L_s, respectively, taking the ω_R_s and ω_L_s as unknowns.

Subsequently, the limit processor 86 supplies the output values ω_R_s and ω_L_s of the XY-RL converter 86b to limiters 86c_R and 86c_L, respectively. At this time, the limiter 86c_R directly outputs the ω_R_s as an output value ωR_lim1 if the ω_R_s falls within the permissible range for the right motor, which has an upper limit value (>0) and a lower limit value (<0) of predetermined values set beforehand. If the ω_R_s deviates from the permissible range for the right motor, then the limiter 86c_R outputs, as the output value ω_R_lim1, a boundary value of the upper limit value or the lower limit value of the permissible range for the right motor whichever is closer to the ω_R_s. Thus, the output value ω_R_lim1 of the limiter 86c_R is limited to a value within the permissible range for the right motor.

Similarly, the limiter 86c_L directly outputs the ω_L_s as an output value ω_L_lim1 if the ω_L_s falls within the permissible range for the left motor, which has an upper limit value (>0) and a lower limit value (<0) of predetermined values set beforehand. If the ω_L_s deviates from the permissible range for the left motor, then the limiter 86c_L outputs, as the output value ω_L_lim1, a boundary value of the upper limit value or the lower limit value of the permissible range for the left motor whichever is closer to the ω_L_s. Thus, the output value ω_L_lim1 of the limiter 86c_L is limited to a value within the permissible range for the left motor.

The permissible range for the right motor described above is a permissible range which has been set so as to prevent the rotational angular velocity (absolute value) of the right electric motor 31R from becoming excessively high thereby to prevent the maximum value of the torque that can be output by the electric motor 31R from decreasing. This applies also to the permissible range for the left motor.

Subsequently, the limit processor 86 converts the pair of the output values ω_R_lim1 and ω_L_lim1 of the limiters 86c_R and 86c_L, respectively, into a pair of the rotational angular velocities ωw_x_lim1 and ωw_y_lim1 of the imaginary wheels 62_$x$ and 62_$y$, respectively, by an RL-XY converter 86d.

The conversion is the processing of the inverse conversion of the processing of the conversion by the aforesaid XY-RL converter 86b. This processing is implemented by solving a simultaneous equation obtained by replacing ωw_x, ωw_y, ω_R and ω_L of the aforesaid expressions 01a and 01b by ωw_x_lim1, ωw_y_lim1, ω_R_lim1 and ω_L_lim1, respectively, taking the ωw_x_lim1 and ωw_y_lim1 as unknowns.

Subsequently, the limit processor 86 supplies the output values ωw_x_lim1 and ωw_y_lim1 of the RL-XY converter 86d to processors 86e_$x$ and 86e_$y$, respectively. The processor 86e_$x$ multiplies ωw_x_lim1 by the radius Rw_x of the imaginary wheel 62_$x$ to convert ωw_x_lim1 into the moving velocity Vw_x_lim1 of the imaginary wheel 62_$x$. In the same manner, the processor 86e_$y$ converts ωw_y_lim1 into the moving velocity Vw_y_lim1 of the imaginary wheel 62_$y$ (=ωw_y_lim1·Rw_y).

If it is assumed that the processing by the limiting processor 86 described above causes the moving velocity Vw_x of the imaginary wheel 62_$x$ in the X-axis direction and the moving velocity Vw_y of the imaginary wheel 62_$y$ in the Y-axis direction to agree with the estimated center-of-gravity velocity values Vb_x_s and Vb_y_s, respectively (in other words, if it is assumed that the moving velocity of the wheel assembly 5 in the X-axis direction and the moving velocity in the Y-axis direction are set to agree with Vb_x_s and Vb_y_s, respectively), then the pair of output values Vw_x_lim1 and Vw_y_lim1 coinciding with Vb_x_s and Vb_y_s, respectively, is output from the limiting processor 86 if the rotational angular velocities ω_R_s and ω_L_s of the electric motors 31R and 31L, respectively, which are required for achieving the moving velocities, both fall within permissible ranges.

Meanwhile, if both or one of the rotational angular velocities ω_R_s and ω_L_s of the electric motors 31R and 31L, respectively, deviates from the permissible range or ranges, then both or one of the rotational angular velocities is forcibly limited to be within the permissible range, and a pair of the moving velocities in the X-axis direction and the Y-axis direction Vw_x_lim1 and Vw_y_lim1 corresponding to a pair of the limited rotational angular velocities ω_R_lim1 and ω_L_lim1 of the electric motors 31R and 31L, respectively, is output from the limiting processor 86.

Hence, the limiting processor 86 generates a pair of output values Vw_x_lim1 and Vw_y_lim1 such that the output values Vw_x_lim1 and Vw_y_lim1 agree with Vb_x_s and Vb_y_s, respectively, as much as possible under an essential required condition that the rotational angular velocities of the electric motors 31R and 31L corresponding to the pair of the output values Vw_x_lim1 and Vw_y_lim1, respectively, do not deviate from the permissible ranges.

Referring back to the description of FIG. 10, the gain adjustor 78 then carries out the processing by calculators 88_$x$ and 88_$y$. The calculator 88_$x$ receives the estimated center-of-gravity velocity value in the X-axis direction Vb_x_s and the output value Vw_x_lim1 of the limiting processor 86. Then, the calculator 88_$x$ calculates a value Vover_x obtained by subtracting Vb_x_s from Vw_x_lim1 and outputs the value Vover_x. Further, the calculator 88_$y$ receives the estimated center-of-gravity velocity value in the Y-axis direction Vb_y_s and the output value Vw_y_lim1 of the limiting processor 86. Then, the calculator 88_$y$ calculates a value Vover_y obtained by subtracting Vb_y_s from Vw_y_lim1 and outputs the value Vover_y.

In this case, if the output values Vw_x_lim1 and Vw_y_lim1 are not forcibly restricted by the limiting processor 86, then Vw_x_lim1=Vb_x_s and Vw_y_lim1=Vb_y_s. Therefore, the output values Vover_x and Vover_y of the calculators 88_$x$ and 88_$y$, respectively, will be both zero.

Meanwhile, if the output values Vw_x_lim1 and Vw_y_lim1 of the limiting processor 86 are generated by forcibly restricting the input values Vb_x_s and Vb_y_s, then a corrected amount from Vb_x_s of Vw_x_lim1 (=Vw_x_lim1−Vb_x_s) and a corrected amount from Vb_y_s of Vw_y_lim1 (=Vw_y_lim1−Vb_y_s) will be output from the calculators 88_$x$ and 88_$y$, respectively.

Subsequently, the gain adjustor 78 passes the output value Vover_x of the calculator 88_$x$ through processors 90_$x$ and 92_$x$ in this order thereby to determine the gain adjustment parameter Kr_x. Further, the gain adjustor 78 passes the output value Vover_y of the calculator 88_$y$ through processors 90_$y$ and 92_$y$ in this order thereby to determine the gain adjustment parameter Kr_y. The gain adjustment parameters Kr_x and Kr_y both take values within the range from 0 to 1.

The processor 90_x calculates and outputs the absolute value of the input Vover_x. Further, the processor 92_x generates Kr_x such that the output value Kr_x monotonously increases relative to an input value |Vover_x| and has a saturation characteristic. The saturation characteristic is a characteristic in which a change amount of an output value relative to an increase in an input value becomes zero or approaches to zero when the input value increases to a certain level.

In this case, according to the present embodiment, if the input value |Vover_x| is a preset, predetermined value or less, then the processor 92_x outputs, as Kr_x, a value obtained by multiplying the input value |Vover_x| by a proportionality coefficient of a predetermined value. Further, if the input value |Vover_x| is larger than the predetermined value, then the processor 92_x outputs 1 as Kr_x. Incidentally, the proportionality coefficient is set such that the product of |Vover_x| and the proportionality coefficient becomes 1 when |Vover_x| agrees with a predetermined value.

The processing by processors 90_y and 92_y is the same as that carried out by the processors 90_x and 92_x, respectively, described above.

If the output values Vw_x_lim1 and Vw_y_lim1 in the limiting processor 86 are not forcibly restricted by the processing carried out by the gain adjustor 78 described above, that is, if the rotational angular velocities of the electric motors 31R and 31L fall within the permissible ranges even when the electric motors 31R and 31L are operated such that the moving velocities Vw_x and Vw_y of the wheel assembly 5 in the X-axis direction and the Y-axis direction, respectively, agree with the estimated center-of-gravity velocity values Vb_x_s and Vb_y_s, respectively, then the gain adjustment parameters Kr_x and Kr_y are both determined to be zero.

Meanwhile, if the output values Vw_x_lim1 and Vw_y_lim1 of the limiting processor 86 are generated by forcibly restricting the input values Vb_x_s and Vb_y_s, that is, if the rotational angular velocity of one of the electric motors 31R and 31L deviates from the permissible range (if the absolute value of one of the rotational angular velocities becomes excessively high) when the electric motors 31R and 31L are operated such that the moving velocities Vw_x and Vw_y of the wheel assembly 5 in the X-axis direction and the Y-axis direction, respectively, agree with the estimated center-of-gravity velocity values Vb_x_s and Vb_y_s, then the values of the gain adjustment parameters Kr_x and Kr_y are determined on the basis of the absolute values of the aforesaid corrected amounts Vover_x and Vover_y, respectively. In this case, Kr_x is determined to be a larger value as the absolute value of the corrected amount Vover_x increases, the upper limit value thereof being 1. The same applies to Kr_y.

Returning to the description of FIG. 9, after carrying out the processing by the center-of-gravity velocity calculator 72 and the required center-of-gravity velocity generator 74 as described above, the control unit 50 then carries out the processing by the center-of-gravity velocity restrictor 76.

The center-of-gravity velocity restrictor 76 receives the estimated center-of-gravity velocities Vb_xy_s (Vb_x_s and Vb_y_s) calculated by the center-of-gravity velocity calculator 72 and the required center-of-gravity velocities Vb_xy_aim (Vb_x_aim and Vb_y_aim) determined by the required center-of-gravity velocity generator 74. Then, the center-of-gravity velocity restrictor 76 carries out the processing illustrated by the block diagram of FIG. 12 by using the above input values so as to determine desired center-of-gravity velocities for control Vb_xy_mdfd (Vb_x_mdfd and Vb_y_mdfd).

To be more specific, the center-of-gravity velocity restrictor 76 first carries out the processing by stead-state error calculators 94_x and 94_y.

In this case, the stead-state error calculator 94_x receives the estimated center-of-gravity velocity value in the X-axis direction Vb_x_s and also receives the previous value Vb_x_mdfd_p of the desired center-of-gravity velocity for control in the X-axis direction Vb_x_mdfd through the intermediary of a delay element 96_x. Then, in the stead-state error calculator 94_x, first, the input Vb_x_s is supplied to a proportional-differential compensation component (PD compensation component) 94a_x. The proportional-differential compensation component 94a_x is a compensation component whose transfer function is denoted by 1+Kd·S, and adds the input Vb_x_s and the value obtained by multiplying the differential value thereof (temporal change rate) by a coefficient Kd of a predetermined value, and outputs the value resulting from the addition.

Subsequently, the stead-state error calculator 94_x calculates, by a calculator 94b_x, the value obtained by subtracting the input Vb_x_mdfd_p from the output value of the proportional-differential compensation component 94a_x, then supplies the output value of the calculator 94b_x to a low-pass filter 94c_x having a phase compensation function. The low-pass filter 94c_x is a filter whose transfer function is denoted by (1+T·S)/(1+T1·S). Then, the stead-state error calculator 94_x outputs the output value Vb_x_prd of the low-pass filter 94c_x.

Further, the stead-state error calculator 94_y receives the estimated center-of-gravity velocity value in the Y-axis direction Vb_y_s and also receives the previous value Vb_y_mdfd_p of the desired center-of-gravity velocity for control in the Y-axis direction Vb_y_mdfd through the intermediary of a delay element 96_y.

Then, as with the stead-state error calculator 94_x described above, the stead-state error calculator 94_y carries out the processing by a proportional-differential compensation component 94a_y, a calculator 94b_y, and a low-pass filter 94c_y in order and outputs an output value Vb_y_prd of the low-pass filter 94c_y.

Here, the output value Vb_x_prd of the stead-state error calculator 94_x has a meaning as a stead-state error of a future estimated center-of-gravity velocity value in the X-axis direction presumed from a current motion state of the vehicle system center-of-gravity point observed from the Y-axis direction (in other words, the motion state of the mass point 60_x of the inverted pendulum model observed from the Y-axis direction) relative to the desired center-of-gravity velocity for control Vb_x_mdfd of an expected convergence value. Similarly, the output value Vb_y_prd of the stead-state error calculator 94_y has a meaning as a stead-state error of a future estimated center-of-gravity velocity value in the Y-axis direction presumed from a current motion state of the vehicle system center-of-gravity point observed from the X-axis direction (in other words, the motion state of the mass point 60_y of the inverted pendulum model observed from the X-axis direction) relative to the desired center-of-gravity velocity for control Vb_y_mdfd of an expected convergence value. Hereinafter, the output values Vb_x_prd and Vb_y_prd of the stead-state error calculators 94_x and 94_y, respectively, will be referred to as the expected center-of-gravity velocity stead-state error values.

After carrying out the processing by the stead-state error calculators 94_x and 94_y as described above, the centerof-gravity velocity restrictor 76 carries out the processing for adding the desired center-of-gravity velocity Vb_x_aim to the output value Vb_x_prd of the stead-state error calculator 94_x and the processing for adding the desired center-of-gravity velocity Vb_y_aim to the output value Vb_y_prd of the stead-state error calculator 94_y by calculators 98_x and 98_y, respectively.

Therefore, an output value Vb_x_t of the calculator 98_x will indicate the velocity obtained by adding the desired center-of-gravity velocity Vb_x_aim in the X-axis direction to the expected center-of-gravity velocity stead-state error value in the X-axis direction Vb_x_prd. Similarly, an output value Vb_y_t of the calculator 98_y will indicate the velocity obtained by adding the desired center-of-gravity velocity Vb_y_aim in the Y-axis direction to the expected center-of-gravity velocity stead-state error value in the Y-axis direction Vb_y_prd.

If the required center-of-gravity velocity in the X-axis direction Vb_x_aim is zero, as in the case where, for example, the operation mode of the vehicle 1 is the autonomous mode, then the expected center-of-gravity velocity stead-state error value in the X-axis direction Vb_x_prd is directly provided as the output value Vb_x_t of the calculator 98_x. Similarly, if the required center-of-gravity velocity in the Y-axis direction Vb_y_aim is zero, then the expected center-of-gravity velocity stead-state error value in the Y-axis direction Vb_y_prd is directly provided as the output value Vb_y_t of the calculator 98_y.

Subsequently, the center-of-gravity velocity restrictor 76 supplies the output values Vb_x_t and Vb_y_t of the calculators 98_x and 98_y, respectively, to a limiting processor 100. The processing by the limiting processor 100 is the same as the processing by the limiting processor 86 of the gain adjustor 78 described above. In this case, as indicated by the parenthesized reference characters in FIG. 11, only the input values and the output values of the individual processing sections of the limiting processor 100 are different from those of the limiting processor 86.

To be more specific, in the limiting processor 100, rotational angular velocities ωw_x_t and ωw_y_t of the imaginary wheels 62_x and 62_y in the case where it is assumed that the moving velocities Vw_x and Vw_y of the imaginary wheels 62_x and 62_y, respectively, coincide with Vb_x_t and Vb_y_t, respectively, are calculated by the processors 86a_x and 86a_y, respectively. Then, the pair of the rotational angular velocities ωw_x_t and ωw_y_t is converted into the pair of the rotational angular velocities ω_R_t and ω_L_t of the electric motors 31R and 31L by the XY-RL converter 86b.

Further, these rotational angular velocities ω_R_t and ω_L_t are limited to values within the permissible range for the right motor and the permissible range for the left motor, respectively, by limiters 86c_R and 86c_L. Then, the values ω_R_lim2 and ω_L_lim2, which have been subjected to the limitation processing, are converted by the RL-XY converter 86d into the rotational angular velocities ωw_x_lim2 and ωw_y_lim2 of the imaginary wheels 62_x and 62_y.

Subsequently, the moving velocities Vw_x_lim2 and Vw_y_lim2 of the imaginary wheels 62_x and 62_y corresponding to the rotational angular velocities ωw_x_lim2 and ωw_y_lim2 are calculated by the processors 86e_x and 86e_y, respectively, and these moving velocities Vw_x_lim2 and Vw_y_lim2 are output from the limiting processor 100.

By carrying out the processing by the limiting processor 100 described above, the limiting processor 100 generates a pair of output values Vw_x_lim2 and Vw_y_lim2 such that the output values Vw_x_lim2 and Vw_y_lim2 agree with Vb_x_t and Vb_y_t, respectively, as much as possible under an essential required condition that the rotational angular velocities of the electric motors 31R and 31L corresponding to the pair of the output values Vw_x_lim2 and Vw_y_lim2, respectively, do not deviate from the permissible ranges, as with the limiting processor 86.

Incidentally, the permissible ranges for the right motor and left motor in the limiting processor 100 do not have to be the same as the permissible ranges in the limiting processor 86, and may be set to be permissible ranges that are different from each other.

Figure 12:
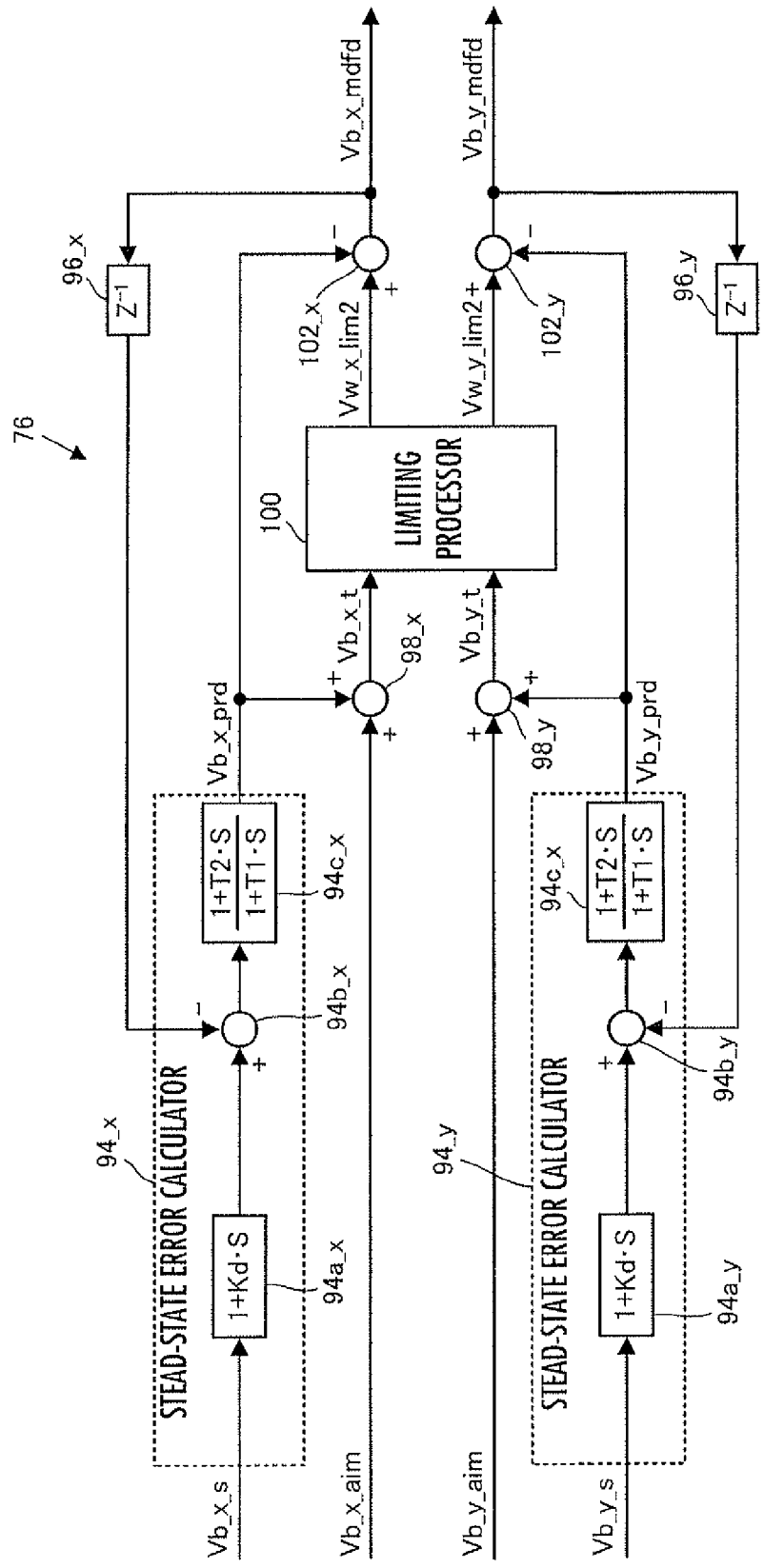
FIG. 12 is a block diagram illustrating a processing function of a center-of-gravity velocity restrictor 76 shown in FIG. 9.

Referring back to the description of FIG. 12, the center-of-gravity velocity restrictor 76 then carries out the processing by calculators 102_x and 102_y to calculate the desired center-of-gravity velocities for control Vb_x_mdfd and Vb_y_mdfd, respectively. In this case, the calculator 102_x calculates a value, which is obtained by subtracting the expected center-of-gravity velocity stead-state error value in the X-axis direction Vb_x_prd from the output value Vw_x_lim2 of the limiting processor 100, as the desired center-of-gravity velocity for control in the X-axis direction Vb_x_mdfd. Similarly, the calculator 102_y calculates a value, which is obtained by subtracting the expected center-of-gravity velocity stead-state error value in the Y-axis direction Vb_y_prd from the output value Vw_y_lim2 of the limiting processor 100, as the desired center-of-gravity velocity for control in the Y-axis direction Vb_y_mdfd.

Regarding the desired center-of-gravity velocities for control Vb_x_mdfd and Vb_y_mdfd determined as described above, in the case where the output values Vw_x_lim2 and Vw_y_lim2 are not forcibly restricted by the limiting processor 100, that is, in the case where the rotational angular velocities of the electric motors 31R and 31L fall within the permissible ranges even when the electric motors 31R and 31L are operated such that the moving velocities of the wheel assembly 5 in the X-axis direction and the Y-axis direction, respectively, agree with the output value Vb_x_t of the calculator 98_x and Vb_y_t of the calculator 98_y, respectively, the required center-of-gravity velocities Vb_x_aim and Vb_y_aim will be directly determined as the desired center-of-gravity velocities for control Vb_x_mdfd and Vb_y_mdfd, respectively.

In this case, if the required center-of-gravity velocity in the X-axis direction Vb_x_aim is zero, then the desired center-of-gravity velocity for control in the X-axis direction Vb_x_mdfd will be also zero, and if the required center-of-gravity velocity in the Y-axis direction Vb_y_aim is zero, then the desired center-of-gravity velocity for control in the Y-axis direction Vb_y_mdfd will be also zero.

Meanwhile, if the output values Vw_x_lim2 and Vw_y_lim2 of the limiting processor 100 are generated by forcibly restricting the input values Vb_x_t and Vb_y_t, that is, if the rotational angular velocity of one of the electric motors 31R and 31L deviates from the permissible range (if the absolute value of one of the rotational angular velocities becomes excessively high) when the electric motors 31R and 31L are operated such that the moving velocities of the wheel assembly 5 in the X-axis direction and the Y-axis direction, respectively, agree with the output value Vb_x_t of the calculator 98_x and the output value Vb_y_t of the calculator 98_y, then for the X-axis direction, a value obtained by correcting the desired center-of-gravity velocity Vb_x_aim by a correction amount from the input value Vb_x_t of the output value Vw_x_lim2 of the limiting processor 100 (=Vw_x_lim2−Vb_x_t) (a value obtained by adding the correction amount to Vb_x_aim) is determined as the desired center-of-gravity velocity for control in the X-axis direction Vb_x_mdfd.

Further, regarding the Y-axis direction, a value obtained by correcting the desired center-of-gravity velocity Vb_y_aim by a correction amount from the input value Vb_y_t of the output value Vw_y_lim2 of the limiting processor 100 (=Vw_y_lim2−Vb_y_t) (a value obtained by adding the correction amount to Vb_y_aim) is determined as the desired center-of-gravity velocity for control in the Y-axis direction Vb_y_mdfd.

In this case, if the desired center-of-gravity velocity Vb_x_aim on, for example, the velocity in the X-axis direction is not zero, then the desired center-of-gravity velocity for control Vb_x_mdfd approaches to zero more than the desired center-of-gravity velocity Vb_x_aim or becomes a velocity in the opposite direction from the desired center-of-gravity velocity Vb_x_aim. Further, if the desired center-of-gravity velocity Vb_x_aim is zero, then the desired center-of-gravity velocity for control Vb_x_mdfd becomes a velocity in the opposite direction from the expected center-of-gravity velocity stead-state error value in the X-axis direction Vb_x_prd output by the stead-state error calculator 94_x. The same applies to the velocity in the Y-axis direction.

The above has described the processing by the center-of-gravity velocity restrictor 76.

Returning to the description of FIG. 9, after carrying out the processing by the center-of-gravity velocity calculator 72, the center-of-gravity velocity restrictor 76, the gain adjustor 78, and the error calculator 70 as described above, the control unit 50 carries out the processing by the posture control calculator 80.

Figure 13:
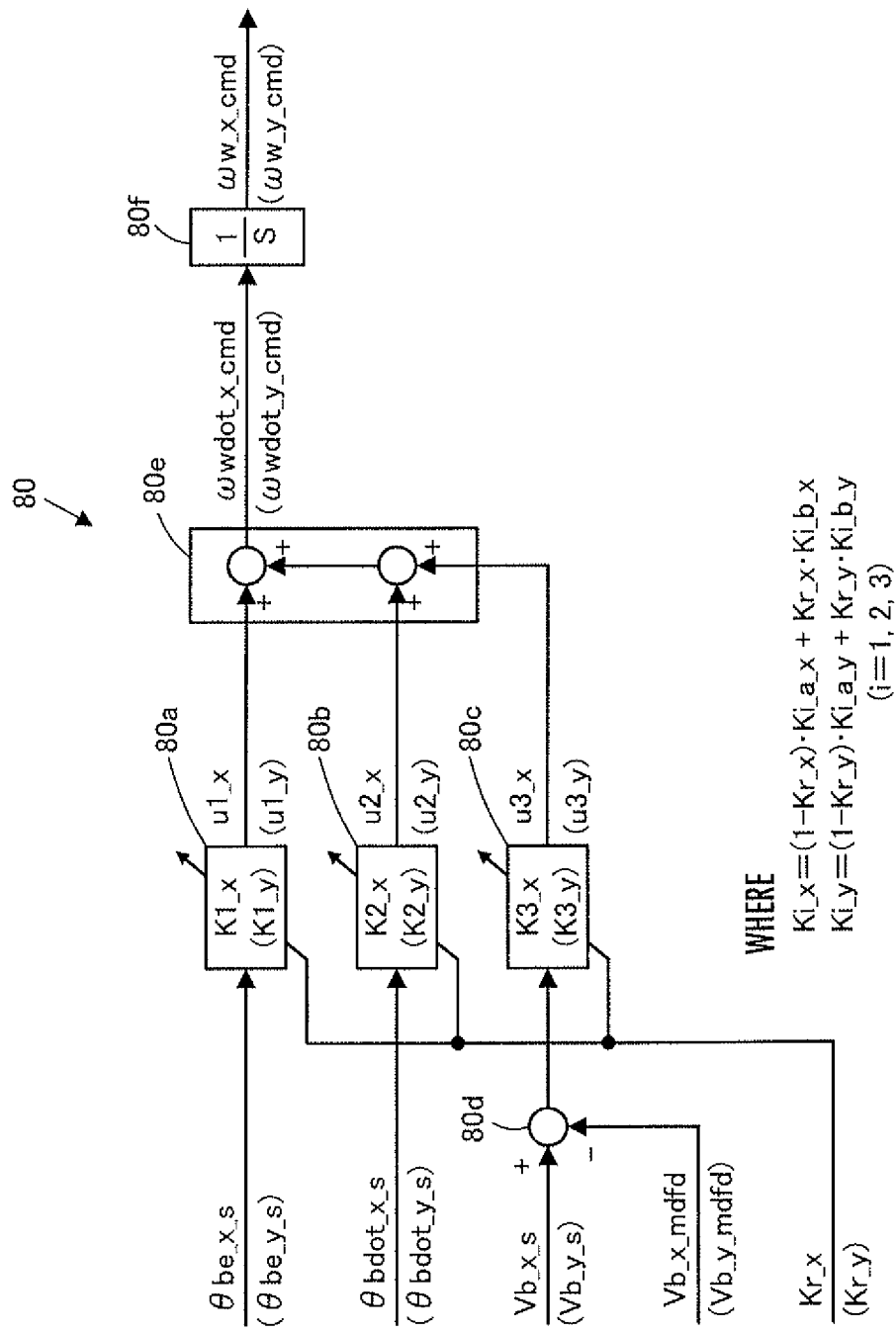
FIG. 13 is a block diagram illustrating a processing function of a posture control calculator 80 shown in FIG. 9.

The processing by the posture control calculator 80 will be described below by referring to FIG. 13. Incidentally, the unparenthesized reference characters in FIG. 13 are the reference characters related to the processing for determining the aforesaid imaginary wheel rotational angular velocity command ωw_x_cmd, which is the desired value of the rotational angular velocity of the imaginary wheel 62_x circumrotating in the X-axis direction. The parenthesized reference characters are the reference characters related to the processing for determining the aforesaid imaginary wheel rotational angular velocity command ωw_y_cmd, which is the desired value of the rotational angular velocity of the imaginary wheel 62_y circumrotating in the Y-axis direction.

The posture control calculator 80 receives the base body tilt angle error measured value θbe_xy_s calculated by the error calculator 70, the base body tilt angular velocity measured values θbdot_xy_s calculated in the aforesaid STEP2, the estimated center-of-gravity velocity values Vb_xy_s calculated by the center-of-gravity velocity calculator 72, the desired center-of-gravity velocities for control Vb_xy_mdfd calculated by the center-of-gravity velocity restrictor 76, and the gain adjustment parameters Kr_xy calculated by the gain adjustor 78.

Then, the posture control calculator 80 first calculates the imaginary wheel rotational angular acceleration commands ωwdot_xy_cmd according to the following expressions 07x and 07y by using the above received values.

$$\omega\text{wdot\_x\_cmd} = K1\_x \cdot \theta\text{be\_x\_s} + K2\_x \cdot \theta\text{bdot\_x\_s} + K3\_x \cdot (\text{Vb\_x\_s} - \text{Vb\_x\_mdfd}) \quad \text{Expression 07x}$$

-continued
$$\omega\text{wdot\_y\_cmd} = K1\_y \cdot \theta\text{be\_y\_s} + K2\_y \cdot \theta\text{bdot\_y\_s} + K3\_y \cdot (\text{Vb\_y\_s} - \text{Vb\_y\_mdfd}) \quad \text{Expression 07y}$$

Hence, according to the present embodiment, the imaginary wheel rotational angular acceleration command ωwdot_x_cmd denoting the manipulated variable (control input) for controlling the motion of the mass point 60_x of the inverted pendulum model observed from the Y-axis direction (i.e., the motion of the vehicle system center-of-gravity point observed from the Y-axis direction), and the imaginary wheel rotational angular acceleration command ωwdot_y_cmd denoting the manipulated variable (control input) for controlling the motion of the mass point 60_y of the inverted pendulum model observed from the X-axis direction (i.e., the motion of the vehicle system center-of-gravity point observed from the X-axis direction) are determined by adding up three manipulated variable components (the three terms of the right side of each of expressions 07x and 07y).

The gain coefficients K1_x and K1_y in these expressions 07x and 07y mean the feedback gains related to the tilt angle of the base body 9 (or the seat 3), the gain coefficients K2_x and K2_y mean the feedback gains related to the tilt angular velocity (the temporal change rate of a tilt angle) of the base body 9 (or the seat 3), and the gain coefficients K3_x and K3_y mean the feedback gains related to the moving velocity of the vehicle system center-of-gravity point (a predetermined representative point of the vehicle 1).

In this case, the gain coefficients K1_x, K2_x, and K3_x related to the manipulated variable components in expression 07x are variably set on the basis of the gain adjustment parameter Kr_x, while the gain coefficients K1_y, K2_y, and K3_y related to the manipulated variable components in expression 07y are variably set on the basis of the gain adjustment parameter Kr_y. Hereinafter, the gain coefficients K1_x, K2_x, and K3_x in expression 07x may be referred to as the first gain coefficient K1_x, the second gain coefficient K2_x, and the third gain coefficient K3_x, respectively. The same applies to the gain coefficients K1_y, K2_y, and K3_y in expression 07y.

An i-th gain coefficient Ki_x (i=1, 2, or 3) in expression 07x and an i-th gain coefficient Ki_y (i=1, 2, or 3) in expression 07y are determined on the basis of the gain adjustment parameters Kr_x and Kr_y according to expressions 09x and 09y given below, as indicated by the note in FIG. 13.

$$Ki\_x = (1 - Kr\_x) \cdot Ki\_a\_x + Kr\_x \cdot Ki\_b\_x \quad \text{Expression 09x}$$

$$Ki\_y = (1 - Kr\_y) \cdot Ki\_a\_y + Kr\_y \cdot Ki\_b\_y \quad \text{Expression 09y}$$

(i=1, 2, 3)

Here, Ki_a_x and Ki_b_x in expression 09x denote constant values set beforehand as the gain coefficient values on a minimum end (an end close to zero) of the i-th gain coefficient Ki_x and as the gain coefficient value on a maximum end (an end away from zero), respectively. The same applies to Ki_a_y and Ki_b_y in expression 09y.

Thus, each i-th gain coefficient Ki_x (i=1, 2 or 3) used in the calculation of expression 07x is determined as a weighted mean value of the constant values Ki_a_x and Ki_b_x corresponding thereto. Further, in this case, the weight applied to each of Ki_a_x and Ki_b_x is changed according to the gain adjustment parameter Kr_x. Therefore, if Kr_x=0, then Ki_x=Ki_a_x, and if Kr_x=1, then Ki_x=Ki_b_x. As Kr_x approaches 1 from 0, the i-th gain coefficient Ki_x approaches Ki_b_x from Ki_a_x.

Similarly, each i-th gain coefficient Ki_y (i=1, 2 or 3) used in the calculation of expression 07y is determined as a weighted mean value of the constant values Ki_a_y and Ki_b_y corresponding thereto. Further, in this case, the weight applied to each of Ki_a_y and Ki_b_y is changed according to the gain adjustment parameter Kr_y. Therefore, as with the case of Ki_x, as the value of Kr_y changes from 0 to 1, the value of the i-th gain coefficient Ki_y changes between Ki_a_y and Ki_b_y.

Supplementally, the aforesaid constant values Ki_a_x, Ki_b_x and Ki_a_y, Ki_b_y (i=1, 2 or 3) are included in the constant parameters, the values of which are set in the aforesaid STEP6 or STEP8.

The posture control calculator 80 uses the first to the third gain coefficients K1_x, K2_x, and K3_x determined as described above to perform the calculation of the above expression 07x, thereby calculating the imaginary wheel rotational angular acceleration command ωwdot_x_cmd related to the imaginary wheel 62_x circumrotating in the X-axis direction.

More detailedly, referring to FIG. 13, the posture control calculator 80 calculates a manipulated variable component u1_x obtained by multiplying the base body tilt angle error measured value θbe_x_s by the first gain coefficient K1_x and a manipulated variable component u2_x obtained by multiplying the base body tilt angular velocity measured value θbdot_x_s by the second gain coefficient K2_x by processors 80a and 80b, respectively. Further, the posture control calculator 80 calculates the difference between the estimated center-of-gravity velocity value Vb_x_s and the desired center-of-gravity velocity for control Vb_x_mdfd (=Vb_x_s−Vb_x_mdfd) by a calculator 80d, and calculates, by a processor 80c, a manipulated variable component u3_x obtained by multiplying the calculated difference by the third gain coefficient K3_x. Then, the posture control calculator 80 adds up these manipulated variable components u1_x, u2_x, and u3_x by a calculator 80e so as to calculate the imaginary wheel rotational angular acceleration command ωwdot_x_cmd.

Similarly, the posture control calculator 80 carries out the calculation of the above expression 07y by using the first to the third gain coefficients K1_y, K2_y, and K3_y determined as described above, thereby calculating the imaginary wheel rotational angular acceleration command ωwdot_y_cmd related to the imaginary wheel 62_y circumrotating in the Y-axis direction.

In this case, the posture control calculator 80 calculates a manipulated variable component u1_y obtained by multiplying the base body tilt angle error measured value θbe_y_s by the first gain coefficient K1_y and a manipulated variable component u2_y obtained by multiplying the base body tilt angular velocity measured value θbdot_y_s by the second gain coefficient K2_y by the processors 80a and 80b, respectively. Further, the posture control calculator 80 calculates the difference between the estimated center-of-gravity velocity value Vb_y_s and the desired center-of-gravity velocity for control Vb_y_mdfd (=Vb_y_s−Vb_y_mdfd) by the calculator 80d, and calculates, by the processor 80c, a manipulated variable component u3_y obtained by multiplying the calculated difference by the third gain coefficient K3_y. Then, the posture control calculator 80 adds up these manipulated variable components u1_y, u2_y, and u3_y by the calculator 80e so as to calculate the imaginary wheel rotational angular acceleration command ωwdot_x_cmd.

Here, the first term (=the first manipulated variable component u1_x) and the second term (=the second manipulated variable component u2_x) of the right side of expression 07x mean the feedback manipulated variable components for converging the base body tilt angle error measured value θbe_x_s in the direction about the X-axis to zero (converging the base body tilt angle measured value θb_x_s to the desired value θb_x_obj) by the PD law (proportional-differential law) serving as the feedback control law.

Further, the third term (=the third manipulated variable component u3_x) of the right side of expression 07x means a feedback manipulated variable component for converging the difference between the estimated center-of-gravity velocity value Vb_x_s and the desired center-of-gravity velocity for control Vb_x_mdfd to zero (converging Vb_x_s to Vb_x_mdfd) by a proportional law serving as the feedback control law.

The same applies to the first to the third terms (the first to the third manipulated variable components u1_y, u2_y, and u3_y) of the right side of expression 07y.

After calculating the imaginary wheel rotational angular acceleration commands ωwdot_x_cmd and ωwdot_y_cmd as described above, the posture control calculator 80 integrates these ωwdot_x_cmd and ωwdot_y_cmd by an integrator 80f thereby to determine the aforesaid imaginary wheel rotational velocity commands ωw_x_cmd and ωw_y_cmd.

The above has described the details of the processing by the posture control calculator 80.

Supplementally, the imaginary wheel rotational angular acceleration command ωwdot_x_cmd may alternatively be calculated by an expression wherein the third term of the right side of expression 07x is separated into the manipulated variable component based on Vb_x_s (=K3_x·Vb_x_s) and the manipulated variable component based on Vb_x_mdfd (=−K3_x·Vb_x_mdfd). Similarly, the imaginary wheel rotational angular acceleration command ωwdot_y_cmd may alternatively be calculated by an expression wherein the third term of the right side of expression 07y is separated into the manipulated variable component based on Vb_y_s (=K3_y·Vb_y_s) and the manipulated variable component based on Vb_y_mdfd (=−K3_y·Vb_y_mdfd).

Further, in the present embodiment, the rotational angular acceleration commands ωwdot_x_cmd and ωwdot_y_cmd of the imaginary wheels 62_x and 62_y have been used as the manipulated variables (control inputs) for controlling the behaviors of the vehicle system center-of-gravity point. However, for example, the drive torques of the imaginary wheels 62_x and 62_y or the translational forces obtained by dividing the driving torques by the radii Rw_x and Rw_y of the imaginary wheels 62_x and 62_y (i.e., the frictional forces between the imaginary wheels 62_x, 62_y and a floor surface) may be used as the manipulated variables.

Returning to the description of FIG. 9, the control unit 50 then supplies the imaginary wheel rotational velocity commands ωw_x_cmd and ωw_y_cmd determined as described above by the posture control calculator 80 to the motor command calculator 82, and carries out the processing by the motor command calculator 82 so as to determine a velocity command ω_R_cmd of the electric motor 31R and a velocity command ω_L_cmd of the electric motor 31L. The processing by the motor command calculator 82 is the same as the processing by the XY-RL converter 86b of the aforesaid limiting processor 86 (refer to FIG. 11).

To be more specific, the motor command calculator 82 determines the velocity commands ωR_cmd and ω_L_cmd of the electric motors 31R and 31L by a simultaneous equation obtained by replacing ωw_x, ωw_y, ω_R and ω_L of the aforesaid expressions 01a and 01b by ωw_x_cmd, ωw_y_cmd, ω_R_cmd and ω_L_cmd, respectively, taking the ω_R_cmd and ω_L_cmd as unknowns.

Thus, the vehicle control arithmetic processing in the aforesaid STEP9 is completed.

By the control arithmetic processing carried out by the control unit 50 as described above, the imaginary wheel rotational angular acceleration commands ωwdot_xy_cmd denoting the manipulated variables (control inputs) are determined such that, basically, the posture of the base body 9 is maintained at a posture in which the aforesaid base body tilt angle error measured value θbe_x_s and θbe_y_s are both zero (hereinafter, this posture will be referred to as the basic posture), i.e., the position of the vehicle system center-of-gravity point (the vehicle-occupant overall center-of-gravity point or the vehicle-alone center-of-gravity point) is maintained to be substantially right above the ground contact surface of the wheel assembly 5, in the operation modes of both the boarding mode and the autonomous mode. More detailedly, the imaginary wheel rotational angular acceleration command ωwdot_xy_cmd is determined such that the estimated center-of-gravity velocity values Vb_xy_s as the estimated values of the moving velocities of the vehicle system center-of-gravity point is converged to the desired center-of-gravity velocities for control Vb_xy_mdfd while maintaining the posture of the base body 9 at the aforesaid basic posture. Incidentally, the desired center-of-gravity velocities for control Vb_xy_mdfd are normally zero (more specifically, unless an occupant or the like imparts an additional propulsion force of the vehicle 1 in the boarding mode). In this case, the imaginary wheel rotational angular acceleration command ωwdot_xy_cmd will be determined such that the vehicle system center-of-gravity point is substantially stationary while maintaining the posture of the base body 9 at the aforesaid basic posture.

Then, the rotational angular velocities of the electric motors 31R and 31L, respectively, obtained by converting the imaginary wheel rotational angular velocity commands ωw_xy_cmd, which is obtained by integrating each component of ωwdot_xy_cmd, are determined as the velocity commands ω_R_cmd and ω_L_cmd of the electric motors 31R and 31L. Further, the rotational velocities of the electric motors 31R and 31L are controlled according to the velocity commands ω_R_cmd and ω_L_cmd. Thus, the moving velocities of the wheel assembly 5 in the X-axis direction and the Y-axis direction, respectively, are controlled so as to agree with the moving velocity of the imaginary wheel 62_x corresponding to ωw_x_cmd and the moving velocity of the imaginary wheel 62_y corresponding to ωw_y_cmd, respectively.

With this arrangement, if, for example, the actual base body tilt angle θb_x deviates from the desired value θb_x_obj in the direction about the Y-axis by leaning forward, then the wheel assembly 5 moves forward to eliminate the deviation (to converge θbe_x_s to zero). Similarly, if the actual θb_x deviates from the desired value θb_x_obj by leaning backward, then the wheel assembly 5 moves backward to eliminate the deviation (to converge θbe_x_s to zero).

Further, for example, if the actual base body tilt angle θb_y deviates from the desired value θb_y_obj in the direction about the X-axis by leaning rightward, then the wheel assembly 5 moves rightward to eliminate the deviation (to converge θbe_y_s to zero). Similarly, if the actual θb_y deviates from the desired value θb_y_obj by leaning leftward, then the wheel assembly 5 moves leftward to eliminate the deviation (to converge θbe_y_s to zero).

Further, if both the actual base body tilt angles θb_x and θb_y deviate from the desired values θb_x_obj and θb_y_obj, respectively, then the moving operation of the wheel assembly 5 in the fore-and-aft direction to eliminate the deviation of θb_x and the moving operation of the wheel assembly 5 in the lateral direction to eliminate the deviation of θb_y are combined, so that the wheel assembly 5 will move in a direction combining the X-axis direction and the Y-axis direction (a direction at an angle to both the X-axis direction and the Y-axis direction).

Thus, if the base body 9 tilts from the basic posture, then the wheel assembly 5 moves toward the tilting side. Hence, if, for example, the occupant intentionally inclines his/her upper body in the aforesaid boarding mode, then the wheel assembly 5 will move to the tilting side.

In the case where the desired center-of-gravity velocities for control Vb_x_mdfd and Vb_y_mdfd are zero, when the posture of the base body 9 converges to the basic posture, the movement of the wheel assembly 5 substantially comes to a halt. Further, if, for example, the tilt angle θb_x of the base body 9 in the direction about the Y-axis is maintained at a certain angle tilted from the basic posture, then the moving velocity of the wheel assembly 5 in the X-axis direction converges to a certain moving velocity corresponding to the angle (a moving velocity having a certain stead-state deviation from the desired center-of-gravity velocity for control Vb_x_mdfd). The same applies to the case where the tilt angle θb_y of the base body 9 in the direction about the X-axis is maintained at a certain angle tilted from the basic posture.

Further, in a situation wherein, for example, the desired center-of-gravity velocities Vb_x_aim and Vb_y_aim generated by the aforesaid required center-of-gravity velocity generator 74 are both zero, if the amount of the tilt of the base body 9 from the aforesaid basic posture (the base body tilt angle error measured values θbe_x_s and θbe_y_s) becomes relatively large, and the moving velocity or velocities of the wheel assembly 5 in one or both of the X-axis direction and the Y-axis direction for eliminating the tilt amount or for maintaining the tilt amount (these moving velocities corresponding to the aforesaid expected center-of-gravity velocity stead-state error values Vb_x_prd and Vb_y_prd, respectively, shown in FIG. 12) are an excessively large moving velocity or velocities that would cause the rotational angular velocity or velocities of one or both of the electric motors 31R and 31L to deviate from the permissible range or ranges thereof, then a velocity in the opposite direction from the moving velocity of the wheel assembly 5 (more detailedly, Vw_x_lim2−Vb_x_prd and Vw_y_lim2−Vb_y_prd) will be determined as the desired center-of-gravity velocities for control Vb_x_mdfd and Vb_y_mdfd. Then, the manipulated variable components u3_x and u3_y among the manipulated variable components constituting a control input are determined such that the estimated center-of-gravity velocity values Vb_x_s and Vb_y_s will be converged to the desired center-of-gravity velocities for control Vb_x_mdfd and Vb_y_mdfd, respectively. This prevents the amount of a tilt of the base body 9 from the aforesaid basic posture from becoming excessively large, thus preventing the rotational angular velocity or velocities of one or both of the electric motors 31R and 31L from becoming excessively high.

Further, in the aforesaid gain adjustor 78, in the situation wherein one or both of the estimated center-of-gravity velocity values Vb_x_s and Vb_y_s become large, and the moving velocity or velocities of the wheel assembly 5 in one or both of the X-axis direction and the Y-axis direction required to eliminate the tilt of the base body 9 from the aforesaid basic posture or to maintain the tilt amount may become an excessively large moving velocity that would cause the rotational angular velocity or velocities of one or both of the electric motors 31R and 31L to deviate from the permissible range or ranges thereof, as the deviation becomes more notable (more specifically, as the absolute values of Vover_x and Vover_y shown in FIG. 10 increase), one or both of the aforesaid gain adjustment parameters Kr_x and Kr_y are brought closer to 1 from 0.

In this case, each i-th gain coefficient Ki_x (i=1, 2 or 3) calculated according to the aforesaid expression 09x approaches to the constant value Ki_b_x on the maximum end from the constant value Ki_a_x on the minimum end, as Kr_x approaches to 1. The same applies to each i-th gain coefficient Ki_y (i=1, 2 or 3) calculated according to the aforesaid expression 09y.

As the absolute values of the aforesaid gain coefficients increase, the sensitivities of the manipulated variables (the imaginary wheel rotational angular acceleration commands ωwdot_x_cmd and ωwdot_y_cmd) in response to a change in the tilt of the base body 9 increase. Hence, the moment the amount of a tilt of the base body 9 from the basic posture indicates an increase, the moving velocity of the wheel assembly 5 will be controlled to immediately eliminate the tilt amount. This intensely restrains the base body 9 from considerably tilting from the basic posture, thus making it possible to prevent the moving velocity or velocities of the wheel assembly 5 in one or both of the X-axis direction and the Y-axis direction from becoming an excessively high moving velocity that causes the rotational angular velocity or velocities of one or both of the electric motors 31R and 31L to deviate from the permissible range or ranges thereof.

Further, in the boarding mode, if the required center-of-gravity velocity generator 74 generates the required center-of-gravity velocities Vb_x_aim and Vb_y_aim (required center-of-gravity velocities in which one or both of Vb_x_aim and Vb_y_aim are not zero) according to a request made by a steering operation performed by the occupant or the like, then the required center-of-gravity velocities Vb_x_aim and Vb_y_aim are determined as the aforesaid desired center-of-gravity velocities for control Vb_x_mdfd and Vb_y_mdfd, respectively, unless the rotational angular velocity or velocities of one or both of the electric motors 31R and 31L become a high rotational angular velocity or velocities that deviate from the permissible range or ranges thereof (more detailedly, as long as Vw_x_lim2 and Vw_y_lim2 shown in FIG. 12 agree with Vb_x_t and Vb_y_t, respectively). Thus, the moving velocity of the wheel assembly 5 is controlled such that the required center-of-gravity velocities Vb_x_aim and Vb_y_aim are implemented (such that the actual center-of-gravity velocities approach to the required center-of-gravity velocities Vb_x_aim and Vb_y_aim).

The processing by the aforesaid required center-of-gravity velocity generator 74, the description of which has been deferred, will now be described in detail.

In the present embodiment, if the operation mode of the vehicle 1 is the autonomous mode, then the required center-of-gravity velocity generator 74 sets the required center-of-gravity velocities Vb_x_aim and Vb_y_aim to zero, as described above.

Meanwhile, in the case where the operation mode of the vehicle 1 is the boarding mode, on the basis of the steering operation of the vehicle 1 by an occupant or the like (the operation for adding a propulsive force to the vehicle 1), the required center-of-gravity velocity generator 74 determines the required center-of-gravity velocities Vb_x_aim and Vb_y_aim expected to be required by on the steering operation.

Here, for example, in the case where the occupant of the vehicle 1 intends to positively increase the traveling velocity of the vehicle 1 (the moving velocity of the vehicle system center-of-gravity point) at the time of starting the vehicle 1 or the like, the occupant kicks a floor with his/her foot thereby to add a propulsive force for increasing the traveling velocity of the vehicle 1 (a propulsive force by the force of friction between the foot of the occupant and the floor) to the vehicle 1. Alternatively, for example, an outside assistant or the like may add the propulsive force for increasing the traveling velocity to the vehicle 1 in response to a request from the occupant of the vehicle 1.

In such a case, the required center-of-gravity velocity generator 74 determines whether an acceleration request as the request for increasing the traveling velocity of the vehicle 1 has been generated on the basis of the temporal change rate of the magnitude (absolute value) of the actual velocity vector (hereinafter referred to as the center-of-gravity velocity vector ↑Vb) of the vehicle system center-of-gravity point, and then, according to the determination result, the required center-of-gravity velocity generator 74 sequentially determines the required center-of-gravity velocity vector ↑Vb_aim (a velocity vector having the required center-of-gravity velocities Vb_x_aim and Vb_y_aim as the two components) as the desired value of ↑Vb.

The processing will be schematically described below. In the case where the aforesaid acceleration request has been generated, the required center-of-gravity velocity vector ↑Vb_aim is determined such that the magnitude of the required center-of-gravity velocity vector ↑Vb_aim is increased until the acceleration request is cleared. Then, when the aforesaid acceleration request is cleared, the required center-of-gravity velocity vector ↑Vb_aim is determined such that the magnitude of the required center-of-gravity velocity vector ↑Vb_aim is attenuated stepwise. In this case, according to the present embodiment, basically, the magnitude of the required center-of-gravity velocity vector ↑Vb_aim is maintained at a constant level for a predetermined period after the acceleration request is cleared. Then, thereafter, the magnitude of the required center-of-gravity velocity vector ↑Vb_aim is continuously attenuated to zero. Incidentally, at the time of the attenuation, the orientation of the required center-of-gravity velocity vector ↑Vb_aim is brought closer to the X-axis direction, as appropriate.

The required center-of-gravity velocity generator 74, which carries out the processing described above, will be described in detail below with reference to the flowcharts of FIG. 14 to FIG. 20.

Figure 14:
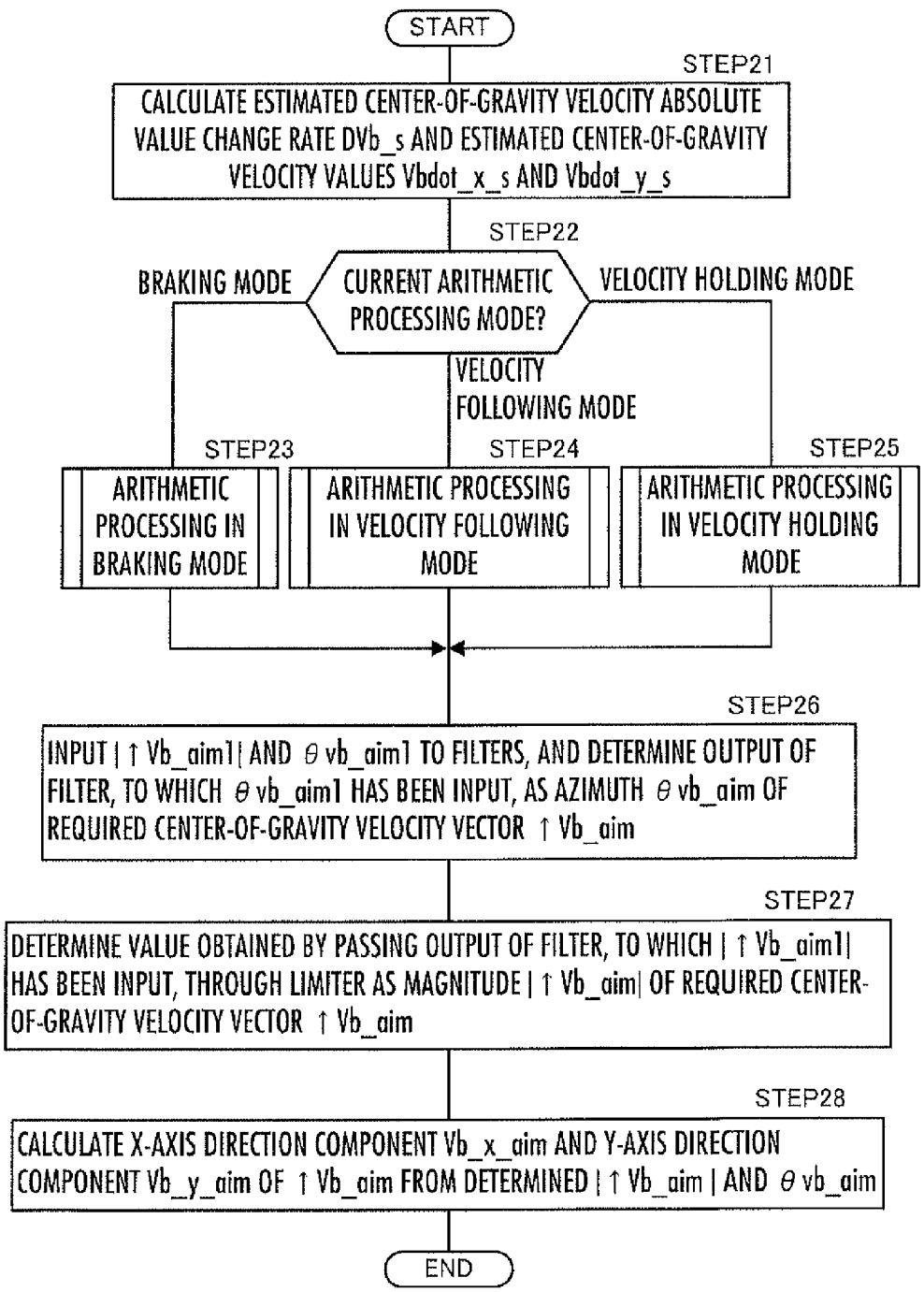
FIG. 14 is a flowchart illustrating the processing by a required center-of-gravity velocity generator 74 shown in FIG. 9.

Referring to FIG. 14, the required center-of-gravity velocity generator 74 first carries out the processing in STEP21. In the processing, the required center-of-gravity velocity generator 74 calculates the temporal change rate (differential value) DVb_s of the magnitude of the estimated center-of-gravity velocity vector ↑Vb_s, which is a velocity vector using input estimated center-of-gravity values Vb_x_s and Vb_y_s as two components thereof (the observed value of the actual center-of-gravity velocity vector ↑Vb) |↑Vb_s| (=sqrt (Vb_x_s$^2$+Vb_y_s$^2$)). The DVb_s has a meaning as the observed value (estimated value) of the temporal change rate of the magnitude of the actual center-of-gravity velocity vector ↑Vb. Hereinafter, DVb_s will be referred to as the estimated center-of-gravity velocity absolute value change rate DVb_s. The above sqrt( ) denotes a square root function.

Further, in STEP21, the required center-of-gravity velocity generator 74 calculates estimated center-of-gravity acceleration values Vbdot_x_s and Vbdot_y_s, which denote the temporal change rates (differential values) of the input estimated center-of-gravity velocity values Vb_x_s and Vb_y_s, respectively. The vector using Vbdot_x_s and Vbdot_y_s as two components means the observed value of the actual acceleration vector of the vehicle system center-of-gravity point.

Subsequently, the required center-of-gravity velocity generator 74 proceeds to STEP22 to determine which mode the current arithmetic processing mode for calculating the required center-of-gravity velocity Vb_x_aim is.

Here, according to the present embodiment, the required center-of-gravity velocity generator 74 first determines the basic value of the required center-of-gravity velocity vector ↑Vb_aim (hereinafter, referred to as the basic required center-of-gravity velocity vector ↑Vb_aim1), and then determines the required center-of-gravity velocity vector ↑Vb_aim to cause the required center-of-gravity velocity vector ↑Vb_aim to follow (steadily agree with) the basic required center-of-gravity velocity vector ↑Vb_aim1.

The aforesaid arithmetic processing mode indicates the type of the method for determining the basic required center-of-gravity velocity vector ↑Vb_aim1. According to the present embodiment, the arithmetic processing mode comes in three types, namely, a braking mode, a velocity following mode, and a velocity holding mode.

The braking mode is a mode in which ↑Vb_aim1 is determined such that the magnitude of the basic required center-of-gravity velocity vector ↑Vb_aim1 is attenuated to zero or maintained at zero. Further, the velocity following mode is a mode in which the basic required center-of-gravity velocity vector ↑Vb_aim1 is determined such that the basic required center-of-gravity velocity vector ↑Vb_aim1 follows (coincides or substantially coincides with) the estimated center-of-gravity velocity vector ↑Vb_s. Further, the velocity holding mode is a mode in which ↑Vb_aim1 is determined such that the magnitude of the basic required center-of-gravity velocity vector ↑Vb_aim1 is maintained at a constant level.

Incidentally, the arithmetic processing mode in a state wherein the control unit 50 is initialized at the time of, for example, starting the control unit 50 (the initial arithmetic processing mode) is the braking mode.

In the aforesaid STEP22, the required center-of-gravity velocity generator 74 carries out the arithmetic processing in STEP23, the arithmetic processing in STEP24, or the arithmetic processing in STEP25 next, depending upon whether the current arithmetic processing mode is the braking mode, the velocity following mode, or the velocity holding mode, thereby determining the basic required center-of-gravity velocity vector ↑Vb_aim1.

The arithmetic processing corresponding to each of the aforesaid modes is carried out as described below.

Figure 15:
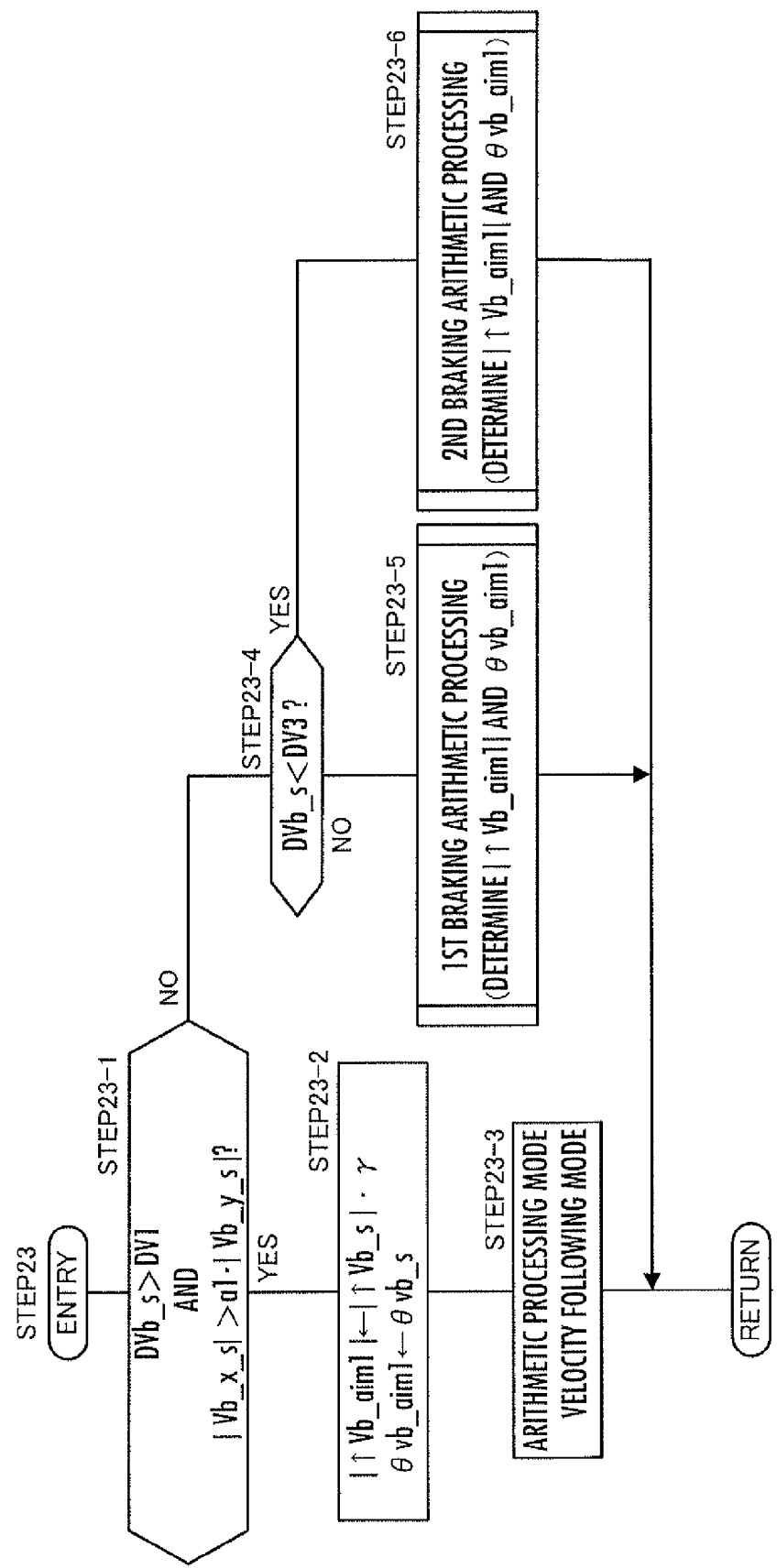
FIG. 15 is a flowchart illustrating the subroutine processing in STEP23 of FIG. 14.

The arithmetic processing of the braking mode in STEP23 is carried out as illustrated by the flowchart of FIG. 15. To be more specific, the required center-of-gravity velocity generator 74 first determines in STEP23-1 whether a condition that DVb_s>DV1 and |Vbdot_x_s|>a1·|Vbdot_y_s| holds on the estimated center-of-gravity velocity absolute value change rate DVb_s and the estimated center-of-gravity acceleration values Vbdot_x_s and Vbdot_y_s, which have been calculated in the aforesaid STEP21. The determination processing is the processing for determining whether there is an acceleration request for increasing the traveling velocity of the vehicle 1 substantially in the fore-and-aft direction.

Here, the aforesaid DV1 denotes a first threshold value DV1 (>0) of a preset positive value. Further, if DVb_s>DV1 holds, then it means a situation wherein the magnitude |↑Vb| of the actual center-of-gravity velocity vector ↑Vb is increasing at a temporal change rate that is larger than the first threshold value DV1.

Further, the aforesaid a1 denotes a coefficient value of a preset positive value. If |Vbdot_x_s|>a1·|Vbdot_y_s| holds, then it means a situation wherein the actual acceleration vector of the vehicle system center-of-gravity point has a component in the X-axis direction that is not zero, and the angle on the acute angle side of the acceleration vector relative to the X-axis direction $(=\tan^{-1}(|Vbdot\_y\_s|/|Vbdot\_x\_s|))$ is closer to zero than a predetermined angle $(=\tan^{-1}(1/a1))$. In the present embodiment, a1 is set to, for example, 1 or a value in the vicinity thereof.

Hence, the situation in which the determination result in STEP23-1 is affirmative is a situation in which a steering operation for increasing the magnitude of the center-of-gravity velocity vector ↑Vb approximately in the fore-and-aft direction by an occupant or an outside assistant or the like (a steering operation for adding a propulsive force approximately in the fore-and-aft direction to the vehicle 1) is being carried out.

In the case where the determination result in STEP23-1 is negative, that is, in the case where there is no acceleration request for the vehicle 1 (the acceleration request for the vehicle 1 approximately in the fore-and-aft direction), the required center-of-gravity velocity generator 74 then carries out the determination processing in STEP23-4.

In the determination processing of STEP23-4, the required center-of-gravity velocity generator 74 determines whether the estimated center-of-gravity velocity absolute value change rate DVb_s calculated in STEP21 is smaller than a third threshold value DV3 (<0) of a preset negative value. This determination processing is for determining whether a deceleration request by which an occupant of the vehicle 1 intends to positively reduce the magnitude of the center-of-gravity velocity vector ↑Vb has been generated. In this case, if the occupant of the vehicle 1 intentionally places his/her foot on a floor to produce a frictional force in the braking direction of the vehicle 1 between his/her foot and the floor, then the determination result in STEP23-4 will be affirmative.

Further, if the determination result in STEP23-4 is negative (if the deceleration request has not been generated), then the required center-of-gravity velocity generator 74 carries out first braking arithmetic processing in STEP23-5 to determine the magnitude |↑Vb_aim1| of the basic required center-of-gravity velocity vector ↑Vb_aim1 (hereinafter referred to as the basic required center-of-gravity velocity vector absolute value |↑Vb_aim1|) and an azimuth θvb_aim1 (hereinafter referred to as the basic required center-of-gravity velocity vector azimuth θvb_aim1), and terminates the processing in FIG. 15. If the determination result in STEP23-4 is affirmative (if the deceleration request has been generated), then the required center-of-gravity velocity generator 74 carries out second braking arithmetic processing in STEP23-6 to determine the basic required center-of-gravity velocity vector absolute value |↑Vb_aim1| and the basic required center-of-gravity velocity vector azimuth θvb_aim1, and terminates the processing in FIG. 15.

In the present embodiment, the basic required center-of-gravity velocity vector azimuth θvb_aim1 is defined as an angle (−180°≦θvb_aim≦180°) at which sin(θvb_aim1)=Vb_x_aim1/|↑Vb_aim1| and cos(θvb_aim1)=Vb_y_aim1/|↑Vb_aim1|. Further, if |↑Vb_aim|=0, then θvb_aim=0°.

Figure 16:
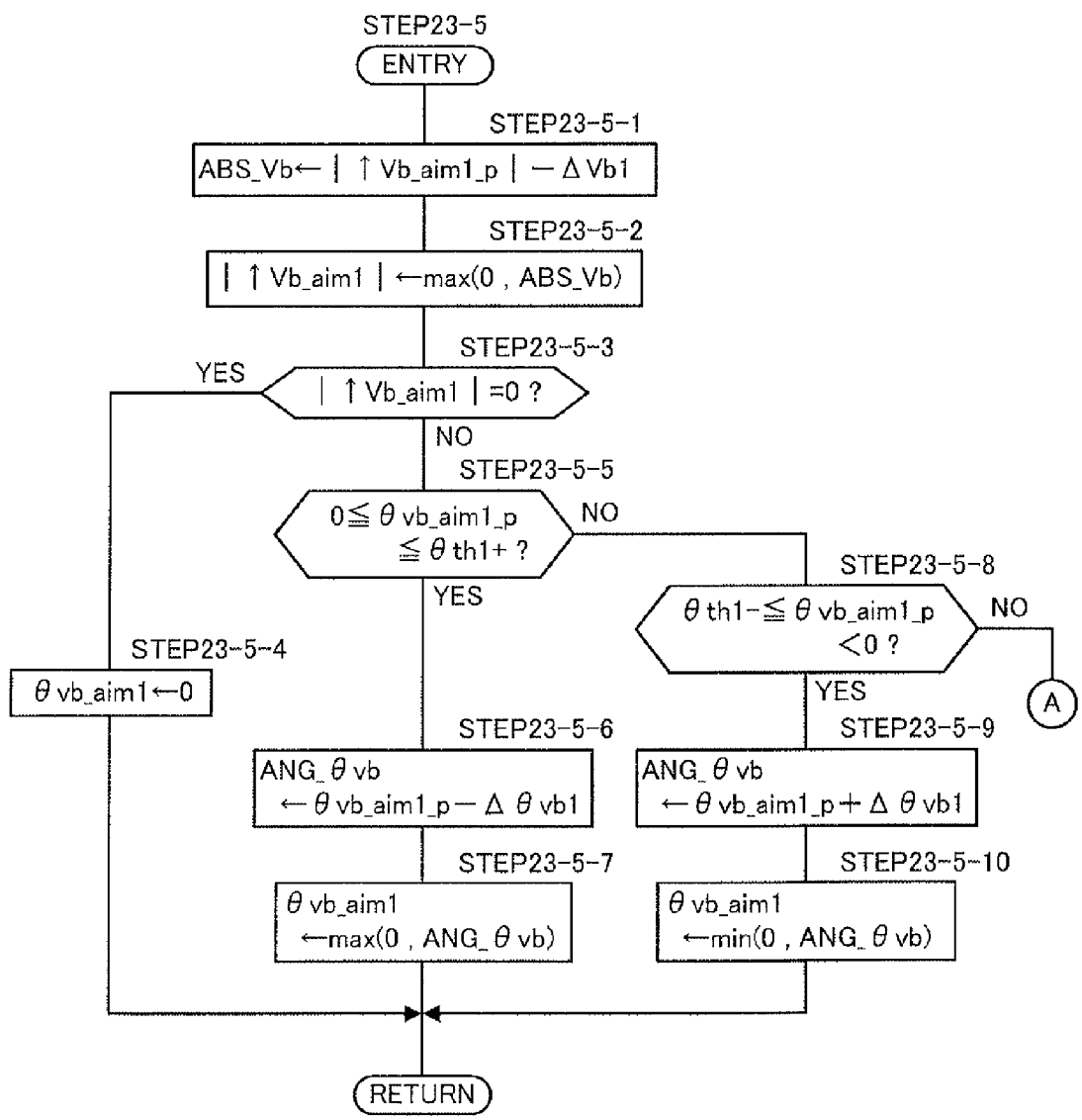
FIG. 16 is a flowchart illustrating the subroutine processing in STEP23-5 of FIG. 15.
Figure 17:
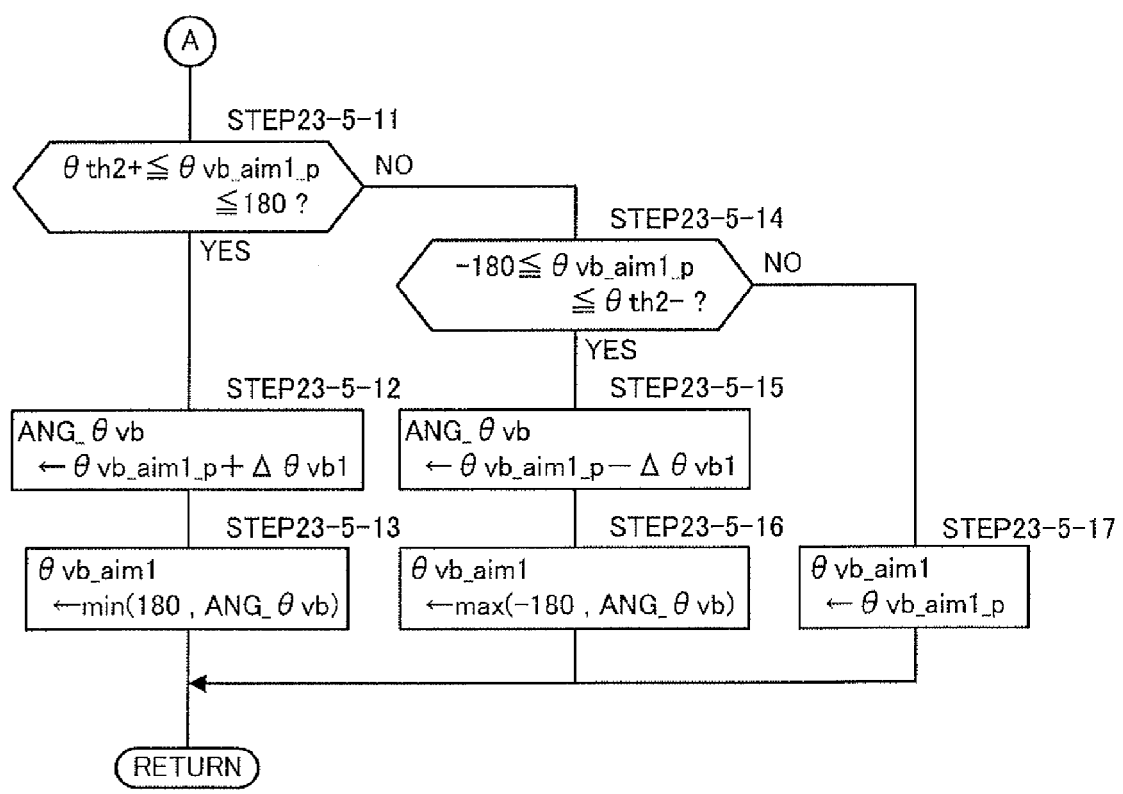
FIG. 17 is a flowchart illustrating the subroutine processing in STEP23-5 of FIG. 15.

The first braking arithmetic processing in the aforesaid STEP23-5 is carried out as illustrated by the flowcharts of FIG. 16 and FIG. 17.

In the first braking arithmetic processing, the required center-of-gravity velocity generator 74 first calculates in STEP23-5-1 a value, which is obtained by decreasing a previous value |↑Vb_aim_p| of the basic required center-ofgravity velocity vector absolute value |↑Vb_aim1| by a preset positive predetermined value ΔVb1, as a candidate value ABS_Vb of |↑Vb_aim1|. The symbol ΔVb1 denotes a set value that specifies the reduction amount of |↑Vb_aim1| (i.e., the temporal change rate of |↑Vb_aim1|) at every control processing cycle.

Subsequently, the required center-of-gravity velocity generator 74 determines in STEP23-5-2 a value max(0, ABS_Vb) of the candidate value ABS_Vb or 0, whichever is larger, as the current value of |↑Vb_aim1|. Therefore, if ABS_Vb≧0 holds, then ABS_Vb is directly determined as the current value of |↑Vb_aim1|, and if ABS_Vb<0 holds, then the current value of |↑Vb_aim1| is set to zero.

Subsequently, the required center-of-gravity velocity generator 74 determines in STEP23-5-3 whether the |↑Vb_aim1| determined as described above is zero. If the determination result is affirmative, then the required center-of-gravity velocity generator 74 sets the current value of θvb_aim1 to 0° in the next STEP23-5-4 and terminates the processing in FIG. 16.

If the determination result in STEP23-5-3 is negative, then the required center-of-gravity velocity generator 74 carries out the processing from STEP23-5-5 to determine the current value of θvb_aim1 according to which one of the following ranges the value of the previous value θvb_aim1_p of θvb_aim1 falls within: 0°θvb_aim1_p≦θth1+, θth1−≦θvb_aim1_p<0°, θth2+≦θvb_aim1_p≦180°, −180°≦vb_aim1_p≦θth2−, θth1+<θvb_aim1_p<θth2+, and θth2−<θvb_aim1_p<θth1−.

Here, θth1+ denotes a positive azimuth threshold value set beforehand to be a value between 0° and 90°, θth1− denotes a negative azimuth threshold value set beforehand to be a value between 0° and −90°, θth2+ denotes a positive azimuth threshold value set beforehand to be a value between 90° and 180°, and θth2− denotes a negative azimuth threshold value set beforehand to be a value between −90° and −180°. In the present embodiment, the absolute values of θth1+ and θth1− are set to have the same values (e.g., 45° or an angle value in the vicinity thereof). Further, the absolute values of θth2+ and θth2− are set to have the same values (e.g., 135° or an angle value in the vicinity thereof). Incidentally, the difference between θth1+ and θth1− (=(θth1+)−(θth1−)) and the difference between θth2+ and θth2− (=(θth2+)−(θth2−)) do not have to be the same.

The processing from STEP23-5-5 is carried out as described below. The required center-of-gravity velocity generator 74 determines in STEP23-5-5 whether 0°θvb_aim1_p≦θth1+ holds. If the determination result is affirmative, then the required center-of-gravity velocity generator 74 calculates in STEP23-5-6 a value, which is obtained by decreasing the previous value θvb_aim1_p of θvb_aim1 by a preset positive predetermined value Δθvb1, as a candidate value ANG_Vb of θvb_aim1. The symbol Δθvb1 is a set value that specifies the change amount of θvb_aim1 (i.e., the temporal change rate of θvb_aim1) at each control processing cycle.

Subsequently, the required center-of-gravity velocity generator 74 determines in STEP23-5-7 an angle value max(0, ANG_Vb) of the candidate value ANG_Vb or 0, whichever is larger, as the current value of θvb_aim1, and terminates the processing in FIG. 16. Therefore, if ANG_Vb≧0° holds, then ANG_Vb is directly determined as the current value of θvb_aim1, and if ANG_Vb<0° holds, then the current value of θvb_aim1 is set to 0°.

If the determination result in STEP23-5-5 is negative, then the required center-of-gravity velocity generator 74 determines in STEP23-5-8 whether θth1−≦θvb_aim1_p<0° applies. If the determination result is affirmative, then the required center-of-gravity velocity generator 74 calculates in STEP23-5-9 a value, which is obtained by increasing the previous value θvb_aim1_p of θvb_aim1 by the predetermined value Δθvb1, as the candidate value ANG_Vb of θvb_aim1.

Subsequently, the required center-of-gravity velocity generator 74 determines in STEP23-5-10 an angle value min (0, ANG_Vb) of the candidate value ANG_Vb or 0°, whichever is smaller, as the current value of θvb_aim1, and terminates the processing in FIG. 16. Therefore, if ANG_Vb≦0° applies, then ANG_Vb is directly determined as the current value of θvb_aim1, or if ANG_Vb≧0° applies, then the current value of θvb_aim1 is set to 0°.

If the determination result in STEP23-5-8 is negative, then the required center-of-gravity velocity generator 74 determines in STEP23-5-11 of FIG. 17 whether θth2+≦θvb_aim1_p≦180° applies. If the determination result is affirmative, then the required center-of-gravity velocity generator 74 calculates in STEP23-5-12 a value, which is obtained by increasing the previous value θvb_aim1_p of θvb_aim1 by the predetermined value Δθvb1, as the candidate value ANG_Vb of θvb_aim1.

Subsequently, the required center-of-gravity velocity generator 74 determines in STEP23-5-13 an angle value min (180, ANG_Vb) of the candidate value ANG_Vb or 180°, whichever is smaller, as the current value of θvb_aim1, and terminates the processing in FIG. 17. Therefore, if ANG_Vb≦180° applies, then ANG_Vb is directly determined as the current value of θvb_aim1, or if ANG_Vb>180° applies, then the current value of θvb_aim1 is set to 180°.

If the determination result in STEP23-5-11 is negative, then the required center-of-gravity velocity generator 74 determines in STEP23-5-14 whether −180°≦θvb_aim1_pθth2− applies. If the determination result is affirmative, then the required center-of-gravity velocity generator 74 calculates in STEP23-5-15 a value, which is obtained by decreasing the previous value θvb_aim1_p of θvb_aim1 by the predetermined value Δθvb1, as the candidate value ANG_Vb of θvb_aim1.

Subsequently, the required center-of-gravity velocity generator 74 determines in STEP23-5-16 an angle value max (180, ANG_Vb) of the candidate value ANG_Vb or −180°, whichever is larger, as the current value of θvb_aim1, and terminates the processing in FIG. 17. Therefore, if ANG_Vb≧−180° applies, then ANG_Vb is directly determined as the current value of θvb_aim1, or if ANG_Vb<−180° applies, then the current value of θvb_aim1 is set to −180°.

If the determination result in STEP23-5-14 is negative, that is, if θth1+<θvb_aim1_p<θth2+ or θth2−<θvb_aim1_p<θth1− holds, then the required center-of-gravity velocity generator 74 determines in STEP23-5-17 the current value of θvb_aim1 to be the same value as the previous value θvb_aim1_p, and terminates the processing in FIG. 17.

The above has described in detail the first braking arithmetic processing in STEP23-5.

Figure 18:
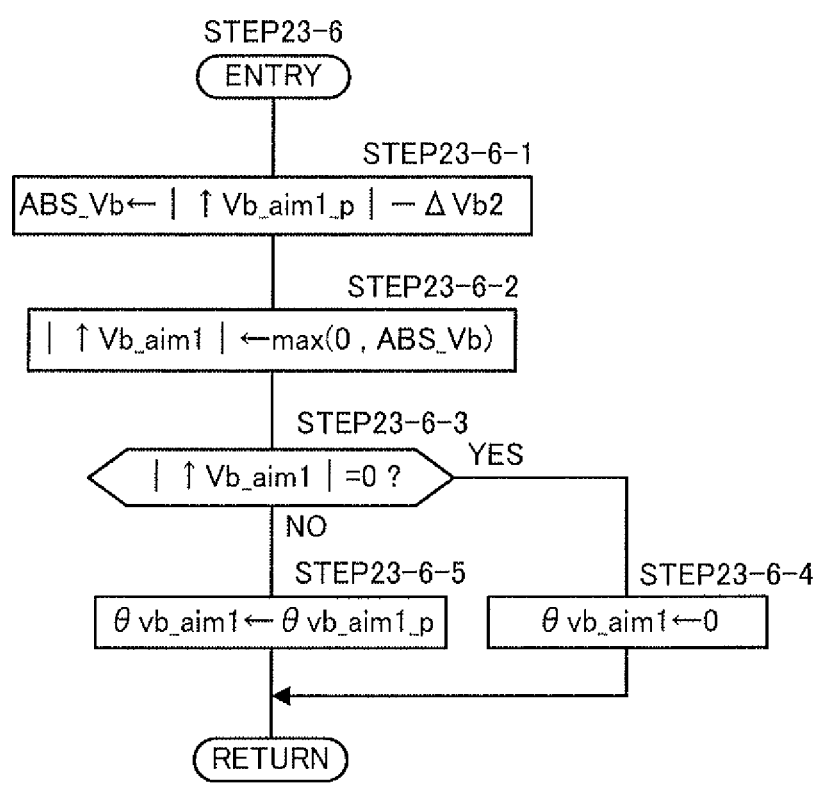
FIG. 18 is a flowchart illustrating the subroutine processing in STEP23-6 of FIG. 15.

Meanwhile, the second braking arithmetic processing in the aforesaid STEP23-6 is carried out as illustrated by the flowcharts of FIG. 18.

In the second braking arithmetic processing, the required center-of-gravity velocity generator 74 first calculates in STEP23-6-1 a value, which is obtained by decreasing a previous value |↑Vb_aim_p| of the basic required center-of-gravity velocity vector absolute value |↑Vb_aim1| by a preset positive predetermined value ΔVb2, as a candidate value ABS_Vb of |↑Vb_aim1|. The symbol ΔVb2 denotes a set value that specifies the reduction amount of |↑Vb_aim1| (i.e., the temporal change rate of |↑Vb_aim1|) at every control processing cycle in the second braking arithmetic processing. In this case, ΔVb2 is set to a value that is larger than the predetermined value ΔVb1 used in the aforesaid first braking arithmetic processing.

Subsequently, in STEP23-6-2, the required center-of-gravity velocity generator 74 carries out the same processing as that in the aforesaid STEP23-5-2 to determine a value max(0, ABS_Vb) of the candidate value ABS_Vb calculated in STEP23-6-1 or 0, whichever is larger, as the current value of |↑Vb_aim1|.

Subsequently, the required center-of-gravity velocity generator 74 determines in STEP23-6-3 whether the |↑Vb_aim1| determined as described above is zero. If the determination result is affirmative, then the required center-of-gravity velocity generator 74 sets the current value of θvb_aim1 to zero in the next STEP23-6-4 and terminates the processing in FIG. 18.

If the determination result in STEP23-6-3 is negative, then the required center-of-gravity velocity generator 74 determines the current value of θvb_aim1 to be the same as the previous value θvb_aim1_p in STEP23-6-5 and terminates the processing in FIG. 18.

This completes the detailed description of the second braking arithmetic processing in STEP23-6.

Returning to the description of FIG. 15, if the determination result in the aforesaid STEP23-1 is affirmative, that is, if there is a request for accelerating the vehicle 1 approximately in the fore-and-aft direction, then the required center-of-gravity velocity generator 74 determines the basic required center-of-gravity velocity vector absolute value |↑Vb_aim1| and the basic required center-of-gravity velocity vector azimuth θvb_aim1 in STEP23-2. The required center-of-gravity velocity generator 74 switches the arithmetic processing mode from the braking mode to the velocity following mode in STEP23-3 and terminates the processing in FIG. 15.

To be more specific, in the aforesaid STEP23-2, a value obtained by multiplying the magnitude |↑Vb_s| of the aforesaid estimated center-of-gravity velocity vector ↑Vb_s (current value) ($=\text{sqrt}(Vb\_x\_s^2+Vb\_y\_s^2)$) by a ratio γ of a predetermined value set beforehand is determined as the basic required center-of-gravity velocity vector absolute value |↑Vb_aim1|. The aforesaid ratio γ is set to a positive value slightly smaller than 1 (e.g., 0.8) in the present embodiment.

Further, in STEP23-2, the azimuth θvb_s of the estimated center-of-gravity velocity vector ↑Vb_s ($=\sin^{-1}(Vb\_x\_s/|↑Vb\_s|)$) is directly determined as the basic required center-of-gravity velocity vector azimuth θvb_aim1. Hence, in STEP23-2, as a result, a vector obtained by multiplying the estimated center-of-gravity velocity vector ↑Vb_s by the aforesaid ratio γ will be determined as the basic required center-of-gravity velocity vector ↑Vb_aim1.

The processing in STEP23-2 described above matches the method for determining |↑Vb_x_aim1| and θvb_aim1 to the velocity following mode that starts from the next control processing cycle.

The value of the aforesaid ratio γ being slightly smaller than 1 is not essential. The value of the ratio γ may be set to, for example, 1 or a value slightly larger than 1. In the present embodiment, the value of the ratio γ is set to a value slightly less than 1 in order to prevent the occupant from feeling (in a sensory manner) the traveling velocity of the vehicle 1 as faster than the actual traveling velocity.

The above has described the arithmetic processing in the braking mode in STEP23.

In the case where the determination result in STEP23-1 is negative, the arithmetic processing mode remains unchanged, so that the arithmetic processing mode will be maintained to the braking mode in the next control processing cycle.

Figure 19:
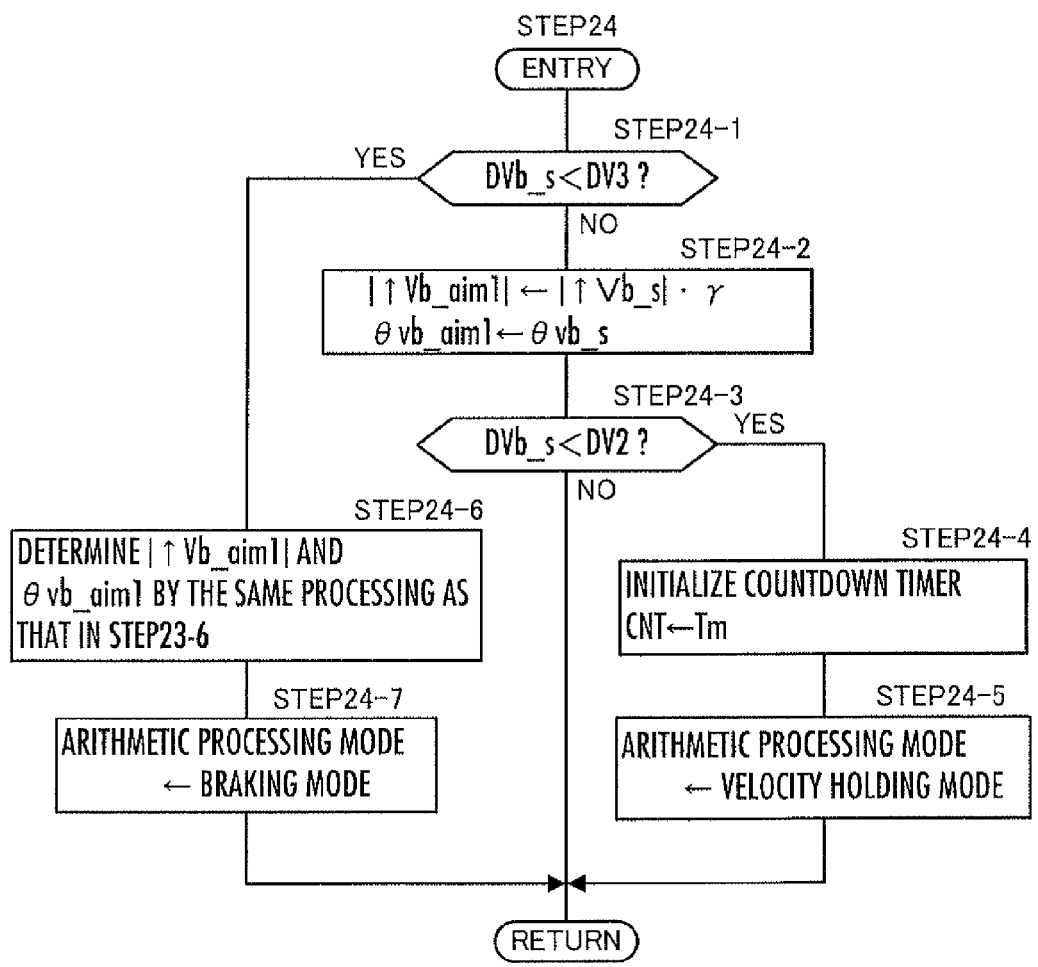
FIG. 19 is a flowchart illustrating the subroutine processing in STEP24 of FIG. 14.

Next, the arithmetic processing in the velocity following mode in STEP24 is carried out as illustrated by the flowchart of FIG. 19. To be more specific, the required center-of-gravity velocity generator 74 first carries out in STEP24-1 the same determination processing as that in the aforesaid STEP23-4, that is, the processing for determining whether the request for decelerating the vehicle 1 has been generated.

If the determination result is affirmative, then the required center-of-gravity velocity generator 74 carries out, in STEP24-6, the same processing as that in the aforesaid STEP23-6 (the processing illustrated by the flowchart of FIG. 18) thereby to determine the basic required center-of-gravity velocity vector absolute value |↑Vb_aim1| and the basic required center-of-gravity velocity vector azimuth θvb_aim1. Further, the required center-of-gravity velocity generator 74 changes the arithmetic processing mode from the velocity following mode to the braking mode in STEP24-7, and terminates the processing in FIG. 19.

Meanwhile, if the determination result in the aforesaid STEP24-1 is negative, that is, if no request for decelerating the vehicle 1 has been generated, then the required center-of-gravity velocity generator 74 carries out the next processing in STEP24-2. In this STEP24-2, the required center-of-gravity velocity generator 74 carries out the same processing as that in the aforesaid STEP23-2 to determine the basic required center-of-gravity velocity vector absolute value |↑Vb_aim1| and the basic required center-of-gravity velocity vector azimuth θvb_aim1. In other words, |↑Vb_x_s|·γ is determined as |↑Vb_aim1|, and θvb_s is determined as θvb_aim1.

Subsequently, the required center-of-gravity velocity generator 74 determines in STEP24-3 whether the estimated center-of-gravity velocity absolute value change rate DVb_s (the value calculated in STEP21) is smaller than a preset second threshold value DV2. In the present embodiment, the second threshold value DV2 is set to a predetermined negative value that is larger than the aforesaid third threshold value DV3 (closer to zero than DV3). The second threshold value DV2 may be set to zero or a positive value that is slightly larger than zero (but less than the aforesaid first threshold value DV1).

The determination result in STEP24-3 is for determining the timing at which the velocity following mode should be switched to the velocity holding mode. If the determination result in STEP24-3 is negative, then the required center-of-gravity velocity generator 74 immediately terminates the processing in FIG. 19. In this case, the arithmetic processing mode is not changed, so that the arithmetic processing mode will be maintained to the velocity following mode also at the next control processing cycle.

Further, if the determination result in STEP24-3 is affirmative, then the required center-of-gravity velocity generator 74 assumes that the request for accelerating the vehicle 1 has been completed, and initializes a countdown timer in STEP24-4. Further, the required center-of-gravity velocity generator 74 changes the arithmetic processing mode from the velocity following mode to the velocity holding mode in STEP24-5 and terminates the processing in FIG. 19.

The aforesaid countdown timer is a timer that counts the elapsed time from a start of the velocity holding mode which begins from the next control processing cycle. Further, in STEP24-4, preset initial value Tm is set for the time count value CNT of the timer. The initial value Tm means a set value of the time intended for the velocity holding mode to continue.

The above is the arithmetic processing of the velocity following mode in STEP24.

Subsequently, the arithmetic processing of the velocity holding mode in STEP25 is carried out as illustrated by the flowchart in FIG. 20. To be more specific, the required center-of-gravity velocity generator 74 first carries out in STEP25-1 the same determination processing as that in the aforesaid STEP23-4, that is, the processing for determining whether the request for decelerating the vehicle 1 has generated.

If the determination result in STEP25-1 is affirmative (if the request for decelerating the vehicle 1 has been generated), then the required center-of-gravity velocity generator 74 carries out in STEP25-2 the same processing as that in the aforesaid STEP23-6 (the processing illustrated by the flowchart in FIG. 18) thereby to determine the basic required center-of-gravity velocity vector absolute value |↑Vb_aim1| and the basic required center-of-gravity velocity vector azimuth θvb_aim1. Further, the required center-of-gravity velocity generator 74 changes the arithmetic processing mode from the velocity holding mode to the braking mode in STEP25-3 and terminates the processing in FIG. 20.

Meanwhile, if the determination result in the aforesaid STEP25-1 is negative (if no request for decelerating the vehicle 1 has been generated), then the required center-of-gravity velocity generator 74 carries out in STEP25-4 the same determination processing as that in the aforesaid STEP23-1, that is, the processing for determining whether there is the request for accelerating the vehicle 1 approximately in the fore-and-aft direction.

If the determination result in STEP25-4 is affirmative (if the request for accelerating the vehicle 1 approximately in the fore-and-aft direction has been generated again), then the required center-of-gravity velocity generator 74 carries out in STEP25-5 the same processing as that in the aforesaid STEP23-2 thereby to determine the basic required center-of-gravity velocity vector absolute value |↑Vb_aim1| and the basic required center-of-gravity velocity vector azimuth θvb_aim1. In other words, |↑Vb_x_s|·γ is determined as |↑Vb_aim1|, and θvb_s is determined as θvb_aim1.

Further, the required center-of-gravity velocity generator 74 changes the arithmetic processing mode from the velocity holding mode to the velocity following mode in STEP25-6 and terminates the processing in FIG. 20.

If the determination result in the aforesaid STEP25-4 is negative (if the state wherein there is no request for acceleration approximately in the fore-and-aft direction is continuing), then the required center-of-gravity velocity generator 74 decrements the time count value CNT on the countdown timer in STEP25-7. More specifically, the time count value CNT is updated by subtracting a predetermined value ΔT (the time of the control processing cycle) from the current value of the time count value CNT.

Subsequently, the required center-of-gravity velocity generator 74 determines in STEP25-8 whether the time count value CNT on the countdown timer is larger than zero, that is, whether the time count of the countdown timer has finished.

If the determination result in this STEP25-8 is affirmative, it means that the time indicated by the aforesaid initial value Tm on the countdown timer has not yet elapsed since the velocity holding mode started. In this case, the required center-of-gravity velocity generator 74 determines the basic required center-of-gravity velocity vector absolute value |↑Vb_aim1| and the basic required center-of-gravity velocity vector azimuth θvb_aim1 in STEP25-9, assuming that the arithmetic processing mode is to be maintained to the velocity holding mode, and terminates the processing in FIG. 20.

In this case, in STEP25-9, the current value of |↑Vb_aim1| is determined to be the same value as the previous value |↑Vb_aim1_p|. Further, the current value of θvb_aim1 is determined to be the same value as the previous value θvb_aim1_p. Hence, the previous value of the basic required center-of-gravity velocity vector ↑Vb_aim1_p is directly determined as the velocity vector of the current value of the ↑Vb_aim1.

If the determination result in STEP25-8 is affirmative, then the arithmetic processing mode is not changed, so that the arithmetic processing mode will be maintained to the velocity holding mode also at the next control processing cycle.

If the determination result in the aforesaid STEP25-8 is negative, that is, if the predetermined time indicated by the initial value Tm on the countdown timer has elapsed since the velocity holding mode started, then the required center-of-gravity velocity generator 74 carries out in STEP25-10 the same processing as that in the aforesaid STEP23-5 (the processing of the flowcharts in FIG. 16 and FIG. 17) thereby to determine the basic required center-of-gravity velocity vector absolute value |↑Vb_aim1| and the basic required center-of-gravity velocity vector azimuth θvb_aim1.

Further, the required center-of-gravity velocity generator 74 changes the arithmetic processing mode from the velocity holding mode to the braking mode in STEP25-11, and terminates the processing in FIG. 20.

The above has described the arithmetic processing in the velocity holding mode in STEP25.

Returning to the description of FIG. 14, the required center-of-gravity velocity generator 74 carries out the arithmetic processing in one of STEP23 to STEP25 as described above, and then carries out the processing for inputting the |↑Vb_aim1| and θvb_aim1 determined by the arithmetic processing to filters (filtering processing) in STEP26.

Here, the filters to which the |↑Vb_aim1| and θvb_aim1 are input are low-pass filters having a first-order lag characteristic for preventing the magnitude |↑Vb_aim| of the required center-of-gravity velocity vector ↑Vb_aim and the azimuth θvb_aim from suddenly changing in steps especially immediately after the arithmetic processing mode is changed from the braking mode to the velocity following mode. In this case, the time constant of the filter to which the |↑Vb_aim| is input is set to a relatively short time constant and the output value of the filter coincides or substantially coincides with the |↑Vb_aim1| in situations other than immediately after the |↑Vb_aim1| suddenly changes. The same applies to the filter to which the θvb_aim1 is input.

Further, in STEP26, the output value of the filter to which the θvb_aim1 has been input is directly determined as the azimuth θvb_aim of the required center-of-gravity velocity vector ↑Vb_aim (hereinafter referred to as the required center-of-gravity velocity vector azimuth θvb_aim).

Subsequently, the required center-of-gravity velocity generator 74 proceeds to STEP27 to determine the value obtained by passing the output value of the filter, to which the |↑Vb_aim1| has been input, through a limiter as a final magnitude |↑Vb_aim| of the required center-of-gravity velocity vector ↑Vb_aim (hereinafter referred to as the required center-of-gravity velocity vector absolute value |↑Vb_aim|). In this case, the limiter is used to prevent the |↑Vb_aim| from becoming excessive, and outputs the output value of the filter directly as the |↑Vb_aim| if the output value of the filter to which the |↑Vb_aim1| has been input is not more than a predetermined upper limit value set beforehand. Further, if the output value of the filter exceeds the aforesaid upper limit value, then the limiter outputs the upper limit value as the |↑Vb_aim|. In other words, the limiter outputs an output value of the filter or the aforesaid upper limit value, whichever value is smaller, as the |↑Vb_aim|.

Subsequently, the required center-of-gravity velocity generator 74 proceeds to STEP28 to calculate the X-axis direction component of the required center-of-gravity velocity vector ↑Vb_aim (the required center-of-gravity velocity in the X-axis direction) Vb_x_aim and the Y-axis direction component thereof (the required center-of-gravity velocity in the Y-axis direction) Vb_y_aim from the |↑Vb_aim| and θvb_aim determined as described above. More specifically, |↑Vb_aim|·sin(θvb_aim) is calculated as Vb_x_aim, and |↑Vb_aim|·cos(θvb_aim) is calculated as Vb_y_aim.

The above has described in detail the processing by the required center-of-gravity velocity generator 74.

The processing by the required center-of-gravity velocity generator 74 described above determines the required center-of-gravity velocity vector ↑Vb_aim (i.e., the required center-of-gravity velocities Vb_x_aim and Vb_y_aim) in the manner described below.

For example, a case will be assumed where, in order to increase the traveling velocity of the vehicle 1, an occupant kicks a floor with his/her foot or an assistant or the like pushes the vehicle 1 so as to add a propulsive force to the vehicle 1 approximately in the X-axis direction (more specifically, a propulsive force that causes the determination result in the aforesaid STEP23-1 to be affirmative).

It is assumed that the arithmetic processing mode before the propulsive force is added is the aforesaid braking mode. Here, for the sake of understanding, it is assumed that the output value of the filter to which |↑Vb_aim1| is input in STEP26 of FIG. 14 is a value that falls within a range not subjected to the forcible restriction placed by the limiter in STEP27 (a value less than the upper limit value of the limiter). Similarly, it is assumed that the estimated center-of-gravity velocity values Vb_x_s and Vb_y_s fall within a range not subjected to the forcible restriction on the output values V_x_lim2 and V_y_lim2 in the limiting processor 104.

In this case, if the addition of the propulsive force to the vehicle 1 causes the determination result in the STEP23-1 to become affirmative, then the arithmetic processing mode is changed from the braking mode to the velocity following mode by the processing in STEP23-3 of FIG. 15.

In this velocity following mode, a vector obtained by multiplying the current value (the present value) of the estimated center-of-gravity velocity vector ↑Vb_s by a ratio γ of a predetermined value, i.e., a velocity vector whose magnitude is slightly smaller than ↑Vb_s and whose orientation is the same as that of ↑Vb_s is sequentially determined as the basic required center-of-gravity velocity vector ↑Vb_aim1.

Thus, the required center-of-gravity velocity vector ↑Vb_aim sequentially determined by the required center-of-gravity velocity generator 74 is determined so as to follow a velocity vector ↑Vb_aim1 (=γ·↑Vb_s) that substantially agrees with the actual center-of-gravity velocity vector ↑Vb that increases (the magnitude thereof increases) due to the propulsive force added to the vehicle 1.

Then, the X-axis direction component and the Y-axis direction component of the required center-of-gravity velocity vector ↑Vb_aim determined as described above are determined as the aforesaid desired center-of-gravity velocities for control Vb_x_mdfd and Vb_y_mdfd. Further, the manipulated variable components u3_x and u3_y included in the imaginary wheel rotational angular acceleration commands ωwdot_x_cmd and ωwdot_y_cmd, respectively, are determined to cause the estimated center-of-gravity velocity values Vb_x_s and Vb_y_s to converge to the desired center-of-gravity velocities for control Vb_x_mdfd and Vb_y_mdfd, respectively.

As a result, the moving velocity of the wheel assembly 5 is controlled such that the actual moving velocity of the vehicle system center-of-gravity point is promptly increased (increased approximately in the fore-and-aft direction) by the propulsive force added to the vehicle 1 by the occupant according to a request based on the propulsive force. Thus, the vehicle 1 will be smoothly accelerated by the added propulsive force.

In the velocity following mode, if applying a braking force to the vehicle 1 causes the determination result in STEP24-1 of FIG. 19 to become affirmative (if a deceleration request is generated), then the arithmetic processing mode is changed to the aforesaid braking mode. Hence, the traveling velocity of the vehicle 1 will be attenuated. In this case, while the deceleration request is occurring, the |↑Vb_aim1| and θvb_aim1 are determined by the second braking arithmetic processing in STEP23-6 (the processing in FIG. 18). Hence, the basic required center-of-gravity velocity vector ↑Vb_aim1 or the required center-of-gravity velocity vector ↑Vb_aim following the former is determined such that the magnitude thereof attenuates at a certain temporal change rate (a temporal change rate specified by the aforesaid predetermined value ΔVb2) while maintaining the orientation thereof at a constant state.

Subsequently, in the velocity following mode, when the addition of the propulsive force to the vehicle 1 is finished and the estimated center-of-gravity velocity absolute value change rate DVb_s becomes smaller than the aforesaid second threshold value DV2 (if the determination result in STEP24-3 of FIG. 19 switches to be affirmative), the arithmetic processing mode is changed from the velocity following mode to the velocity holding mode by the processing in STEP24-5 of FIG. 19.

In this velocity holding mode, until the time count on the countdown timer finishes in a situation wherein neither the acceleration request nor the deceleration request is generated (in a situation wherein the determination results in both STEP25-1 and STEP25-4 of FIG. 20 are negative), the basic required center-of-gravity velocity vector ↑Vb_aim1 is set to the same velocity vector as the velocity vector ↑Vb_aim1_p of the previous value.

Accordingly, in the period of predetermined time from a start of the velocity holding mode to an end of the time count of the countdown timer (the time of the initial value Tm of the countdown timer), the basic required center-of-gravity velocity vector ↑Vb_aim1 is maintained constantly at the same velocity vector as the velocity vector determined immediately before the velocity holding mode starts.

Therefore, the required center-of-gravity velocity vector ↑Vb_aim determined to follow the ↑Vb_aim1 is also determined to be maintained at a certain velocity vector (a velocity vector that agrees or substantially agrees with ↑Vb_aim determined immediately before the velocity holding mode starts).

Then, the X-axis direction component and the Y-axis direction component of the required center-of-gravity velocity vector ↑Vb_aim determined as described above are determined as the aforesaid desired center-of-gravity velocities for control Vb_x_mdfd and Vb_y_mdfd. Further, the manipulated variable components u3_x and u3_y included in the imaginary wheel rotational angular acceleration commands ωwdot_x_cmd and ωwdot_y_cmd, respectively, are determined to cause the estimated center-of-gravity velocity values Vb_x_s and Vb_y_s to converge to the desired center-of-gravity velocities for control Vb_x_mdfd and Vb_y_mdfd, respectively.

As a result, the traveling velocity of the wheel assembly 5 will be controlled such that the magnitude and the orientation of the actual velocity vector ↑Vb of the vehicle system center-of-gravity point are maintained at constant levels without the need for frequent adjustment of the posture of the upper body of the occupant in the period until the time count by the countdown timer finishes after increasing the velocity of the vehicle 1 (the period of time indicated by the aforesaid initial value Tm). Hence, the actual traveling condition of the vehicle 1 in the aforesaid situation will be a condition in which the vehicle 1 smoothly travels at a substantially constant velocity vector even when the occupant does not perform a steering operation in which the occupant positively moves his/her upper body.

In the velocity holding mode, if the propulsive force approximately in the fore-and-aft direction is added again to the vehicle 1, causing the determination result in STEP25-4 of FIG. 20 to be affirmative (if the acceleration request is generated), then the arithmetic processing mode is switched back to the velocity following mode. This accelerates the vehicle 1 again approximately in the fore-and-aft direction.

Further, in the velocity holding mode, if a braking force is added to the vehicle 1, causing the determination result in STEP25-1 of FIG. 20 to be affirmative (if the deceleration request is generated), then the arithmetic processing mode changes to the braking mode. This causes the traveling velocity of the vehicle 1 to attenuate. In this case, as with the case where the deceleration request is generated in the velocity following mode, |↑Vb_aim1| and θvb_aim1 are determined by the second braking arithmetic processing in STEP23-6 (the processing in FIG. 18) during the occurrence of the deceleration request.

Subsequently, if the time count by the countdown timer ends while maintaining the situation wherein neither the acceleration request nor the deceleration request is generated (the situation wherein the determination results in STEP25-1 and STEP25-4 in FIG. 20 are both negative) in the velocity holding mode, then the arithmetic processing mode is changed from the velocity holding mode to the braking mode by the processing in STEP25-11 of FIG. 20.

In the braking mode, the processing in STEP23-5-1 and STEP23-5-2 of FIG. 16 is carried out at each control processing cycle in the situation wherein neither the acceleration request nor the deceleration request is generated (the situation wherein the determination results in STEP23-1 and STEP23-4 of FIG. 15 are both negative), thereby causing the basic required center-of-gravity velocity vector absolute value |↑Vb_aim1| to continuously attenuate to zero at a constant temporal change rate (a temporal change rate specified by the aforesaid ΔVb1). Then, after the |↑Vb_aim1| has attenuated to zero, the |↑Vb_aim1| is held at zero.

Further, in the braking mode, the processing from STEP23-5-3 and after in FIG. 16 is carried out at each control processing cycle in the situation wherein neither the acceleration request nor the deceleration request is generated. In this case, if the orientation of the basic required center-of-gravity velocity vector ↑Vb_aim1 determined immediately before changeover from the velocity holding mode to the braking mode (the orientation of the ↑Vb_aim1 determined at the control processing cycle immediately before the control processing cycle at which the determination result in STEP25-8 of FIG. 20 turns to be negative) is different from the X-axis direction but relatively close to the X-axis direction (more precisely, if the angle value of the azimuth θvb_aim1 of the ↑Vb_aim1 determined immediately before the changeover falls within one of the ranges of 0°<θvb_aim1_p≦θth1+, θth1−θvb_aim1_p<0°, θth2+≦θvb_aim1_p<180°, and −180°<θvb_aim1_p≦θth2−), then the θvb_aim1 will approach 0° or 180° or −180°, which is a desired convergence angle value, at a constant temporal change rate in a period until the |↑Vb_aim1| attenuates to zero, and will be finally held at the desired convergence angle value. Hence, in the period until the |↑Vb_aim1| attenuates to zero after the braking mode is started, the orientation of the basic required center-of-gravity velocity vector ↑Vb_aim1 will continuously approach the X-axis direction. In other words, the ratio of the absolute value of the y-axis direction component Vb_y_aim1 to the absolute value of the X-axis direction component Vb_x_aim1 of the basic required center-of-gravity velocity vector ↑Vb_aim1 will approach zero. Then, if the orientation of ↑Vb_aim1 reaches the same orientation as the X-axis direction (if Vb_y_aim1 reaches zero) by the time the |↑Vb_aim1| attenuates to zero, then the orientation of the ↑Vb_aim1 is held at the same orientation as the X-axis direction.

Accordingly, the ↑Vb_aim1 is determined such that the orientation thereof approaches (converges to) the X-axis direction while the magnitude thereof attenuates. In the situation wherein the ↑Vb_aim1 is determined as described above, the required center-of-gravity velocity vector ↑Vb_aim determined to follow the ↑Vb_aim1 will be also determined such that the orientation thereof approaches the X-axis direction while the magnitude thereof attenuates.

Further, if the orientation of the basic required center-of-gravity velocity vector ↑Vb_aim1 determined immediately before the changeover from the velocity holding mode to the braking mode is different from the X-axis direction and relatively apart from the X-axis direction (more precisely, if the angle value of the azimuth θvb_aim1 of the ↑Vb_aim1 determined immediately before the aforesaid changeover falls within one of the ranges of θth1+<θvb_aim1_p<θth2+ and θth2−<θvb_aim1_p<θth1−), then the θvb_aim1 will be maintained constantly at the same angle value as the azimuth θvb_aim1 of ↑Vb_aim1 determined immediately before the changeover in the period until the |↑Vb_aim1| attenuates to zero.

Therefore, the ↑Vb_aim1 is determined such that the magnitude attenuates while the orientation thereof is maintained at a constant state. In the situation wherein the ↑Vb_aim1 is determined as described above, the required center-of-gravity velocity vector ↑Vb_aim determined to follow the ↑Vb_aim1 will be determined such that the magnitude thereof attenuates while the orientation thereof is maintained at a constant state.

According to the present embodiment, in the velocity holding mode, the magnitude and the orientation the ↑Vb_aim1 are maintained at constant states. Therefore, the basic required center-of-gravity velocity vector ↑Vb_aim1 determined immediately before the changeover from the velocity holding mode to the braking mode eventually agrees with the ↑Vb_aim1 determined immediately before the changeover from the velocity following mode to the velocity holding mode (in the present embodiment, the ↑Vb_aim1 determined at the control processing cycle at which the determination result in STEP24-3 of FIG. 19 becomes affirmative).

Subsequently, the X-axis direction component and the Y-axis direction component of the required center-of-gravity velocity vector ↑Vb_aim determined as described above in the braking mode are determined as the aforesaid desired center-of-gravity velocities for control Vb_x_mdfd and Vb_y_mdfd. Further, the manipulated variable components u3_x and u3_y included in the imaginary wheel rotational angular acceleration commands ωwdot_x_cmd and ωdot_y_cmd, respectively, are determined to cause the estimated center-of-gravity velocity values Vb_x_s and Vb_y_s to be converged to the desired center-of-gravity velocities for control Vb_x_mdfd and Vb_y_mdfd, respectively.

As a result, in the case where the arithmetic processing mode preceding the braking mode is the velocity holding mode, the traveling velocity of the wheel assembly 5 will be controlled such that the magnitude of the actual velocity vector of the vehicle system center-of-gravity point continuously attenuates from the magnitude in the velocity holding mode even if the occupant does not perform a positive steering operation by moving his/her upper body.

In this case, if the orientation of the ↑Vb_aim1 determined immediately before the changeover from the velocity holding mode to the braking mode (=the ↑Vb_aim1 determined immediately before the changeover from the velocity following mode to the velocity holding mode) is different from the X-axis direction but relatively close to the X-axis direction, then the orientation of the velocity vector will automatically approach the X-axis direction (the fore-and-aft direction of the occupant) while the magnitude of the velocity vector of the vehicle system center-of-gravity point attenuates even if the occupant does not perform the positive steering operation by moving his/her upper body. This enhances the straight-line stability of the vehicle 1 to travel in the fore-and-aft direction of the occupant.

Here, when an attempt is made to accelerate the vehicle 1, it is frequently required to accelerate the vehicle 1 especially in the fore-and-aft direction of the occupant. In this case, the vehicle 1 in the present embodiment has the high straight-line stability of traveling in the fore-and-aft direction, as described above, so that even if the direction of the propulsive force to be added to the vehicle 1 slightly deviates from the fore-and-aft direction, the traveling velocity of the wheel assembly 5 will be controlled such that the velocity vector of the vehicle system center-of-gravity point will be automatically directed in the fore-and-aft direction in the braking mode following the velocity holding mode thereafter.

This restrains fluctuations in the traveling direction of the vehicle 1, thus achieving the vehicle 1 having high straight-line stability for traveling in the fore-and-aft direction of the occupant (the vehicle 1 capable of smoothly advancing in the fore-and-aft direction of the occupant). Consequently, when moving the vehicle 1 in the fore-and-aft direction, the vehicle 1 can be moved in the fore-and-aft direction even if the propulsive force to be added to the vehicle 1 is not accurately directed in the fore-and-aft direction. As a result, the steering operation for moving the vehicle 1 in the fore-and-aft direction can be accomplished easily.

Further, if the orientation of the basic required center-of-gravity velocity vector ↑Vb_aim1 determined immediately before the changeover from the velocity holding mode to the braking mode (=the ↑Vb_aim1 determined immediately before the changeover from the velocity following mode to the velocity holding mode) is different from the X-axis direction and relatively apart from the X-axis direction, then the orientation of the velocity vector will be maintained to be substantially constant while the magnitude of the velocity vector of the vehicle system center-of-gravity point attenuates even if the occupant does not perform the positive steering operation by moving his/her upper body. In other words, in the case where the orientation of the ↑Vb_aim1 determined immediately before the changeover from the velocity holding mode to the braking mode is an orientation relatively apart from the X-axis direction, it is very likely that the orientation of the velocity vector of the vehicle system center-of-gravity lastly intended by the occupant in the velocity following mode is an orientation different from the X-axis direction. This makes it possible to prevent the vehicle system center-of-gravity point from moving in a direction apart from the direction intended by the occupant after the velocity following mode.

Here, the correspondence relationship between the present embodiment and the present invention will be supplementally described.

In the present embodiment, the fore-and-aft direction (the X-axis direction) and the lateral direction (the Y-axis direction) of the occupant aboard the vehicle 1 correspond to the first direction and the second direction, respectively, in the present invention.

Further, the required center-of-gravity velocity generator 74 embodies the desired velocity determining element in the present invention. In this case, according to the present embodiment, the vehicle system center-of-gravity point (more accurately, the overall vehicle-occupant center-of-gravity point) corresponds to a predetermined representative point of the vehicle in the present invention, and the required center-of-gravity velocity vector ↑Vb_aim, which is the desired value of the velocity vector ↑Vb of the vehicle system center-of-gravity point, corresponds to the desired velocity vector in the present invention.

Further, the center-of-gravity velocity restrictor 76, the posture control calculator 80, and the motor command calculator 82 embody the traveling motion unit control element in the present invention.

Further, regarding the processing by the required center-of-gravity velocity generator 74, a condition in which the determination result in STEP24-3 of FIG. 19 during the processing in the velocity following mode is affirmative and neither the acceleration request nor the deceleration request is generated during the processing in the velocity holding mode and the processing in the braking mode after that (more specifically, the determination results in STEP23-1 and STEP23-4 of FIG. 15 and the determination results in STEP25-1 and STEP25-4 of FIG. 20 are all negative) corresponds to the case where the predetermined condition in the present invention holds.

Further, the velocity attenuation processing in the present invention is accomplished by the combination of the processing in the velocity holding mode in a state wherein neither the acceleration request nor the deceleration request is generated (more specifically, the processing illustrated in FIG. 20 in a state wherein the determination results in STEP25-1 and STEP25-4 are negative), the processing in the braking mode (more specifically, the processing illustrated in FIG. 15 up to the instant the ↑Vb_aim attenuates to zero in the state wherein the determination results in STEP23-1 and STEP23-4 are negative), and the processing from STEP26 to STEP28 following the above. Further, the period from the instant the execution of the processing in the velocity holding mode is started to the instant the ↑Vb_aim attenuates to zero in the braking mode following the velocity holding mode corresponds to the velocity attenuation period in the present invention.

Further, the ↑Vb_aim determined immediately before the arithmetic processing mode changes from the velocity following mode to the velocity holding mode (this agrees or substantially agrees with the ↑Vb_aim1), that is, the ↑Vb_aim determined at the control processing cycle at which the determination result in STEP24-3 of FIG. 19 turns to be affirmative, corresponds to the attenuation initial desired velocity vector in the present invention.

Further, the processing in STEP23-5-5 to STEP23-5-17 in FIG. 16 and FIG. 17 embodies the velocity direction adjusting element in the present invention. In this case, the azimuth threshold values θth1+, −(θth1−), 180°−(θth2+), and (θth2−)−180° correspond to the predetermined angle values in the present invention.

Further, the processing in STEP21 of FIG. 14 carried out by the required center-of-gravity velocity generator 74 embodies the velocity change rate measuring element in the present invention. In this case, according to the present embodiment, the aforesaid estimated center-of-gravity velocity absolute value change rate DVb_s corresponds to the measured value of the velocity change rate in the present invention.

Further, the determination processing in the aforesaid STEP23-1 and STEP25-4 carried out by the required center-of-gravity velocity generator 74 embodies the acceleration request determining element in the present invention. Further, the processing in the velocity following mode in the situation wherein the deceleration request does not occur (the processing in FIG. 19 in a situation wherein the determination result in STEP24-1 is negative) corresponds to the velocity increasing processing in the present invention.

Second Embodiment

A second embodiment of the present invention will now be described with reference to FIG. 21. The present embodiment differs from the first embodiment described above only partly in the processing in the aforesaid velocity holding mode. For this reason, the description of the same constructions and processing as those of the first embodiment will be omitted in the description of the present embodiment.

In the present embodiment, the arithmetic processing in the velocity holding mode in STEP25 of FIG. 14 is carried out as illustrated by the flowchart of FIG. 21. In this case, the processing other than the case where the determination result in STEP25-8 of FIG. 21 is affirmative is the same as the processing described in the first embodiment (the processing in FIG. 20).

Further, in the present embodiment, if the determination result in STEP25-8 of FIG. 21 turns to be affirmative, that is, if the predetermined time indicated by the initial value Tm on the countdown timer has not yet passed in the situation wherein neither the acceleration request nor the deceleration request has been generated since the velocity holding mode was started, then the required center-of-gravity velocity generator 74 determines the basic required center-of-gravity velocity vector absolute value |↑Vb_aim1| in STEP25-9a and also determines the basic required center-of-gravity velocity vector azimuth θvb_aim1 in STEP25-9b.

In this case, in STEP25-9a, the current value of |↑Vb_aim1| is determined to be the same value as the previous value |↑Vb_aim1_p| as with the case of the first embodiment.

Further, in STEP25-9b, the current value of θvb_aim1 is determined by the same processing as STEP25-5-5 to 25-5-17 in FIGS. 16 and 17 described in the aforesaid first embodiment. Hence, if the orientation of the basic required center-of-gravity velocity vector ↑Vb_aim1 determined immediately before changeover from the velocity following mode to the velocity holding mode (the orientation of the ↑Vb_aim1 determined at the control processing cycle at which the determination result in STEP24-3 of FIG. 19 turns to be affirmative) is different from the X-axis direction but relatively close to the X-axis direction (more precisely, if the angle value of the azimuth θvb_aim1 of the ↑Vb_aim1 determined immediately before the changeover falls within one of the ranges of 0°<θvb_aim1_p≦θth1+, θth1−θvb_aim1_p<0°, θth2+≦θvb_aim1_p<180°, and −180°<θvb_aim1_p≦θth2−), then the θvb_aim1 is determined such that the θvb_aim1 will be brought closer to 0° or 180° or −180°, which is a desired convergence angle value, at a constant temporal change rate in a period during which the velocity holding mode continues until finally maintained at 0° or 180° or −180°. Thus, the θvb_aim1 is determined such that the θvb_aim1 will be brought closer to a desired convergence angle (0° or 180° or)-180° at a constant temporal change rate until finally maintained at the desired convergence angle in a period combining the velocity holding mode and the braking mode following the velocity holding mode.

Further, if the orientation of the basic required center-of-gravity velocity vector ↑Vb_aim1 determined immediately before the changeover from the velocity following mode to the velocity holding mode (the orientation of the ↑Vb_aim1 determined at the control processing cycle at which the determination result in STEP24-3 of FIG. 19 turns to be affirmative) is different from the X-axis direction and relatively apart from the X-axis direction (more specifically, if the angle value of the azimuth θvb_aim1 of the ↑Vb_aim1 determined immediately before the changeover falls within one of the ranges of θth1+≦θvb_aim1_p<θth2+ and θth2−θvb_aim1_p<θth1−, then the θvb_aim1 is maintained constantly at the same angle value of the azimuth θvb_aim1 of the ↑Vb_aim1 determined immediately before the changeover in a period during which the velocity holding mode continues. Hence, the processing for determining the azimuth θvb_aim1 in this case is the same as that of the first embodiment. Thus, the θvb_aim1 is determined such that the θvb_aim1 is maintained at a constant level during a period combining the velocity holding mode and the braking mode following the velocity holding mode.

The processing other than that described above is the same as that of the first embodiment.

According to the present embodiment described above, if the orientation of the basic required center-of-gravity velocity vector ↑Vb_aim1 determined immediately before the velocity following mode is changed to the velocity holding mode is different from the X-axis direction and relatively close to the X-axis direction, then the orientation of the velocity vector of the vehicle system center-of-gravity point will automatically approach the X-axis direction (the fore-and-aft direction of the occupant) even if the occupant does not perform the positive steering operation by moving his/her upper body not only in the braking mode following the velocity holding mode but also in the velocity holding mode. This makes it possible to further enhance the straight-line stability of the vehicle 1 to travel in the fore-and-aft direction of the occupant.

Supplementally, the correspondence relationship between the present embodiment and the present invention is the same as that of the first embodiment. However, in the present embodiment, the correspondence relationship between the processing in FIG. 20 described in the first embodiment and the present invention may be replaced by the correspondence relationship between the processing in FIG. 21 and the present invention.

Some modifications related to the embodiments described above will now be described.

In each of the aforesaid embodiments, the vehicle system center-of-gravity point (specifically, the overall vehicle-occupant center-of-gravity point) has been the predetermined representative point of the vehicle 1. Alternatively, however, the representative point may be set at, for example, the central point of the wheel assembly 5 or a point of a predetermined part (e.g., the support frame 13) of the base body 9.

In each of the aforesaid embodiments, to determine in STEP23-1 and STEP25-4 whether the acceleration request has been generated, regarding the estimated center-of-gravity velocity absolute value change rate DVb_s and the estimated center-of-gravity acceleration values Vbdot_x_s and Vbdot_y_s, it has been determined whether the condition in which DVb_s>DV1 and |Vbdot_x_s|>a1·|Vbdot_y_s| holds.

Alternatively, however, it may be determined that the acceleration request has been generated if, for example, the temporal change rate of the absolute value of the estimated center-of-gravity velocity value in the X-axis direction Vb_x_s is larger than a predetermined threshold value.

Alternatively, for example, the condition regarding the estimated center-of-gravity acceleration values Vbdot_x_s and Vbdot_y_s may be omitted and whether the acceleration request has been generated may be determined simply by determining whether DVb_s>DV1 holds. This enables the vehicle 1 to travel such that the vehicle system center-of-gravity point velocity vector ↑Vb is accelerated approximately in the Y-axis direction and maintained to be a velocity vector of a constant magnitude, and then the magnitude of the ↑Vb is attenuated.

Further, in each of the embodiments described above, in the case where the determination result in STEP23-5-14 of FIG. 17 is negative, if θvb_aim1_p is a value relatively close to 90° (a value within a predetermined range in the vicinity of 90°), then θvb_aim1 may be determined such that it gradually approaches 90°, and if θvb_aim1 is a value relatively close to −90° (a value within a predetermined range in the vicinity of −90°), then θvb_aim1 may be determined such that it gradually approaches −90°. Alternatively, the θvb_aim1 may be always brought closer to 90° or −90° (whichever is closer to θvb_aim1_p) when the determination result in STEP23-5-14 is negative. In these cases, the same technique, for example, as the one for bringing θvb_aim1 close to 0° or 180° or −180° in the aforesaid embodiments may be used to bring the θvb_aim1 close to 90° or −90°.

In such a case, if the orientation of the ↑Vb_aim1 immediately before the velocity following mode is changed to the velocity holding mode is relatively close to the Y-axis direction, then the required center-of-gravity velocity vector ↑Vb_aim can be brought closer to the orientation of the Y-axis direction in the braking mode following the velocity holding mode or in the velocity holding mode and the braking mode.

Further, in the braking mode following the velocity following mode or in the velocity holding mode and the braking mode, an arrangement may be made such that the orientation of the ↑Vb_aim1 (i.e., the orientation of the ↑Vb_aim) can be selectively switched between bringing closer to the X-axis direction and the Y-axis direction by a switching operation or the like.

Further, in each of the aforesaid embodiments, to attenuate the magnitude of the ↑Vb_aim1 in the braking mode, the |↑Vb_aim1| has been continuously attenuated to zero at a constant temporal change rate. Alternatively, however, the |↑Vb_aim1| may be attenuated to zero in a different mode. For example, the |↑Vb_aim1| may be exponentially attenuated at a predetermined time constant.

Similarly, to bring the orientation of the ↑Vb_aim1 close to the X-axis direction, instead of bringing the θvb_aim1 close to a desired convergence angle (0° or 180° or −180°) at a constant temporal change rate, the θvb_aim1 may be, for example, exponentially brought closer to a desired convergence angle at a predetermined time constant. This applies also to the case where the orientation of the ↑Vb_aim1 is brought closer to the Y-axis direction.

Further, in each of the aforesaid embodiments, to bring the orientation of the ↑Vb_aim1 to the X-axis direction, the θvb_aim1 (consequently θvb_aim) has been sequentially determined to bring the θvb_aim1 close to the desired convergence angle (0° or 180° or −180°). However, instead of sequentially determining the θvb_aim1, the ratio of the absolute value of the Y-axis direction component Vb_y_aim1 to the absolute value of the X-axis direction component Vb_x_aim1 of the ↑Vb_aim1, namely, |Vb_y_aim1|/|Vb_x_aim1|, may be sequentially determined to bring the ratio close to zero, and the orientation of ↑Vb_aim1 may be determined by the ratio |Vb_y_aim1|/|Vb_x_aim1|. In this case, the polarities of Vb_x_aim1 and Vb_y_aim1 are maintained at constant polarities until the magnitude of each thereof becomes zero.

To bring the orientation of the ↑Vb_aim1 close to the Y-axis direction, the ratio of the absolute value of the X-axis direction component Vb_x_aim1 to the absolute value of the Y-axis direction component Vb_y_aim1 of the ↑Vb_aim1, namely, |Vb_x_aim1|/|Vb_y_aim1|, may be sequentially determined to bring the ratio close to zero, and the orientation of ↑Vb_aim1 may be determined by the ratio |Vb_x_aim1|/|Vb_y_aim1|.

Further, in each of the aforesaid embodiments, the velocity holding mode has been provided between the velocity following mode and the braking mode. Alternatively, however, the velocity holding mode may be omitted. In this case, the processing in STEP24-4 of FIG. 19 may be omitted, and processing for changing the arithmetic processing mode to the braking mode may be carried out instead of carrying out the processing in STEP24-5. Other than this, the same as that of, for example, the aforesaid first embodiment may apply. This will cause the velocity attenuation processing in the present invention to be implemented by the processing in the braking mode in the state wherein neither the acceleration request nor the deceleration request is generated (the processing in FIG. 15 in the state wherein the determination results in STEP23-1 and STEP23-4 are both negative) and the processing in STEP26 to STEP28 following the aforesaid processing in the braking mode.

Further, in each of the aforesaid embodiments, the required center-of-gravity velocity vector ↑Vb_aim has been increased according to the propulsive force additionally applied to the vehicle 1, and then the processing in the velocity holding mode and the braking mode functioning as the velocity attenuation processing has been carried out. Alternatively, however, for example, the required center-of-gravity velocity vector ↑Vb_aim may be increased by accelerating the vehicle 1 according to a switching operation or the like by an occupant, and then the execution of the processing in the velocity holding mode and the braking mode (the velocity attenuation processing) may be started as, for example, the switching operation is cleared. Further, an environmental condition or the like may be taken into consideration as the condition for starting the processing in the velocity holding mode and the braking mode.

In each of the aforesaid embodiments, the required center-of-gravity velocity vector ↑Vb_aim has always been set to zero in the aforesaid autonomous mode. Alternatively, however, in the case where a worker or the like moves the vehicle 1 with no occupant aboard thereon by pushing it as necessary, the ↑Vb_aim may be determined by carrying out the same processing as that in the case of the boarding mode such that the required center-of-gravity velocity vector ↑Vb_aim is changed.

Further, in each of the aforesaid embodiments, the vehicle 1 having the structure illustrated in FIG. 1 and FIG. 2 has been exemplified. However, the omnidirectional vehicle 1 in the present invention is not limited to the vehicle 1 exemplified in each of the aforesaid embodiments.

To be more specific, the wheel assembly 5 serving as the traveling motion unit of the vehicle 1 in each of the aforesaid embodiments has the one-piece construction. Alternatively, however, the wheel assembly 5 may have a construction shown in, for example, FIG. 10 of the aforesaid patent document 2. More specifically, the wheel assembly may be constructed to have a rigid annular shaft member and a plurality of rollers rotatively and externally inserted into the rigid annular shaft member such that the axial centers thereof are oriented in the tangential direction of the shaft member, the plurality of these rollers being arranged in the circumferential direction along the shaft member.

Further, the traveling motion unit may have a crawler-shaped structure, as shown in, for example, FIG. 3 of patent document 1.

Figure 5:
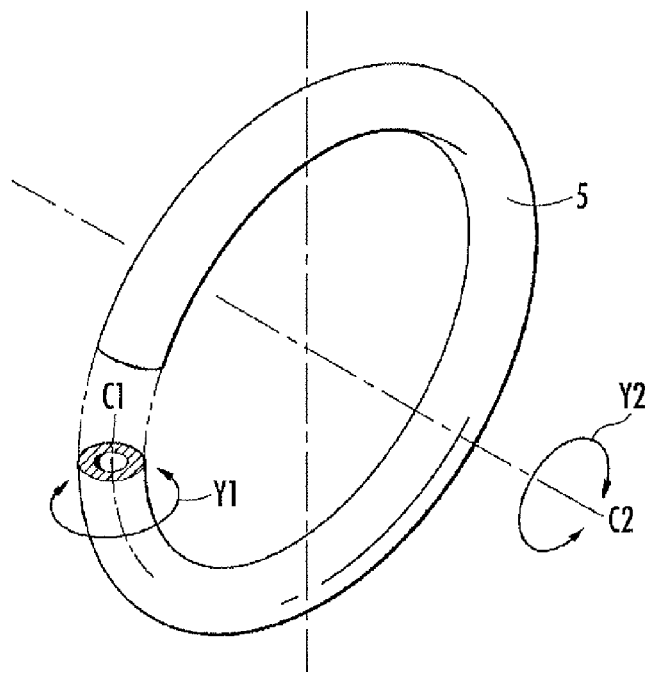
FIG. 5 is a perspective view of a traveling motion unit (wheel unit) of the omnidirectional vehicle according to the embodiment.

Alternatively, as shown in, for example, FIG. 5 of the aforesaid patent document 1, FIG. 7 of patent document 2, or FIG. 1 of patent document 3, the traveling motion unit may be constructed of a spherical member, and the vehicle may be constructed such that the spherical member is rotatively driven in a direction about the X-axis and a direction about the Y-axis by an actuator (e.g., an actuator having the aforesaid wheel assembly 5).

Further, in each of the aforesaid embodiments, the vehicle 1 provided with the seat 3 as the boarding section for an occupant has been exemplified. Alternatively, however, the omnidirectional vehicle in accordance with the present invention may be a vehicle having a construction wherein a step on which an occupant rests his/her both feet and a section to be gripped by the occupant standing on the step are mounted on a base body, as illustrated in, for example, FIG. 8 in patent document 2.

Thus, the present invention can be applied to omnidirectional vehicles of various constructions, as illustrated in the aforesaid patent documents 1 to 3 and the like.

Further, the omnidirectional vehicle in accordance with the present invention may be provided with a plurality of traveling motion units (e.g., two in the lateral direction, or two in the fore-and-aft direction, or three or more) capable of traveling in all directions on a floor surface. In this case, for example, if the vehicle has three or more traveling motion units, then an arrangement may be made to prevent the base body from tilting, and the control of the tilt angle of the base body may be omitted.

DESCRIPTION OF REFERENCE NUMERALS

1 . . . omnidirectional vehicle; 3 . . . seat (payload supporting part); 5 . . . wheel assembly (traveling motion unit); 7 . . . actuator; 9 . . . base body; 74 . . . required center-of-gravity velocity generator (desired velocity determining element); 76 . . . center-of-gravity velocity restrictor (traveling motion unit control element); 80 . . . posture control calculator (traveling motion unit control element); 82 . . . motor command calculator (traveling motion unit control element); STEP21 . . . velocity change rate measuring element; and STEP23-1 and STEP25-4 . . . acceleration request determining element

The invention claimed is:

1. A control device of an omnidirectional vehicle having a traveling motion unit capable of moving on a floor surface in all directions including a first direction and a second direction which are orthogonal to each other, an actuator which drives the traveling motion unit, and a base body on which the traveling motion unit and the actuator are mounted, comprising:

a desired velocity determining element which is an element that sequentially determines a desired velocity vector, which is a desired value of a velocity vector of a predetermined representative point of the vehicle and which carries out velocity attenuation processing, which is a processing for attenuating a magnitude of the desired velocity vector continuously or stepwise in a case where a predetermined condition holds; and a traveling motion unit control element which controls the motion of the traveling motion unit through the actuator on the basis of at least a desired velocity vector determined by the desired velocity determining element, wherein the desired velocity determining element includes a velocity direction adjusting element which determines a desired velocity vector such that an orientation of the desired velocity vector is brought closer to the first direction than to the orientation of an attenuation initial desired velocity vector, which is a desired velocity vector determined immediately before the execution of the velocity attenuation processing is started in a velocity attenuation period from the instant the execution of the velocity attenuation processing is begun to the instant the magnitude of the desired velocity vector is attenuated to zero in a case where the execution of the velocity attenuation processing is begun immediately after a desired velocity vector in an orientation that is different from the first direction is determined.

2. The control device of the omnidirectional vehicle according to claim 1, wherein a payload supporting part for an occupant is mounted on the base body of the vehicle, and an anteroposterior direction of the occupant aboard the payload supporting part is set as the first direction, while a lateral direction of the occupant is set as the second direction.

3. The control device of the omnidirectional vehicle according to claim 1, wherein the velocity direction adjusting element determines the desired velocity vector such that the orientation of the desired velocity vector is brought closer to the first direction than to the orientation of the attenuation initial desired velocity vector in the velocity attenuation period, provided that an angle on an acute angle side between the orientation of the attenuation initial desired velocity vector and the first direction is smaller than a predetermined angle value.

4. The control device of the omnidirectional vehicle according to claim 3, wherein in a case where the angle on the acute angle side between the orientation of the desired velocity vector determined immediately before the start of the execution of the velocity attenuation processing and the first direction is larger than the predetermined angle value, the desired velocity determining element determines the desired velocity vector such that the orientation of the desired velocity vector is maintained at a constant state or brought closer to the second direction in the velocity attenuation period.

5. The control device of the omnidirectional vehicle according to claim 1,
- wherein the velocity attenuation processing is a processing that maintains the magnitude of the desired velocity vector at a constant level for a period of a predetermined time from a start of the execution of the processing, and then continuously attenuates the magnitude of the desired velocity vector, and
- the velocity direction adjusting element determines the desired velocity vector such that the orientation of the desired velocity vector is continuously brought closer to the first direction at least during the period in which the magnitude of the desired velocity vector is continuously attenuated in the velocity attenuation period.

6. The control device of the omnidirectional vehicle according to claim 1, comprising:
- an acceleration request determining element which determines whether an acceleration request, which is a request for increasing the magnitude of the velocity vector of the representative point, is generated,
- wherein the desired velocity determining element carries out velocity increasing processing which determines the desired velocity vector such that the magnitude of the desired velocity vector is increased in the case where a determination result of the acceleration request determining element is affirmative, and starts the execution of the velocity attenuation processing in the case where the predetermined condition holds while the velocity increasing processing is being carried out.

7. The control device of the omnidirectional vehicle according to claim 6,
- wherein the vehicle is a vehicle capable of increasing the magnitude of the velocity vector of the representative point according to an applied external force other than the propulsive force of the vehicle generated by driving the traveling motion unit by the actuator,
- the control device comprises a velocity change rate measuring element which generates an output based on a velocity change rate, which is the temporal change rate of the magnitude of an actual velocity vector of the representative point or a temporal change rate of the magnitude of a velocity component of the first direction of the velocity vector,
- the acceleration request determining element determines whether the acceleration request has been generated on the basis of at least a measured value of the velocity change rate indicated by an output of the velocity change rate measuring element, and
- the desired velocity determining element starts the execution of the velocity attenuation processing, assuming that the predetermined condition holds in the case where the measured value of the velocity change rate becomes smaller than a predetermined threshold value while the velocity increasing processing is being carried out.

\* \* \* \* \*